(12) United States Patent
Kuehn et al.

(10) Patent No.: US 10,309,550 B2
(45) Date of Patent: Jun. 4, 2019

(54) OVERFILL PREVENTION VALVE

(71) Applicant: Franklin Fueling Systems, Inc., Madison, WI (US)

(72) Inventors: Justin Kuehn, Sun Prairie, WI (US); Bill Nelson, Sun Prairie, WI (US); David Laundrie, Cottage Grove, WI (US); Michael O'Flahrity, Milton, WI (US); Erik Backhaus, Wisonsin Dells, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 278 days.

(21) Appl. No.: 14/026,308

(22) Filed: Sep. 13, 2013

(65) Prior Publication Data
US 2014/0076421 A1 Mar. 20, 2014

Related U.S. Application Data

(60) Provisional application No. 61/801,681, filed on Mar. 15, 2013, provisional application No. 61/701,347, filed on Sep. 14, 2012.

(51) Int. Cl.
*F16K 21/18* (2006.01)
*F16K 24/04* (2006.01)
(Continued)

(52) U.S. Cl.
CPC .............. *F16K 31/22* (2013.01); *B67D 7/362* (2013.01); *F16K 1/16* (2013.01); *F16K 21/185* (2013.01);
(Continued)

(58) Field of Classification Search
CPC ...... F16K 21/185; F16K 21/18; F16K 24/042; F16K 24/044; F16K 24/048; F16K 31/08;
(Continued)

(56) References Cited

U.S. PATENT DOCUMENTS

| 1,894,367 A * | 1/1933 | Corcoran ............... G05D 16/12 |
| | | 137/211 |
| 2,231,158 A | 2/1941 | Davis |

(Continued)

FOREIGN PATENT DOCUMENTS

| DE | 102009012822 B3 * | 9/2010 | ............ F16K 11/044 |
| GB | 813260 | 5/1959 | |

(Continued)

OTHER PUBLICATIONS

International Preliminary Report on Patentability dated Mar. 17, 2015 in corresponding International Application No. PCT/US2013/057884.

(Continued)

*Primary Examiner* — Reinaldo Sanchez-Medina
*Assistant Examiner* — Hailey K. Do
(74) *Attorney, Agent, or Firm* — Faegre Baker Daniels LLP

(57) ABSTRACT

An overfill valve associated with a drop tube segment fluidly connected to a fluid reservoir is described. The overfill valve includes a valve body positioned within the drop tube segment and a non-contact valve actuator positioned exterior to the drop tube segment and operable to actuate the valve body from an open position to a closed position without requiring any physical penetration through the wall of the drop tube segment. The non-contact valve actuator has a first position in which the non-contact valve actuator does not actuate the valve body from the open position to the closed position in a second position, achieved when the liquid reservoir reaches a predetermined level approaching the capacity of the liquid reservoir, the non-contact valve actuator actuating the valve body from the open position to the closed position when the non-contact valve actuator obtains the second position.

41 Claims, 40 Drawing Sheets

(51) Int. Cl.
*F16K 31/08* (2006.01)
*F16K 31/10* (2006.01)
*F16K 31/22* (2006.01)
*G05D 9/12* (2006.01)
*B67D 7/36* (2010.01)
*F16K 1/16* (2006.01)

(52) U.S. Cl.
CPC .......... *F16K 24/048* (2013.01); *F16K 31/084* (2013.01); *F16K 31/086* (2013.01); *F16K 31/088* (2013.01); *F16K 31/105* (2013.01); *G05D 9/12* (2013.01); *Y10T 137/7287* (2015.04); *Y10T 137/7423* (2015.04)

(58) Field of Classification Search
CPC .......... F16K 31/16; F16K 31/18; F16K 31/20; F16K 31/24; F16K 31/26; F16K 31/28; F16K 31/086; Y10T 137/053; Y10T 137/0826; Y10T 137/2536; Y10T 137/267; Y10T 137/2675; Y10T 137/2965; Y10T 137/2968; Y10T 137/3068; Y10T 137/3099; Y10T 137/6004; Y10T 137/7358; Y10T 137/7365; Y10T 137/7384; Y10T 137/7404; Y10T 137/7423; Y10T 137/7426; Y10T 137/7433; Y10T 137/7436; Y10T 137/7439
USPC ............. 137/431, 432; 141/199–226; 251/65
See application file for complete search history.

(56) References Cited

U.S. PATENT DOCUMENTS

| | | | | |
|---|---|---|---|---|
| 3,233,625 | A * | 2/1966 | Pase | F16K 31/086 137/416 |
| 3,822,933 | A | 7/1974 | Johnson | |
| 4,360,038 | A | 11/1982 | Trinkwalder, Jr. | |
| 4,577,657 | A * | 3/1986 | Alexander | F16K 31/086 137/448 |
| 4,986,320 | A | 1/1991 | Kesterman et al. | |
| 5,010,915 | A * | 4/1991 | Johnson | B65D 90/26 137/312 |
| 5,027,870 | A | 7/1991 | Butterfield | |
| 5,080,126 | A * | 1/1992 | De Rycke | F16T 1/24 137/195 |
| 5,174,345 | A * | 12/1992 | Kesterman | B65D 90/26 137/411 |
| 5,435,335 | A * | 7/1995 | Klop | B67D 7/365 137/202 |
| 5,518,024 | A | 5/1996 | Weeks | |
| 6,712,090 | B1 * | 3/2004 | Brandelli | E03D 1/32 137/410 |
| 7,331,365 | B2 * | 2/2008 | Nguyen | F16K 15/181 137/434 |
| 7,644,723 | B2 * | 1/2010 | Zsigmond | F16K 21/185 137/172 |
| 7,726,524 | B2 | 6/2010 | Merabet et al. | |
| 2004/0031540 | A1 | 2/2004 | Peterson | |
| 2008/0216900 | A1 | 9/2008 | Barnham | |
| 2015/0240966 | A1 | 8/2015 | Kuehn et al. | |

FOREIGN PATENT DOCUMENTS

| | | |
|---|---|---|
| WO | 2004/090401 | 10/2004 |
| WO | 2007/010284 | 1/2007 |

OTHER PUBLICATIONS

International Search Report dated Apr. 2, 2014 in corresponding International Application No. PCT/US2013/057884.
English translation of German Patent Publication No. DE 102009012822 B3, dated Sep. 23, 2010, Huburt Prädel, "Switching valve for wastewater purification of e.g. sequential batch reactor sewage plant, has ball sealing valve seat and drain connection, and another ball sealing another valve seat and another drain connection after actuation of valve"; Retrieved from http://www.google.com.na/patents/DE102009012822B3?cl=en, 9 pages.
Office Action dated Jul. 24, 2017 in U.S. Appl. No. 14/428,316.
Office Action dated Oct. 2, 2017 in corresponding Russian Application No. 2015113603/12(021328) and English language translation of same.
Office Action dated May 31, 2016 in corresponding Chinese Application No. 201380048119.X and English language translation of same.
Office Action dated Mar. 24, 2017 in corresponding Chinese Application No. 201380048119.X and English language translation of same.
1st Examination Reporting dated Feb. 10, 2017 in corresponding Australian Application No. 2013315883.

* cited by examiner

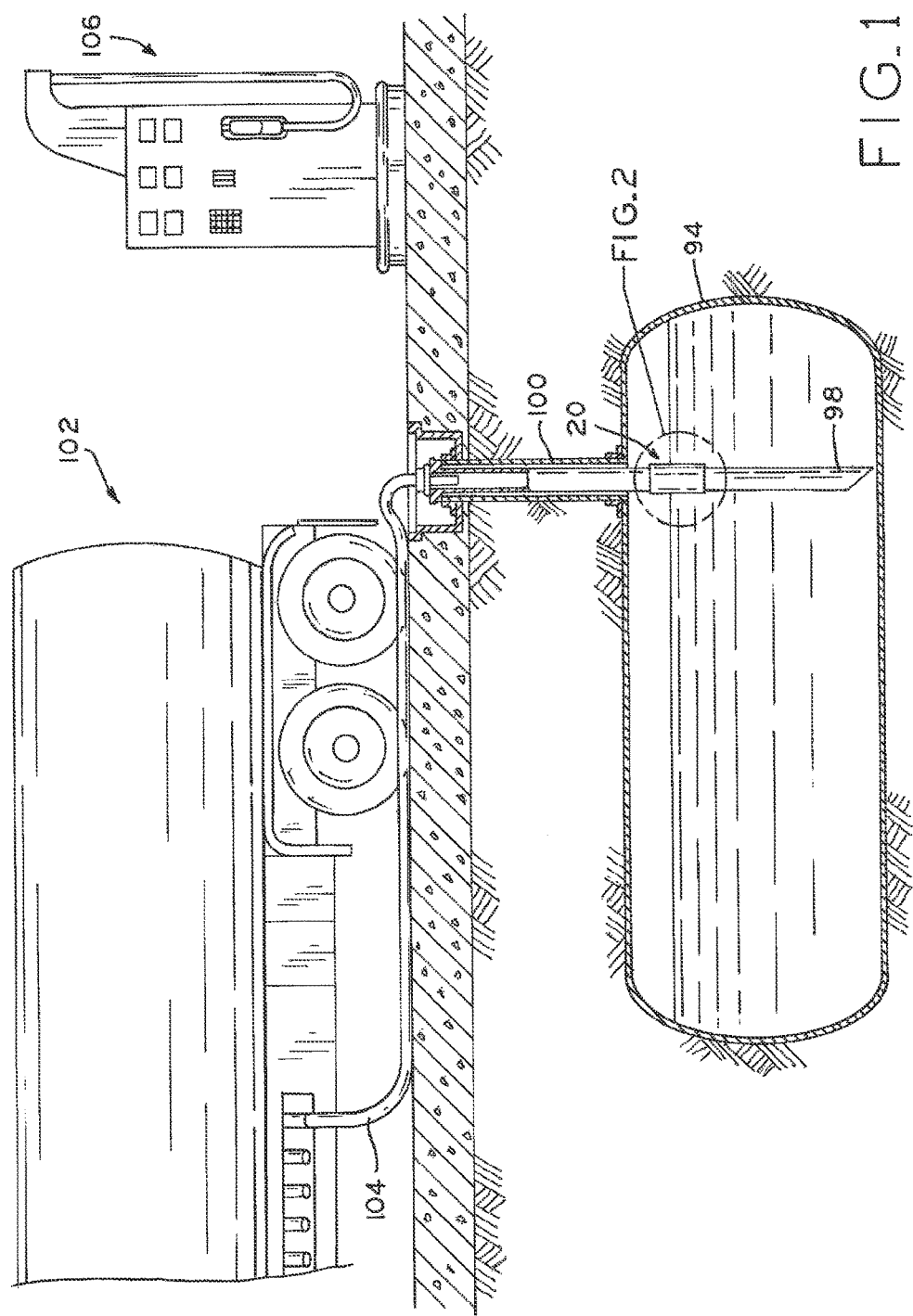

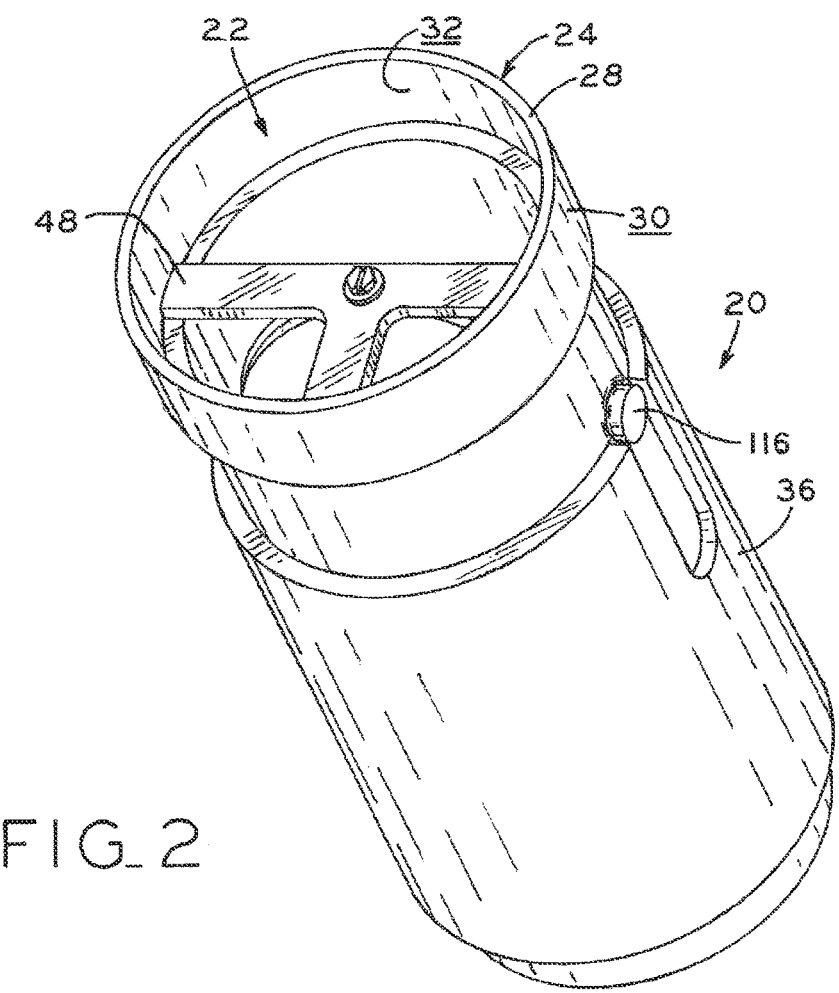
FIG_2
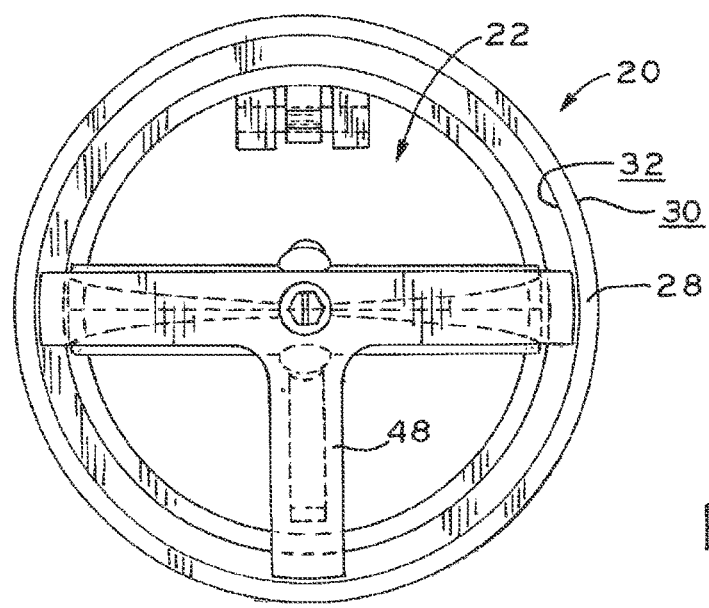
FIG_3

FIG_9

FIG_10

FIG_11

FIG_12

FIG_13

FIG_17

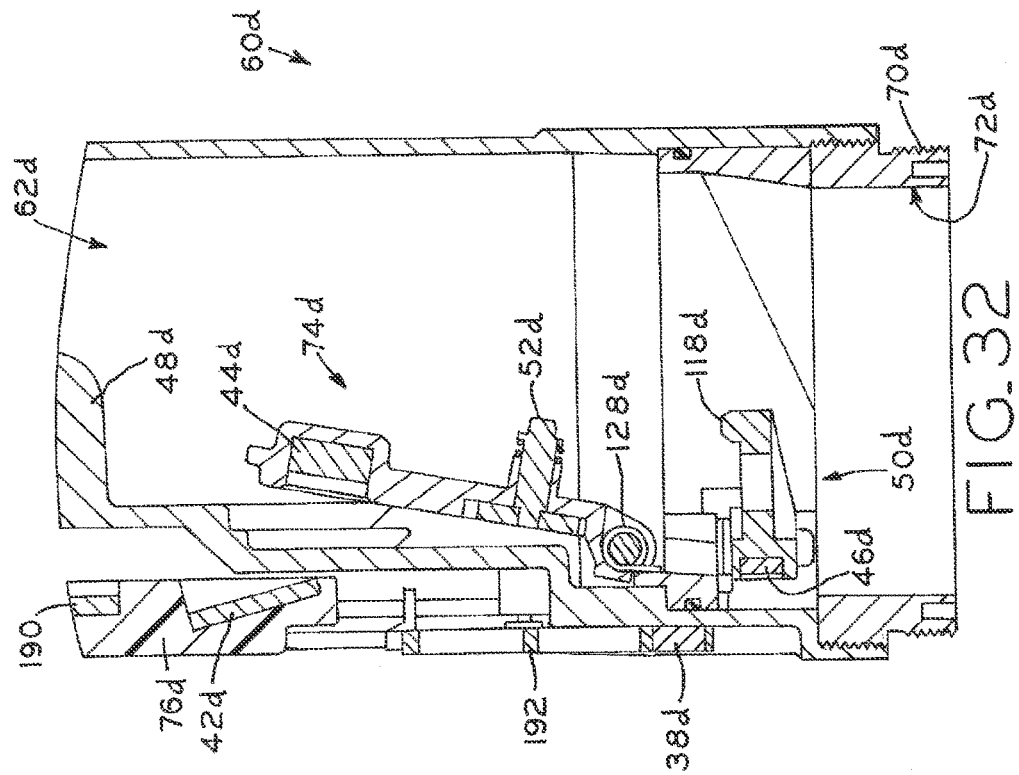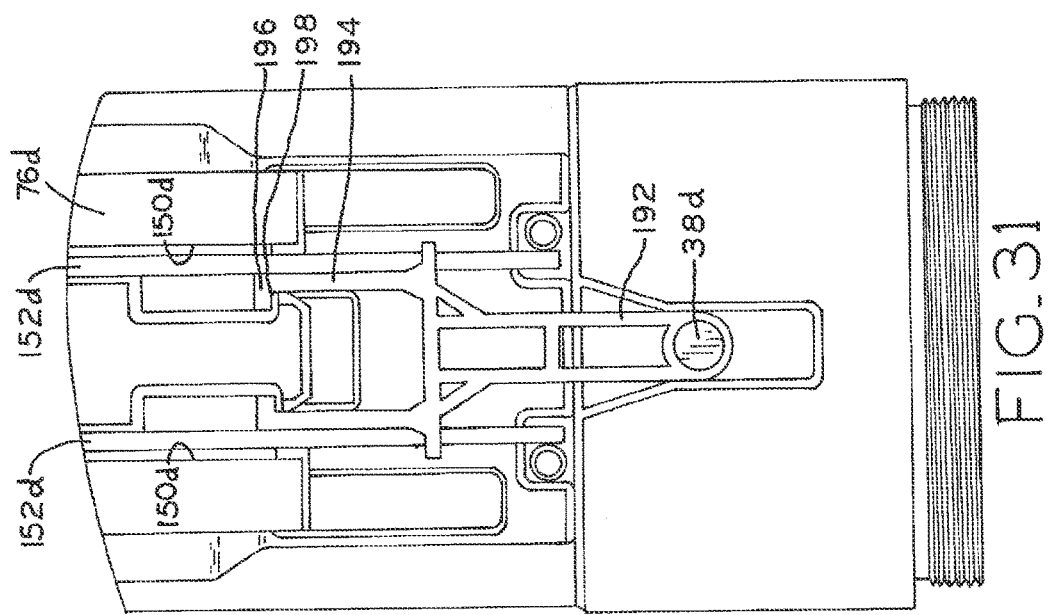

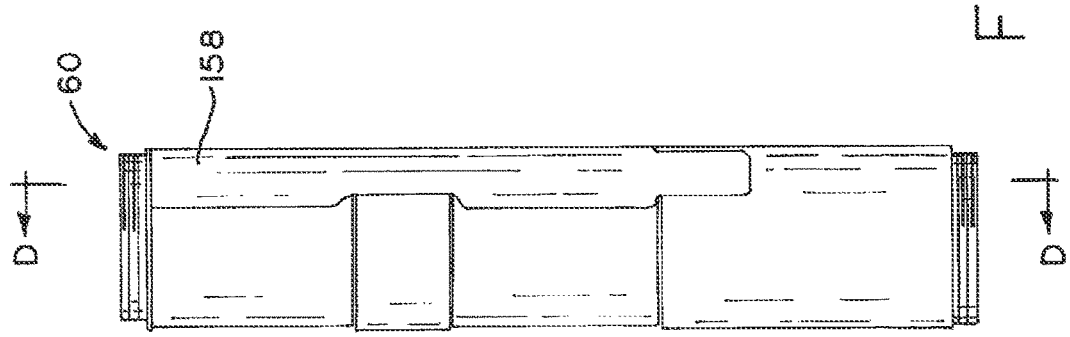

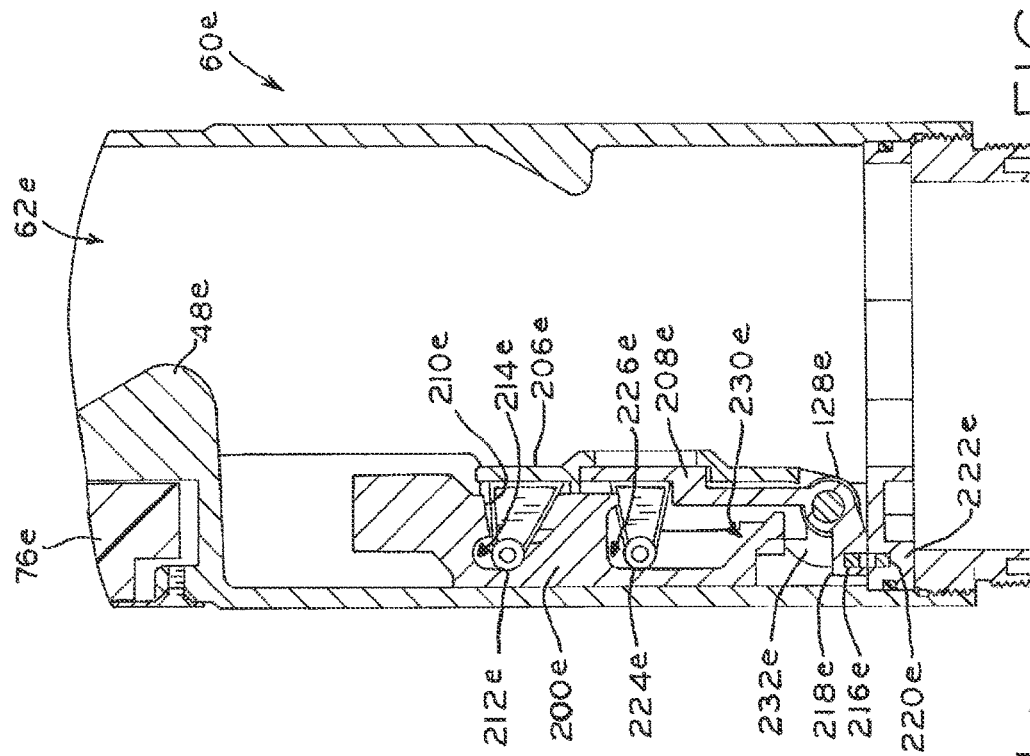
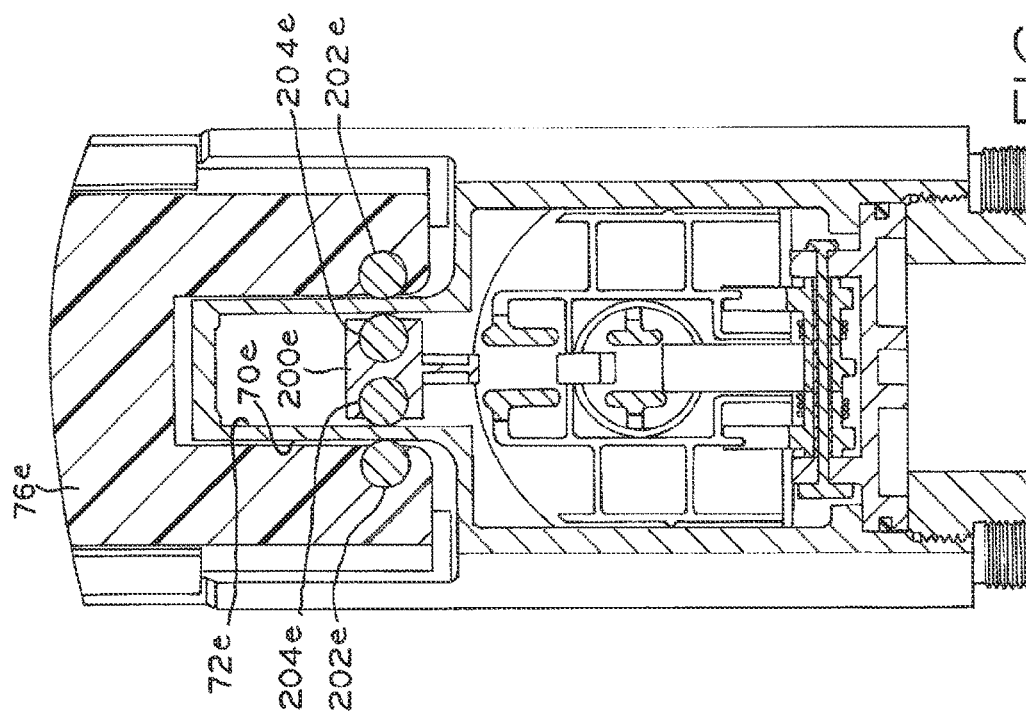

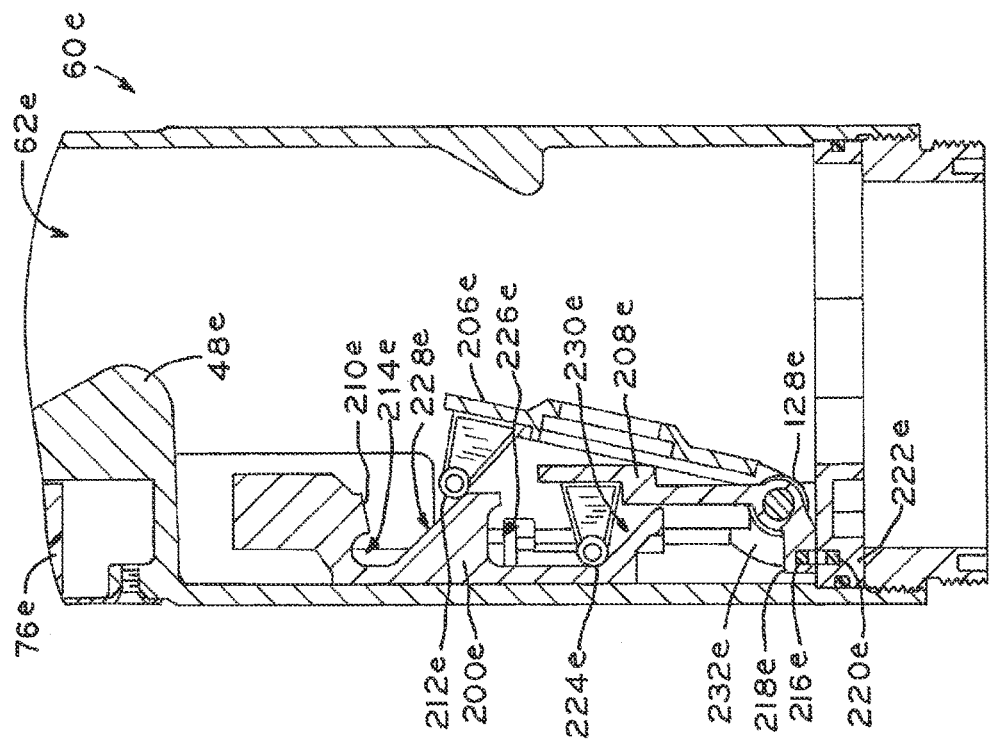
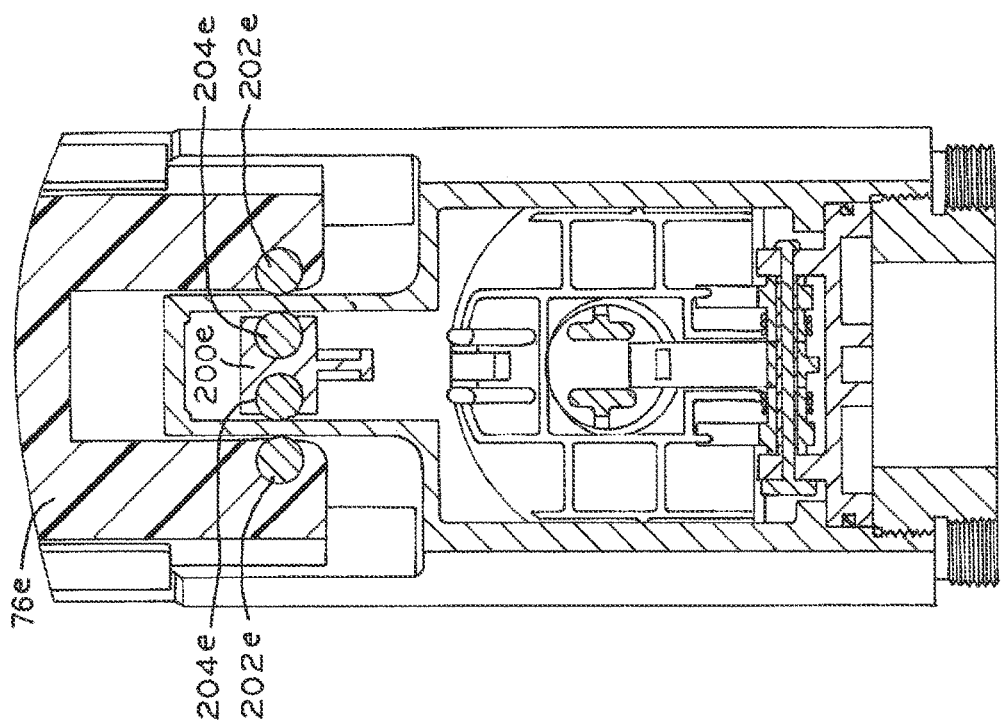

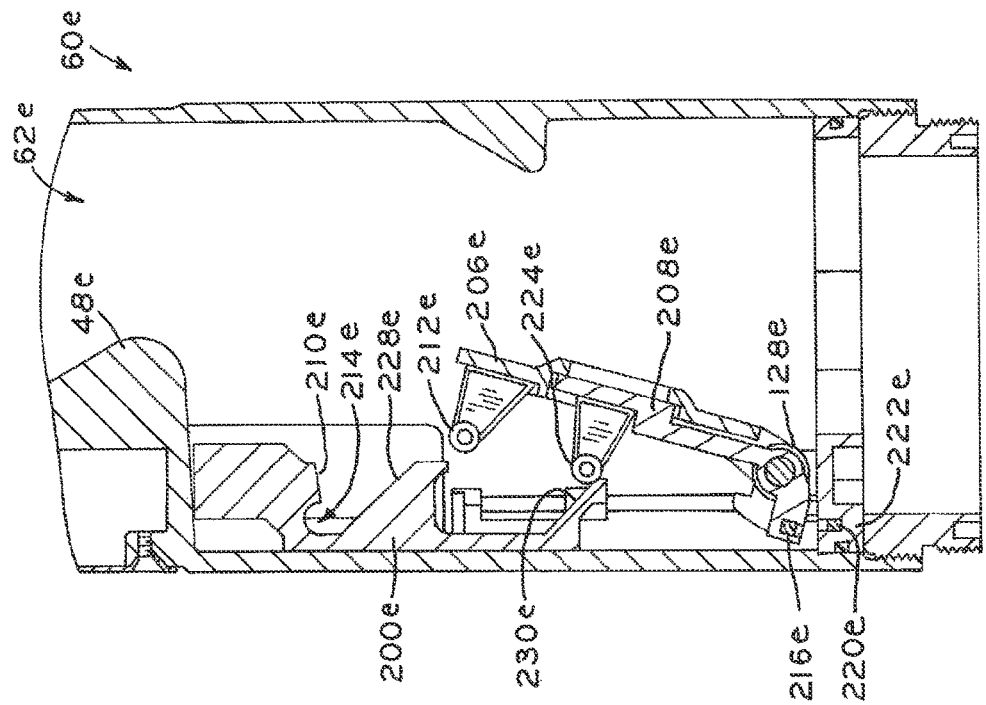
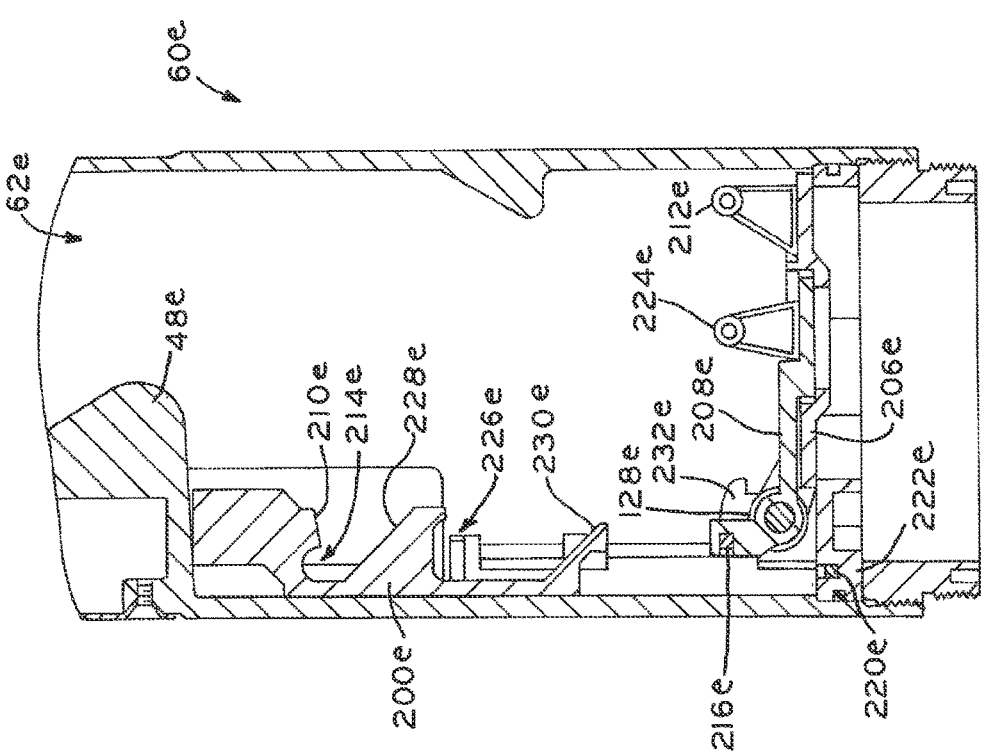

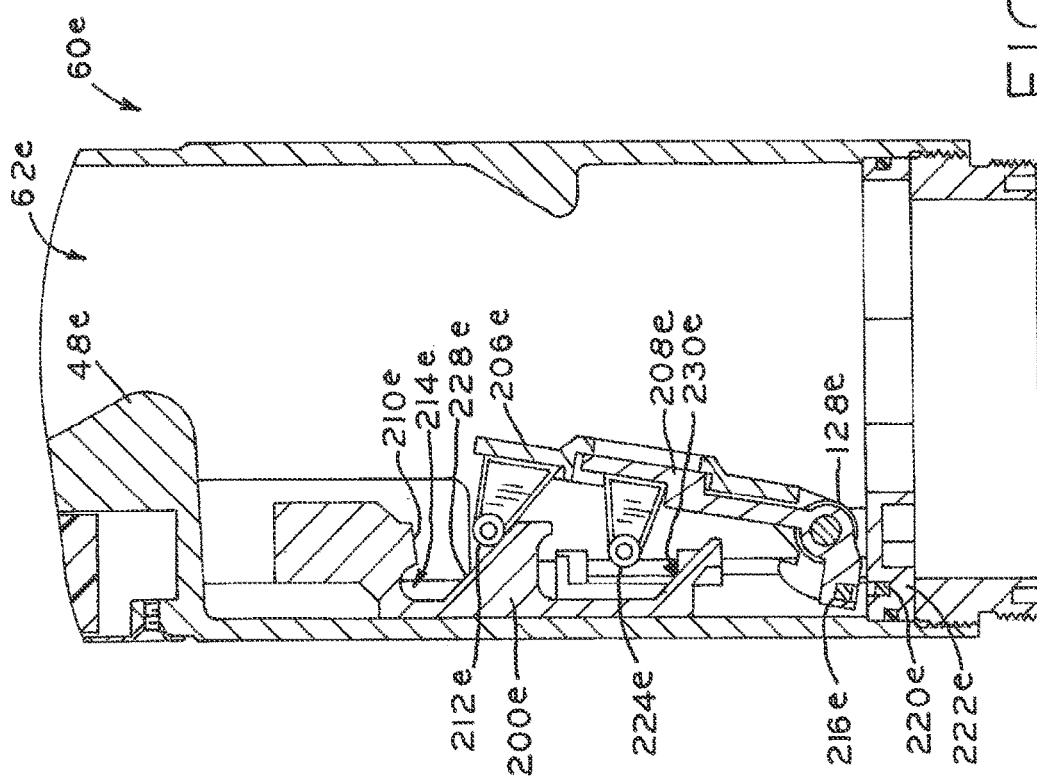

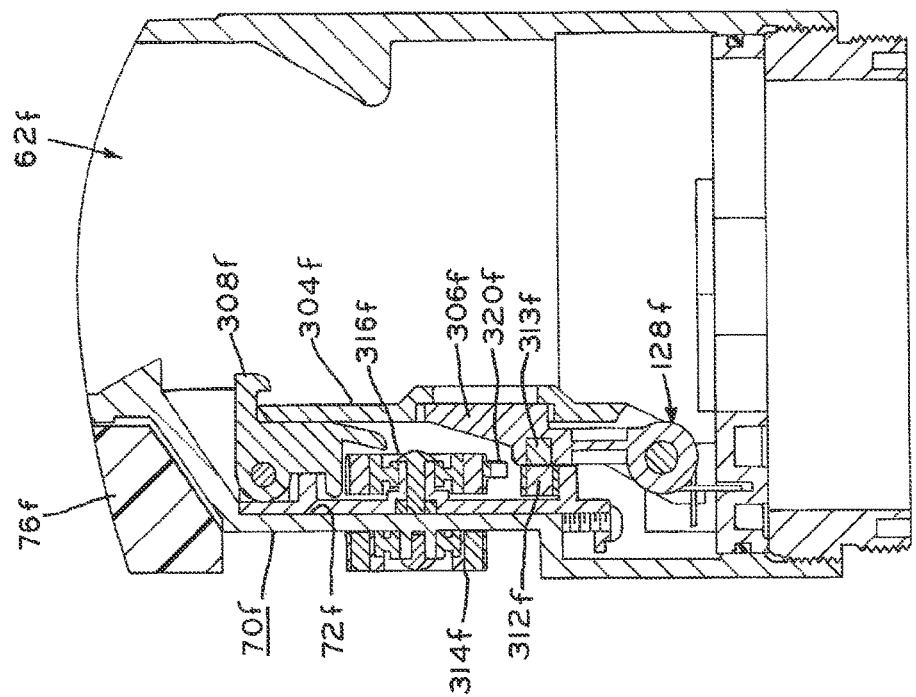
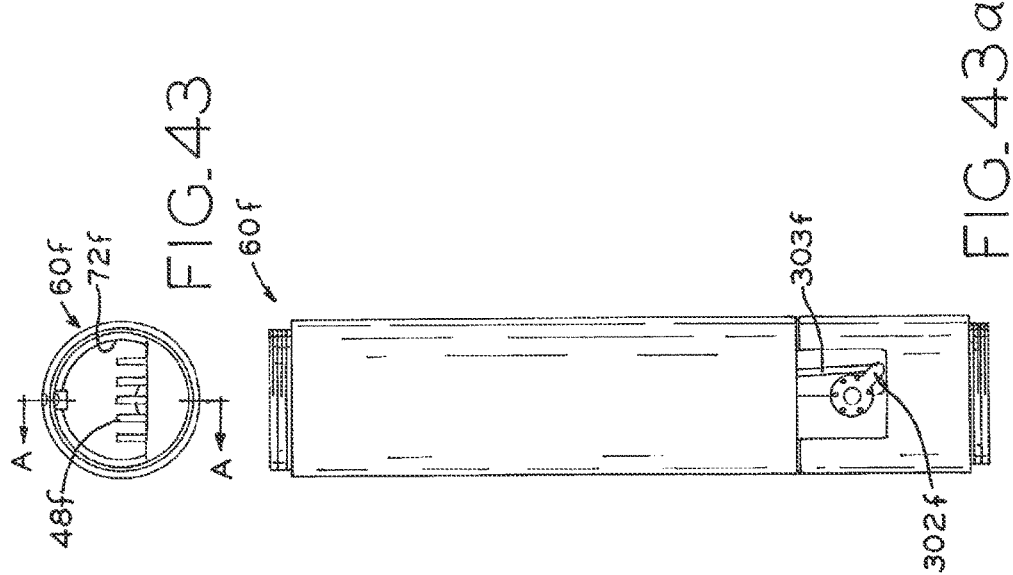

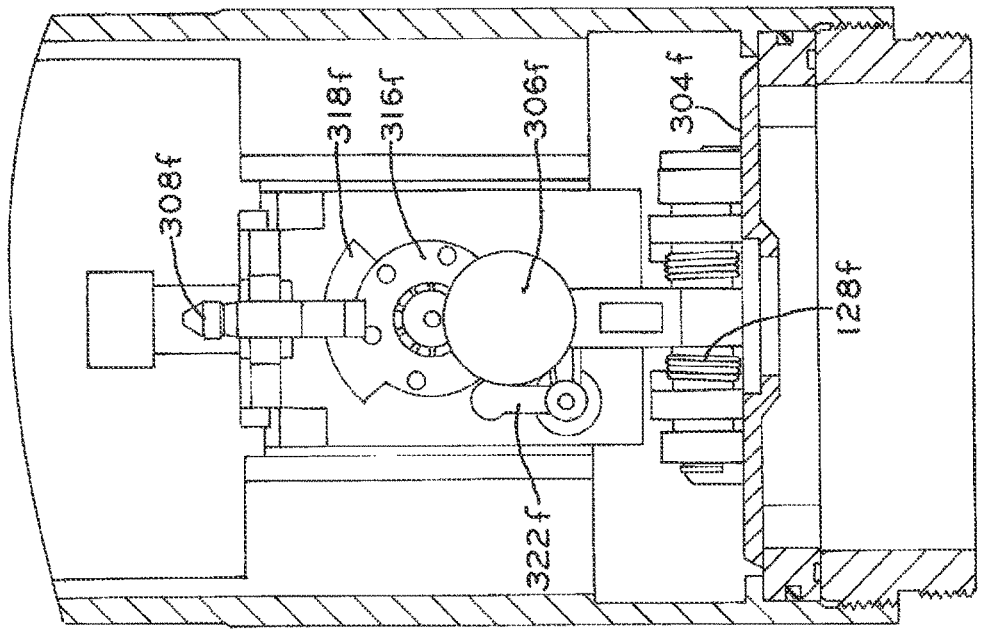
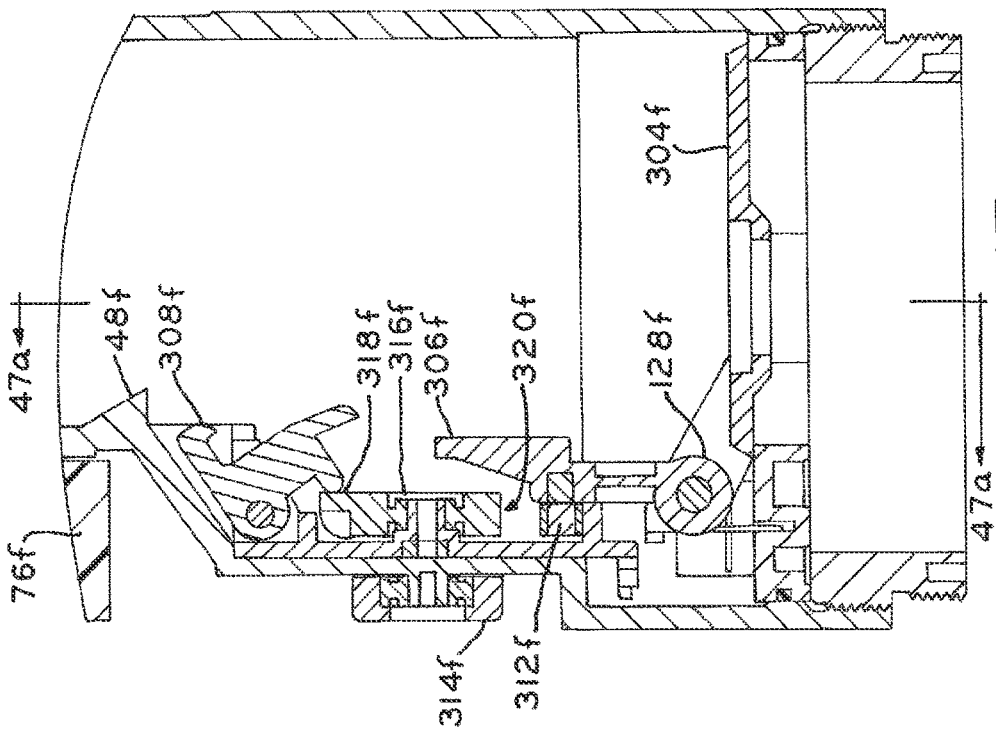

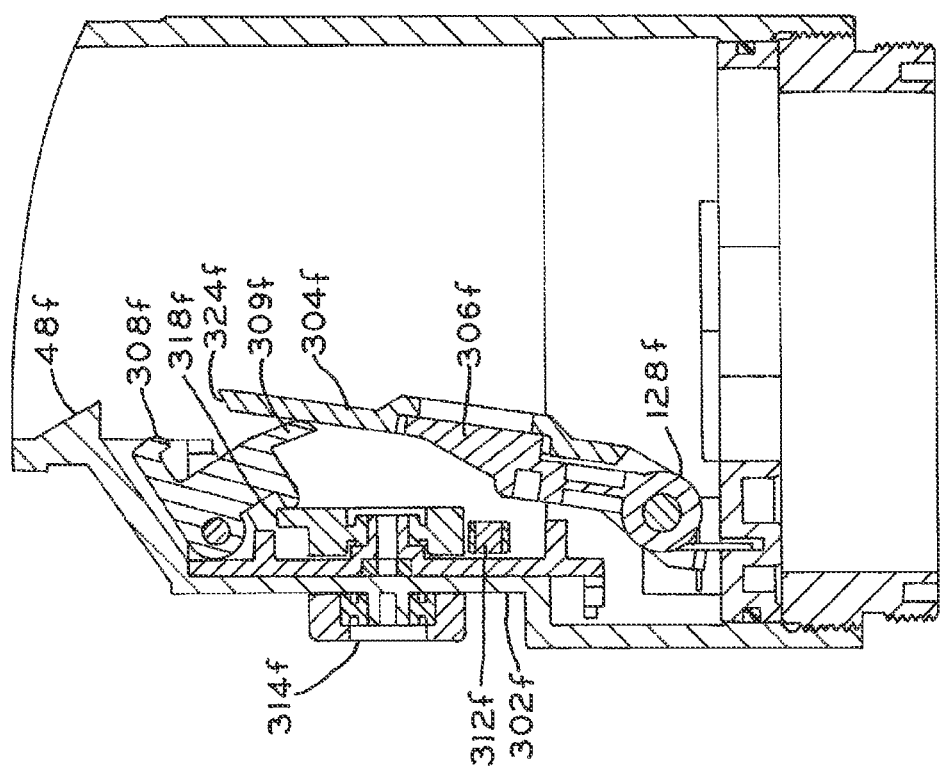

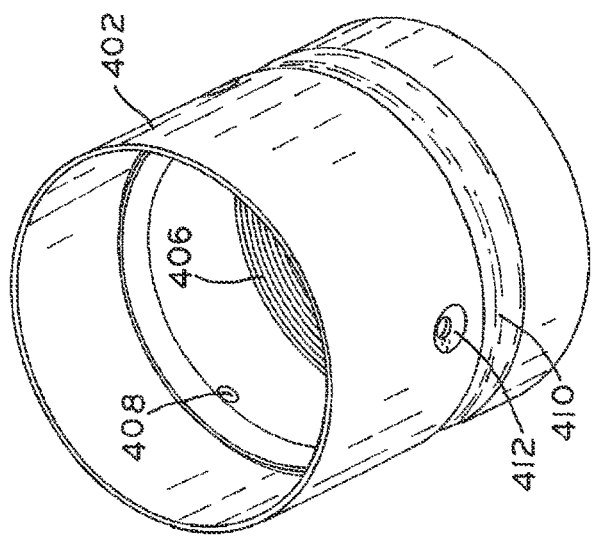
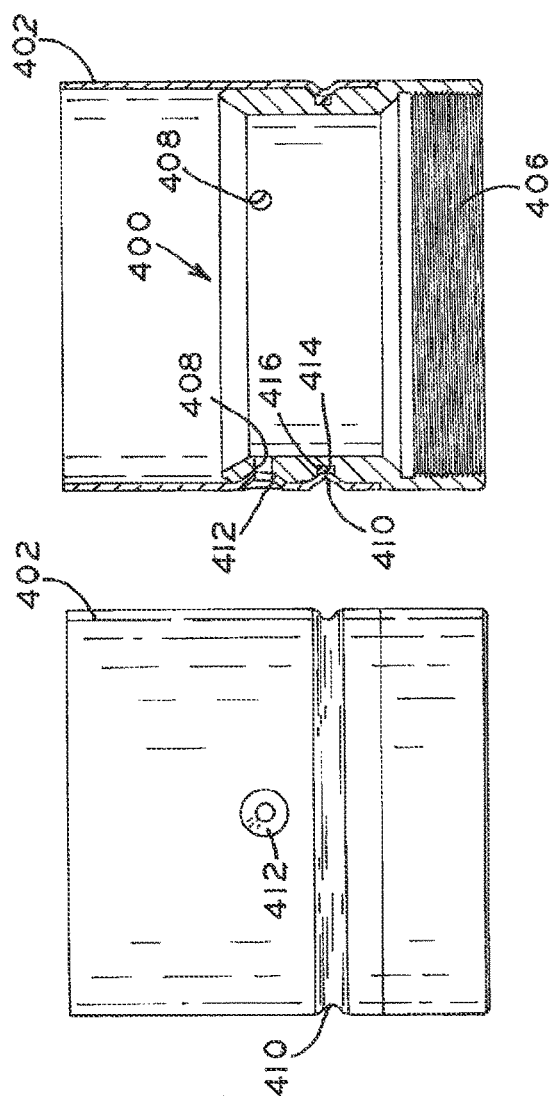

OVERFILL PREVENTION VALVE

BACKGROUND

This application claims priority under 35 U.S.C. 119(e) of U.S. Provisional Patent Application Ser. No. 61/701,347 filed on Sep. 14, 2012 and U.S. Provisional Patent Application Ser. No. 61/801,681 filed on Mar. 15, 2013, both entitled Overfill Prevention Valve, the entire disclosures of which are hereby incorporated by reference herein.

The present disclosure relates to drop tube segments and, more particularly, to drop tube segments providing access to a liquid reservoir while controlling the flow of liquid into the reservoir to prevent overfilling of the same.

Underground storage tanks are routinely utilized to store fuels such as gasoline, diesel fuel, ethanol, etc. for later dispensing to vehicles through fuel dispensers. The underground storage tank contains an inlet through which fuel is provided to the underground storage tank, typically by a tanker truck. A plurality of fuel dispensers are also fluidly connected to the underground storage tank and are utilized to provide the fuel contained therein to, e.g., passenger vehicles.

Typically, a riser pipe extends upwardly from the underground storage tank to a fill connection point contained within a sump at the fueling station. Within the riser pipe, a drop tube extends downwardly into the volume of the underground storage tank.

The drop tube extends toward the bottom of the underground storage tank so that the outlet end of the drop tube is covered by the motor fuel contained in the underground storage tank. Therefore, the drop tube is not in fluid communication with the fuel vapor contained in the ullage area of the underground storage tank. However, the overfill prevention valve is typically positioned much closer to the top of the underground storage tank and is therefore typically in fluid communication with the vapor contained in the ullage area of the underground storage tank.

When filling an underground storage tank, the operator of a tanker truck must be careful not to overfill the underground storage tank. To this end, an overfill prevention valve may be utilized to prevent overfilling of the underground storage tank. For example, an overfill prevention valve may utilize a float which is buoyant on a surface of a quantity of motor fuel and which is connected by a linkage to a valve positioned within a segment of a drop tube connecting a fill point to the underground storage tank. The linkage extends through the wall of the drop tube so that it can mechanically connect the float, which is outside of the drop tube, and the valve body, which is inside the drop tube.

Because the overfill prevention valves of prior art devices include a mechanical linkage connecting a float positioned on the exterior of the drop tube with a valve body positioned on the interior of the drop tube, the wall of the drop tube segment containing the overfill prevention valve must be physically penetrated by the linkage to allow for such a connection. This physical penetration of the wall of the drop tube segment containing the overfill prevention valve creates a leak point where vapor contained in the ullage space of the underground storage tank can enter into the drop tube. It is desirable to prevent vapor contained in the ullage space of the underground storage tank from entering into the interior of the drop tube where it could potentially be vented to the atmosphere.

SUMMARY

The present disclosure provides an overfill valve associated with a drop tube segment including a valve body positioned within the drop tube segment and a non-contact valve actuator positioned exterior to the drop tube segment and operable to actuate the valve body from an open position to a closed position without requiring any physical penetration through the wall of the drop tube segment. The non-contact valve actuator has a first position in which the non-contact valve actuator does not actuate the valve body from the open position to the closed position and a second position, achieved when the liquid reservoir reaches a predetermined level approaching the capacity of the liquid reservoir, the non-contact valve actuator actuating the valve body from the open position to a closed position when the non-contact valve actuator attains the second position.

In one form thereof, the present disclosure provides an overfill prevention valve including a conduit having a first end and a second end, a conduit wall spanning the first end of the conduit and the second end of the conduit, the conduit wall defining a conduit wall interior surface and a conduit wall exterior surface, the conduit wall interior surface defining a fluid path through the conduit from the first end of the conduit to the second end of the conduit; a valve body moveably positioned in the fluid passage of the conduit, the valve body moveable from an open position to a closed position; and a non-contact valve actuator moveable relative to the valve body and positioned outside of the conduit, the conduit wall interposed between the non-contact valve actuator and the fluid path, the non-contact valve actuator operable to actuate the valve body from the open position toward the closed position without physically penetrating the conduit wall, the non-contact valve actuator having a first position in which the non-contact valve actuator does not actuate the valve body from the open position toward the closed position and a second position in which the non-contact valve actuator actuates the valve body from the open position toward the closed position. In the open position, the valve body allows fluid to pass through the fluid path defined by the conduit at an expected fill rate. In certain embodiments, in the closed position, the valve body precludes flow through the fluid path defined by the conduit at the expected fill rate but may allow fluids to pass through the fluid path defined by the conduit at a decreased flow rate to allow drainage from a quantity of fluid positioned upstream of the valve body in the drop tube. In certain alternative embodiments, the valve body may comprise a butterfly valve, a flapper valve, and/or a poppet valve.

In alternative forms of the present disclosure, the overfill prevention valve may include a closure stop movably positioned in the fluid path of the conduit, the closure stop having a leak position and a non-leak position, with the valve body in the closed position and the closure stop in a leak position, a quantity of fluid is able to leak past the valve body. In one form of the present disclosure, the closure stop may take the form of a stop that prevents the valve body from fully seating against the associated valve. In alternative forms of the present disclosure, the closure stop may take the form of a secondary valve, such as poppet valve or flapper valve that opens to allow leakage past valve body in its closed position.

In certain alternative embodiments, the non-contact valve actuator may be operable to actuate the closure stop from the leak position to the non-leak position without physically penetrating the conduit wall, the non-contact valve actuator of this form of the disclosure having a third position in which the non-contact valve actuator actuates the closure stop from the leak position to the non-leak position, the non-contact valve actuator of this form of the present disclosure not actuating the closure stop from the leak position to the non-leak position in the first position and the second position.

In one form of the present disclosure, the non-contact valve actuator may comprise a float having a specific gravity less than about 0.7 so that the float is buoyant on a surface of a quantity of motor fuel, which typically has a specific gravity in the range of 0.72 to 0.89.

In certain forms of the present disclosure, the non-contact valve actuator may include an actuator magnet producing a magnetic field acting to urge the valve body from the open position toward the closed position when the non-contact valve actuator is positioned in the second position. In alternative forms of the present disclosure, a valve body magnet may be associated with the valve body so that the magnetic field produced by the actuator magnet acts on the valve body magnet to urge the valve body from the open position toward the closed position. Alternative forms of the present disclosure contemplate a magnetic repulsion between the non-contact valve actuator and the valve body to urge the valve body from the open position toward the closed position. Further alternative forms of the present disclosure contemplate a magnetic attraction between the non-contact valve actuator and the valve body to urge the valve body from the open position toward the closed position.

Valve bodies of the present disclosure may take the form of, e.g., butterfly valves or flapper valves.

In alternative forms of the present disclosure, a deflector plate may be provided upstream of the valve body, with the deflector plate sized and positioned to prevent a quantity of fluid flowing through the conduit from contacting the valve body when the valve body maintains the closed position.

In alternative forms of the present disclosure, the non-contact valve actuator may comprise a first float moveable from the first position to the second position, the first float operable to actuate the valve body from the open position toward the closed position when the first float achieves the second position, the non-contact valve actuator further comprising a second float moveable relative to the first float from a rest position to the third position, the second float operable to actuate the closure stop from the leak position to the non-leak position when the second float achieves the third position.

In certain forms of the present disclosure, the non-contact valve actuator may include a closure stop actuator magnet producing a magnetic field acting to urge the closure stop from the leak position to the non-leak position when the non-contact valve actuator is positioned in the third position. In alternative forms of the present disclosure, a closure stop magnet may be associated with the closure stop so that the magnetic field produced by the closure stop actuator magnet acts on the closure stop magnet to urge the closure stop from the leak position to the non-leak position. Alternative forms of the present disclosure contemplate a magnetic repulsion between the non-contact valve actuator and the closure stop to urge the closure stop from the leak position to the non-leak position. Further alternative forms of the present disclosure contemplate a magnetic attraction between the non-contact valve actuator and the closure stop to urge the closure stop from the leak position to the non-leak position.

In certain embodiments of the present disclosure, the closure stop may comprise a stop cam rotatably connected to the conduit wall, the stop cam supporting the valve body above its valve seat in the leak position, the stop cam allowing the valve body to fully engage its associated valve seat when the closure stop maintains the non-leak position.

In alternative forms of the present disclosure, the valve body may include a poppet valve, a poppet valve port, a poppet valve seat and a spring biasing the poppet valve into engagement with the poppet valve seat to close the poppet valve port, so that with the valve body in the closed position and the closure stop in the leak position, the closure stop actuates the poppet valve against a biasing force of the spring to space the poppet valve from the poppet valve seat and place the poppet valve port in fluid communication with the fluid path.

In certain forms thereof, the overfill prevention valve of the present disclosure can be utilized in combination with an underground storage tank and a drop tube extending into the underground storage tank, the overfill prevention valve forming a part of the drop tube, the drop tube in fluid communication with the underground storage tank so that fluid passing through the drop tube fills the underground storage tank.

In another form thereof, the present disclosure provides an overfill prevention valve including a conduit having a first end and a second end, a conduit wall spanning the first end of the conduit and the second end of the conduit, the conduit wall defining a conduit wall interior surface and a conduit wall exterior surface, the conduit wall interior surface defining a fluid path through the conduit from the first end of the conduit to the second end of the conduit; a valve body moveably positioned in the fluid path of the conduit, the valve body moveable from an open position to a closed position; and a valve actuator means for actuating the valve body from the open position toward the closed position while the valve actuator means is positioned outside of the fluid path of the conduit and without physically penetrating the wall. In alternative forms of the present disclosure, the valve actuator means may comprise a means for generating a magnet field for actuating the valve body from the open position toward the closed position. Further, the valve actuator means may comprise a float having a specific gravity of less than 0.7 so that the float is buoyant on a surface of a quantity of motor fuel, which typically has a specific gravity in the range of 0.72 to 0.89. In alternative forms of the present disclosure, the overfill prevention valve may further include leak means for selectively allowing a quantity of fluid to leak past the valve body when the valve body is in the closed position and a leak actuator means for actuating the leak means from a leak position in which the leak means allows the quantity of fluid to leak past the valve body to a non-leak position in which the leak means does not allow the quantity of fluid to leak past the valve body.

In yet another form thereof, the present disclosure provides an overfill prevention valve including a conduit having a first end and a second end, a conduit wall spanning the first end of the conduit and the second end of the conduit, the conduit wall defining a conduit wall interior surface and a conduit wall exterior surface, the conduit wall interior surface defining a fluid path through the conduit from the first end of the conduit to the second end of the conduit; a valve body moveably positioned in the fluid path of the conduit, the valve body moveable from an open position to a closed position; and a magnetic valve actuator moveable relative to the valve body and positioned outside of the conduit, the conduit wall interposed between the magnetic valve actuator and the fluid path, the magnetic valve actuator operable to actuate the valve body from the open position toward the closed position without physically penetrating the wall, the magnetic valve actuator having a first position in which the magnetic valve actuator does not actuate the valve body from the open position toward the closed position and a second position in which the magnetic valve actuator actuates the valve body from the open position toward the closed position.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein:

FIG. 1 is a representation of a fueling station showing a tanker truck filling an underground storage tank;

FIG. 2 is a perspective view of a drop tube segment in accordance with the present disclosure;

FIG. 3 is a plan view of the drop tube segment of FIG. 2;

FIGS. 21, 23, 25, 27, 29 and 31 are all partial, radial elevational views of the drop tube illustrated in FIG. 19, illustrating various stages of actuation of the associated valve structure;

FIGS. 22, 24, 26, 28, 30 and 32 are all sectional views of the drop tube segment illustrated in FIG. 19, taken along line A-A of FIG. 19, illustrating various stages of actuation of the associated valve structure;

FIG. 32a is a radial elevational view of an alternative embodiment drop tube segment of the present disclosure;

FIGS. 33, 34a, 36, 37a, and 38a are all sectional views of the drop tube segment illustrated in FIG. 32a, taken along line D-D of FIG. 32a;

FIGS. 34, 35, 37, 38, 39, 40, 41 and 42 are all sectional views taken along the plane of the page of FIG. 32a;

FIG. 43 is a top plan view of an alternative embodiment drop tube segment of the present disclosure;

FIG. 43a is a radial elevational view of the drop tube segment illustrated in FIG. 43;

FIGS. 44, 45, 46, 47, 48, 49 and 50 are all sectional views of the drop tube segment illustrated in FIG. 43, taken along line A-A of FIG. 43;

FIG. 47a is an orthogonal cross-sectional view of FIG. 47;
FIG. 57 is a radial elevational view of a drop tube and drop tube adaptor of the present disclosure;
FIG. 58 is a cross-sectional view of the drop tube and the drop tube adaptor illustrated FIG. 57;
and
FIG. 59 is a perspective view of the drop tube adaptor and drop tube illustrated in FIGS. 57 and 58.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 4:
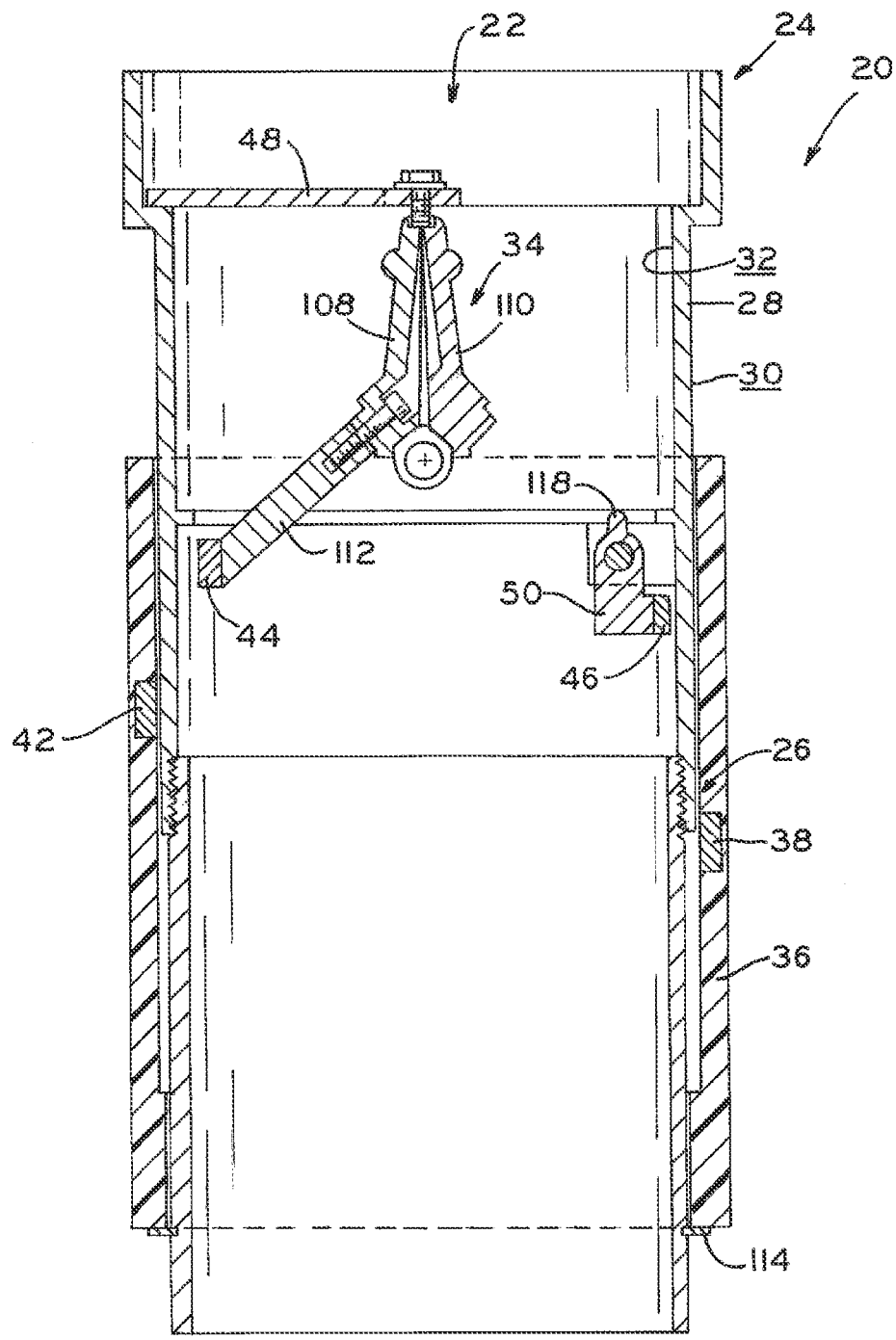
FIG. 4 is a cross-sectional view of the drop tube segment of FIG. 2.

FIG. 4 illustrates drop tube segment 20 in accordance with an exemplary embodiment of the present disclosure. Drop tube segment 20 includes conduit 22 spanning first end 24 and second end 26 of conduit 22. Conduit wall 28 defines conduit wall interior surface 32 which defines a fluid path through conduit 22 from first end 24 to second end 26. Valve body 34 is moveably positioned in the fluid path of conduit 22 and moveable from the open position illustrated in FIG. 4 to a closed position such as the one illustrated in FIG. 6. Non-contact valve actuator 36 is moveable relative to valve body 34 and positioned outside of conduit 22, with conduit wall 28 interposed between non-contact valve actuator 36 and the fluid path defined by conduit wall interior surface 32. Non-contact valve actuator 36 is operable to actuate valve body 34 from the open position illustrated in FIG. 4 to a closed position such as the one illustrated in FIG. 6 without physically penetrating conduit wall 28. Operation of non-contact valve actuator 36 will be further described herein below.

FIG. 1 illustrates an exemplary utilization of drop tube segment 20 in the context of a fueling station. As illustrated in FIG. 1, a fueling station may include underground storage tank 94 having riser pipe 100 extending upwardly therefrom and drop tube 98 extending through riser pipe 100 and into the storage space of underground storage tank 94. Tanker truck 102 can be fluidly connected to underground storage tank 94 by fill hose 104 so that the contents of tanker truck 102 can be deposited in underground storage tank 94. Drop tube segment 20 of the present disclosure can be utilized as described in detail below to limit the amount of fuel deposited by tanker truck 102 into underground storage tank 94. The contents of underground storage tank 94 can then be accessed by fuel dispenser 106 for dispensing to end users in, e.g., passenger vehicles and the like.

The remainder of this detailed description will describe use of the overfill prevention valve of the present disclosure with respect to a fueling station; however, use of the drop tube segments of the present disclosure are not limited to fueling station installations. The overfill prevention valve of the present disclosure is generally useable in connection with any fluid reservoir into which a drop tube extends.

Figure 6:
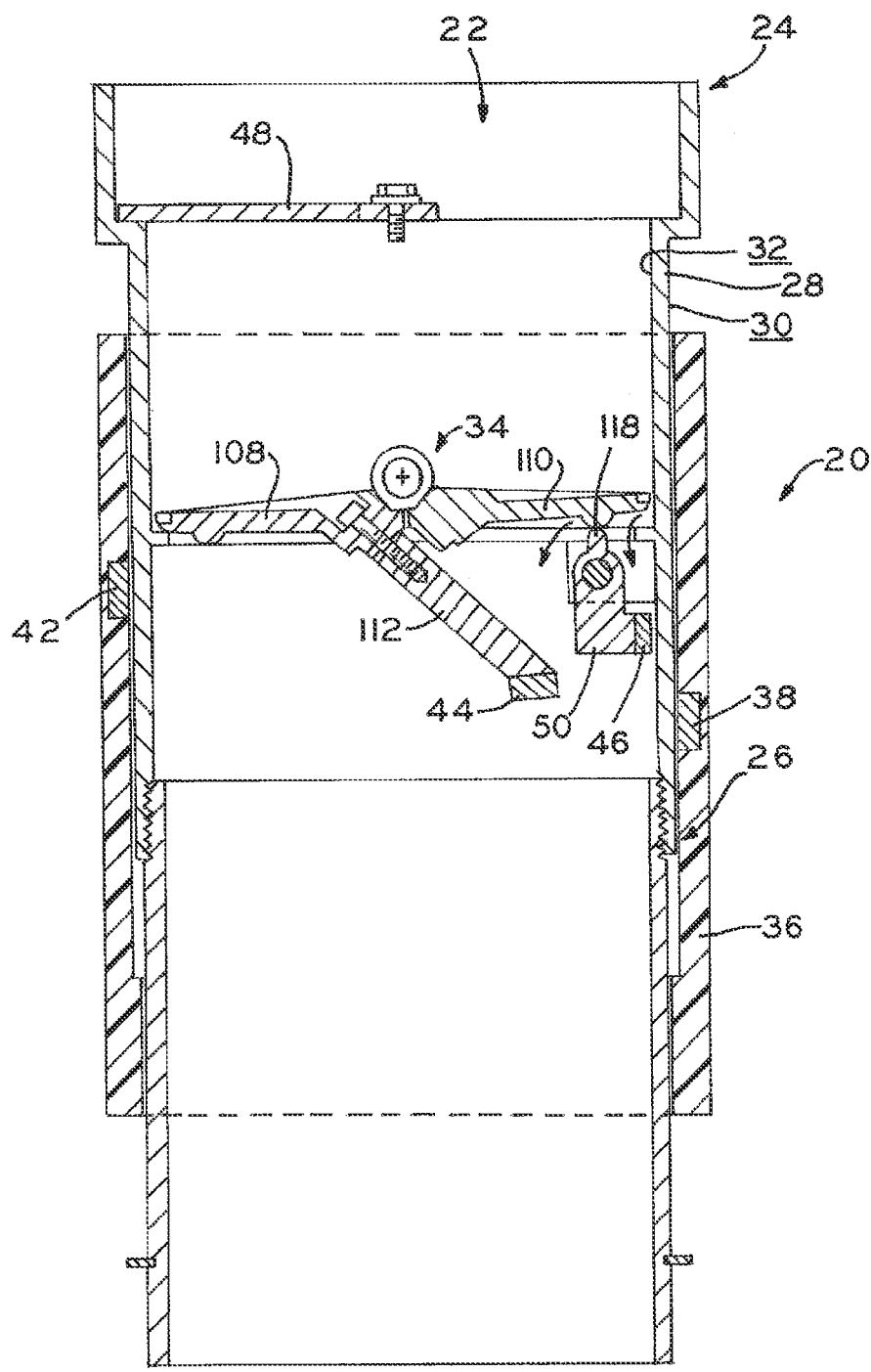
FIG. 6 is a cross-sectional view of the drop tube segment of FIG. 2 illustrating the valve body in a closed position and the closure stop in a leak position.

Referring to FIG. 6, valve body 34 is illustrated in a closed position in which a small amount of flow can pass valve body 34. When valve body 34 maintains the open position illustrated in FIG. 4, conduit 22 is sufficiently open to allow passage of fuel at a normal fill rate. For applications in standard configurations this fill rate is generally in the range of 300-500 gallons per minute (gpm). In certain embodiments, the maximum rated flow past valve body 34 in its open position is 400-450 gpm. In alternative configurations, the flow rate will be about 370 gpm. In applications with remote filling capability, the standard flow rate may be as low as 25 gpm. These flow rates are applicable to all of the embodiments described in this document. With valve body 34 in the open position as illustrated in FIG. 4, the maximum fill rate is accommodated by conduit 22. In the closed position illustrated in FIG. 6, the maximum fill rate is not allowed and, if filling at such a rate were to continue, the portion of drop tube 98 upstream of valve body 34 would fill with a column of fluid. The actuation mechanism which causes valve body 34 to move from the open position illustrated in FIG. 4 to the closed position illustrated in FIG. 6 (which will be described in more detail hereinbelow) causes rapid closing of valve body 34, causing the fluid column upstream of valve body 34 to produce a line shock which will cause fill hose 104 to jump, which is typically referred to as "hose kick" in the fueling industry. Hose kick alerts the driver to close the delivery valve on the delivery truck and discontinue filling the fuel tank.

With valve body 34 closed as illustrated in FIG. 6, but with closure stop 50 preventing full seating of valve body 34 against its valve seat, the column of fuel upstream of valve body 34 in drop tube 98 will slowly leak past valve body 34, allowing fill hose 104 to drain so that it can be properly disconnected from the fill port connected to underground storage tank 94. Valve body 34 is said to be in a "closed" position when it disallows passage of fluid at the maximum fill rate associated with underground storage tank 94. In such a position, a small amount of flow past valve body 34 may be allowed as described above. In embodiments of the present disclosure, the "leak" flow rate will be about 10% (or less) of the maximum rated flow discussed above. For example, a valve having maximum rated flow of 400 gpm will have a leak flow rate of 40 gpm or less. Any time this document refers to a leak flow rate or a leak condition, such reference is to a flow rate of about 10% or less of the maximum rated flow of the conduit. Even with the "leak" flow eliminated, as described herein with respect to the various embodiments, a "drain" rate of about 2% or less of the maximum flow rate may be allowed to pass the valve bodies of certain embodiments of the present disclosure. In alternative embodiments, the "drain" rate may be about 0.66 GPM or less. Similarly, any time a "drain" flow rate is mentioned in this document, it signifies a flow rate of about 2% or less of the maximum flow rate. In alternative embodiments of the present disclosure, each and every embodiment disclosed herein may incorporate a drain flow rate, although such incorporation is not necessary with respect to all embodiment disclosed herein.

Referring to FIGS. 2-7, the functional details of an exemplary overflow prevention valve in accordance with the present disclosure will now be described. Referring to FIG. 4, valve body 34 is pivotally connected relative to drop tube segment 20. In an exemplary embodiment, valve body 34 may be pivotally connected by a rod connected to conduit wall interior surface 32 and spanning conduit 22 of drop tube segment 20. In the embodiment illustrated in FIGS. 2-7, valve body 34 comprises a butterfly valve having valve halves 108, 110 pivotally connected relative to drop tube segment 20. Valve halves 108, 110 can be biased into the open position illustrated in FIG. 4, e.g., by a torsion spring. Arm 112 extends from valve half 108 and carries valve body magnet 44. With underground storage tank 94 filled to less than its capacity, tanker truck 102 can be utilized to provide additional motor fuel to underground storage tank 94. As underground storage tank 94 nears capacity, non-contact valve actuator 36 will actuate valve body 34 from the open position illustrated in FIG. 4 toward the closed position illustrated in FIG. 6.

Drop tube segment 20 includes non-contact valve actuator 36 positioned about conduit wall exterior surface 30, with conduit wall 28 interposed between and physically separating non-contact valve actuator 36 from valve body 34. As will be described hereinbelow, non-contact valve actuator 36 is capable of actuating valve body 34 from the open position illustrated in FIG. 4 to a closed position such as the one illustrated in FIG. 6 without physically penetrating conduit wall 28. In the exemplary embodiment illustrated in FIGS. 2-7, non-contact valve actuator 36 comprises a hollow cylinder sized to fit about and surround conduit wall exterior surface 30. Non-contact valve actuator 36 rests against stop 114 when the upper level of the fuel filling underground storage tank 94 is positioned below non-contact valve actuator 36. Upward travel of non-contact valve actuator 36 may similarly be limited by, e.g., stop 116 (FIG. 2). Stop 116 may also key non-contact valve actuator 36 to conduit wall exterior surface 30 to prohibit relative rotation between non-contact valve actuator 36 and conduit wall exterior surface 30.

Figure 5:
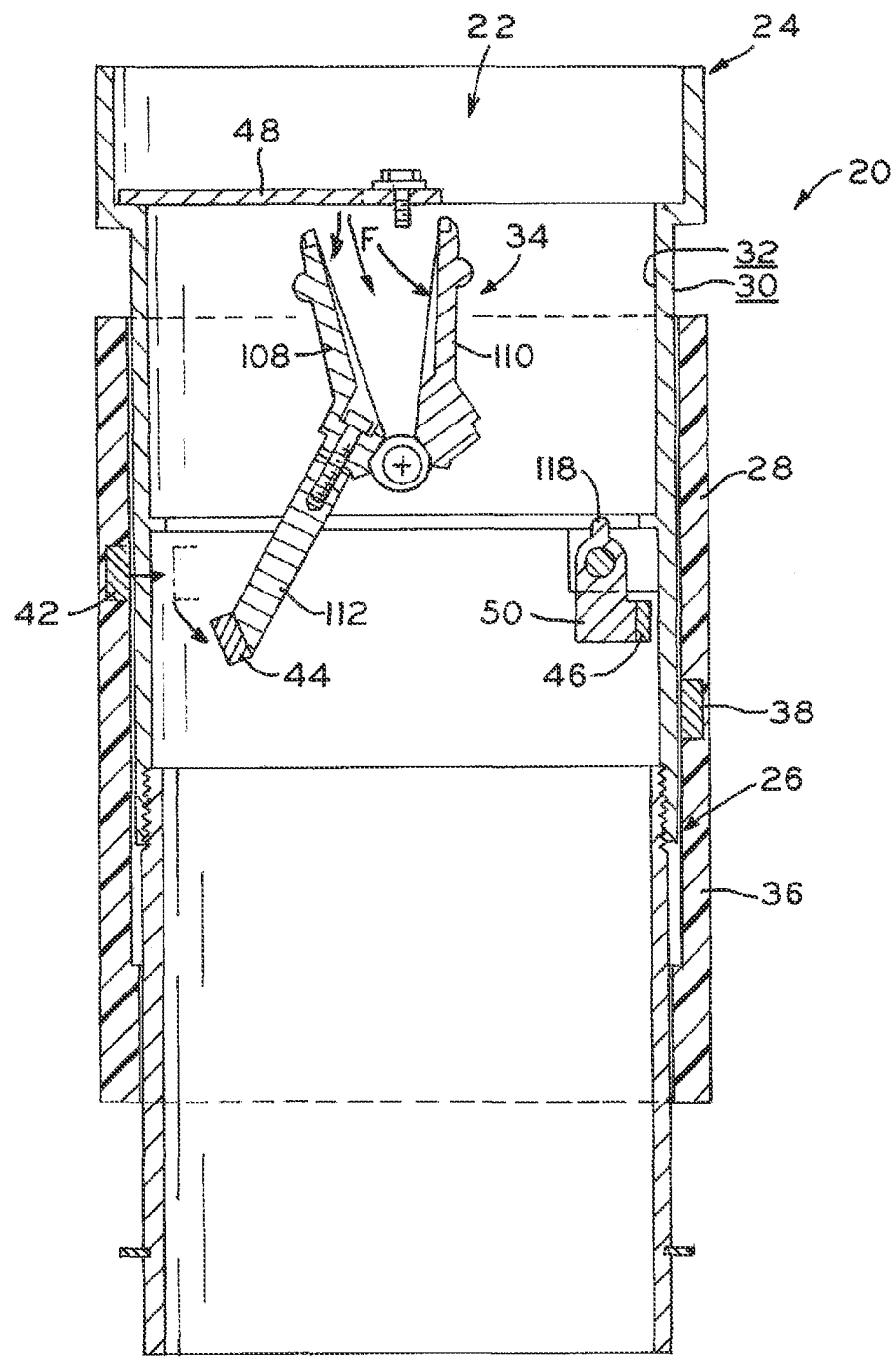
FIG. 5 is a cross-sectional view of the drop tube segment of FIG. 2 illustrating actuation of the valve body from an open position to a closed position.

Non-contact valve actuator 36 comprises a float having buoyancy characteristics such that it is buoyant on a surface of motor fuel. In one exemplary embodiment, float 36 has a specific gravity less than 0.7 so that it is buoyant on a surface of a quantity of motor fuel. As the liquid level in underground storage tank 94 rises, the top surface of fuel contained in underground storage tank 94 will encounter float 36. In one exemplary embodiment, when underground storage tank 94 achieves a liquid level corresponding to underground storage tank 94 being about 90% full, float 36 will travel upwardly until valve actuator magnet 42 is aligned with valve body magnet 44. Alternative configurations of the present disclosure will include valve actuators that actuate the primary valve at about 90%. This position of float 36 is illustrated in FIG. 5, which also illustrates valve body magnet 44 moving from the at rest position illustrated in FIG. 4 to an actuated position, as illustrated in FIG. 5. In this exemplary embodiment, valve actuator magnet 42 repels valve body magnet 44 to actuate valve body 34 from the open position illustrated in FIG. 4 toward the closed position illustrated in FIG. 6. In the open position illustrated in FIG. 4, valve body 34 is shielded from contact by fluid passing through conduit 22 by deflector 48. As illustrated in FIG. 3, deflector 48 covers valve halves 108, 110 and arm 112 when valve body 34 maintains the open position illustrated in FIGS. 3 and 4.

As float 36 rises and brings valve actuator magnet 42 into alignment with valve body magnet 44, valve body magnet 44 causes valve half 108 to rotate from the open position illustrated in FIG. 4 to an intermediate position as illustrated in FIG. 5. In this position, flow F of fluid passing through conduit 22 can contact the upper surface of valve half 108. A portion of this flow is deflected from the upper surface of valve half 108 onto the upper surface of valve half 110. Flow F in the valve position illustrated in FIG. 5 causes valve halves 108 to move against the biasing force of the torsion spring acting to bias valve halves 108, 110 into the open position illustrated in FIG. 4 until valve halves 108, 110 achieve the closed position illustrated in FIG. 6. As described above, when valve body 34 maintains the closed position illustrated in FIG. 6, the maximum fill rate associated with underground storage tank 94 can no longer pass valve body 34. Further, the column of fluid maintained in the portion of drop tube 98 upstream from valve body 34 maintains valve body 34 in the closed position illustrated in FIG. 6. If filling is halted, the column of fluid upstream of valve body 34 will eventually drain past valve body 34 in the leak position (described in greater detail below) and valve body 34 will be returned by the biasing force of the torsion spring to its at rest position, as illustrated, e.g., in FIG. 4. As the volume of fuel contained in underground storage tank 94 continues to rise, as fluid passes valve body 34 in the leak position illustrated in FIG. 6, float 36 will continue to rise until closure stop actuator magnet 38 aligns with closure stop magnet 46 as illustrated in FIG. 7.

Figure 7:
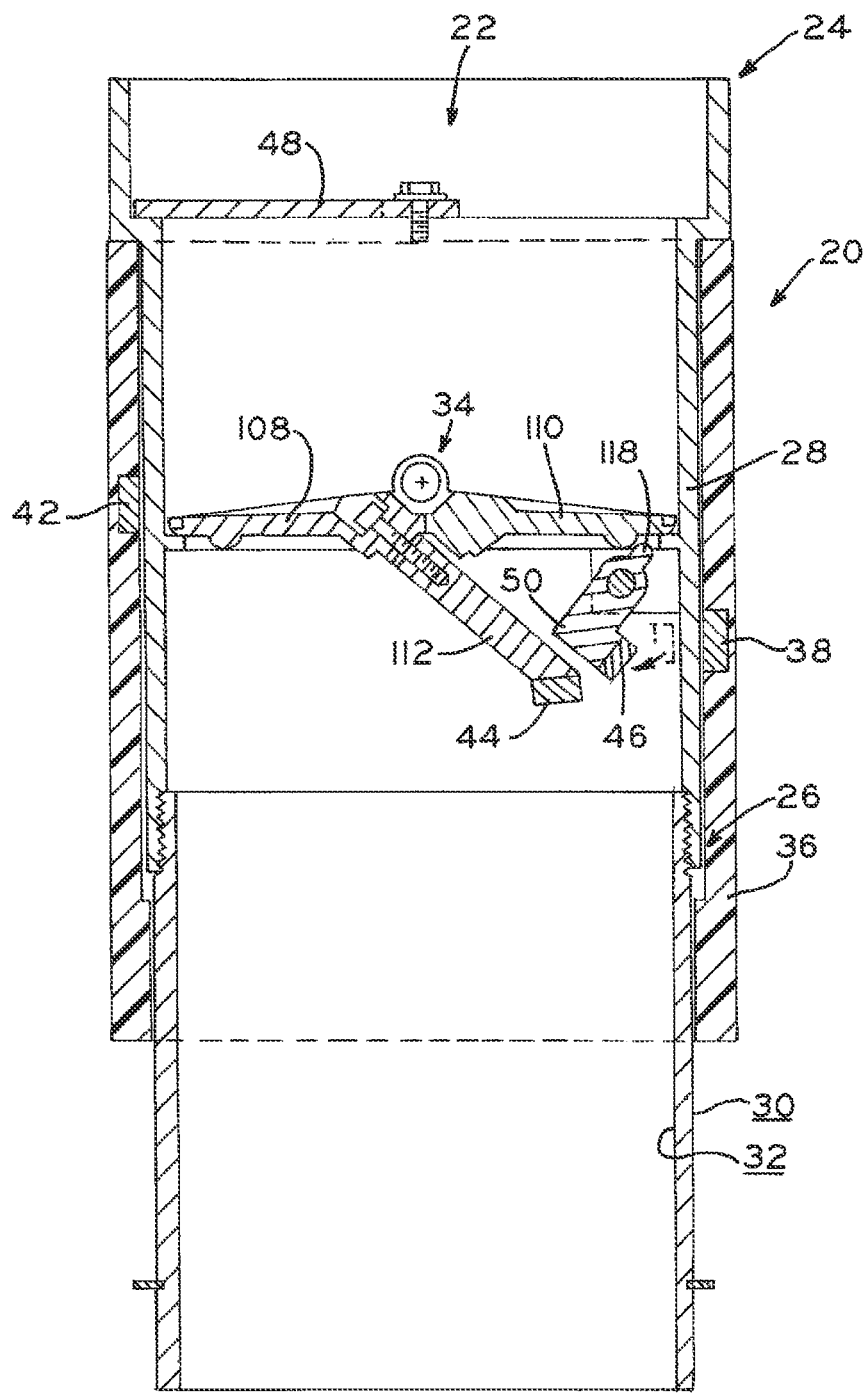
FIG. 7 is a cross-sectional view of the drop tube segment of FIG. 2 illustrating movement of the closure stop from the leak position to the non-leak position.

Closure stop 50, in the exemplary embodiment illustrated in FIGS. 2-7, comprises a rotatable cam having cam extension 118 extending therefrom. With cam extension 118 positioned as illustrated in FIG. 6, cam extension 118 prevents valve half 110 of valve body 34 from fully seating against its associated valve seat. As closure stop 50 is actuated from its at rest position as illustrated in FIG. 6, it is moved out of contact with valve half 110 and the weight of the column of fuel positioned upstream of valve body 34 causes valve half 110 to fully seat against its associated valve seat, as illustrated in FIG. 7. In this position, valve body 34 is designed to prevent flow through conduit 22. In one exemplary embodiment, float 36 will rise into the position causing actuation of closure stop 50 when underground storage tank is 95% full.

As fuel is drawn out of underground storage tank 94 by fuel dispenser 106, float 36 will return to a position in which it is no longer operable to actuate closure stop 50 and fluid will leak past valve body 34 until the column of fluid upstream of valve body 34 is depleted and valve body 34 returns to the normally biased position illustrated in FIG. 4.

In the exemplary embodiment illustrated in FIG. 2-7, closure stop actuator magnet 38 repels closure stop magnet 46 to cause actuation of closure stop 50. Closure stop 50 may be biased into the at rest position illustrated in FIGS. 4-5 by, e.g., gravity and/or a torsion spring. Magnets 38, 42, 44 and 46 may be any form of ferromagnetic material and/or any other item possessing magnetic qualities. Generally, "magnet" as used in this document is meant to denote any item having the ability to repel and/or attract another item through the use of a magnetic field.

Figure 8:
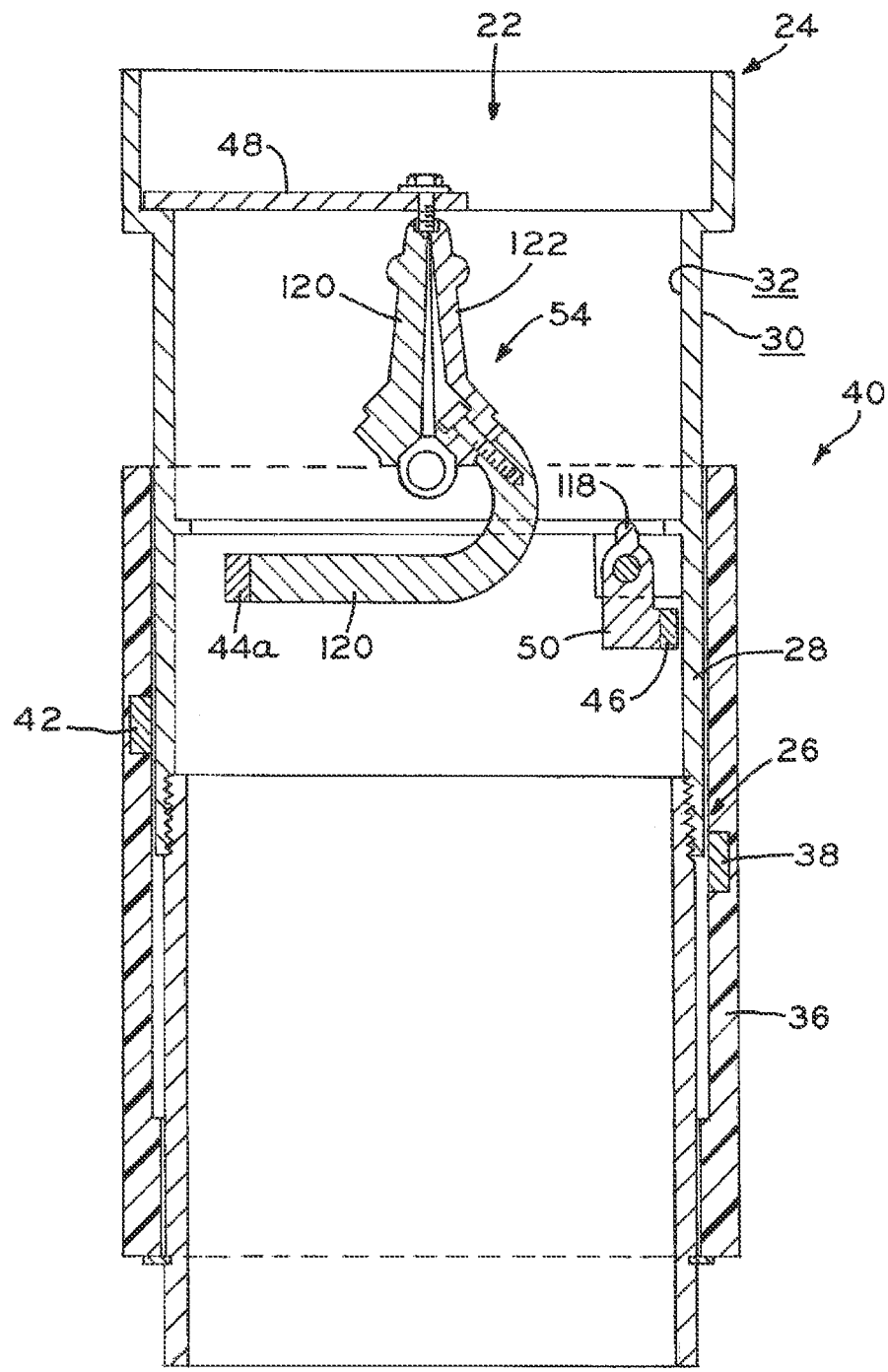
FIG. 8 is an illustration of an alternative embodiment drop tube segment utilizing a magnetic attraction to actuate the valve body from an open position to a closed position.

While the embodiment illustrated in FIGS. 2-7 uses magnetic repulsion to actuate valve body 34 and closure stop 50, the present disclosure also contemplates use of magnetic attraction to actuate the valve body and closure stop. For example, FIG. 8 illustrates an alternative embodiment valve body 54 comprised of valve halves 120, 122, with arm 112 extending from valve half 122. In this embodiment, valve actuator magnet 42 and valve body magnet 44A are configured so that with valve actuator magnet 42 positioned proximate to valve body magnet 44 similar to the position of the previous embodiment illustrated in FIG. 5, valve actuator magnet 42 will attract valve body magnet 44A and cause actuation of valve body 54 in a similar manner to that described above with respect to the embodiment illustrated in FIGS. 2-7. In this embodiment, closure stop 50 is identical to the closure stop associated with the embodiment illustrated in FIGS. 2-7 and is not described in detail here for the sake of brevity.

Figure 9:
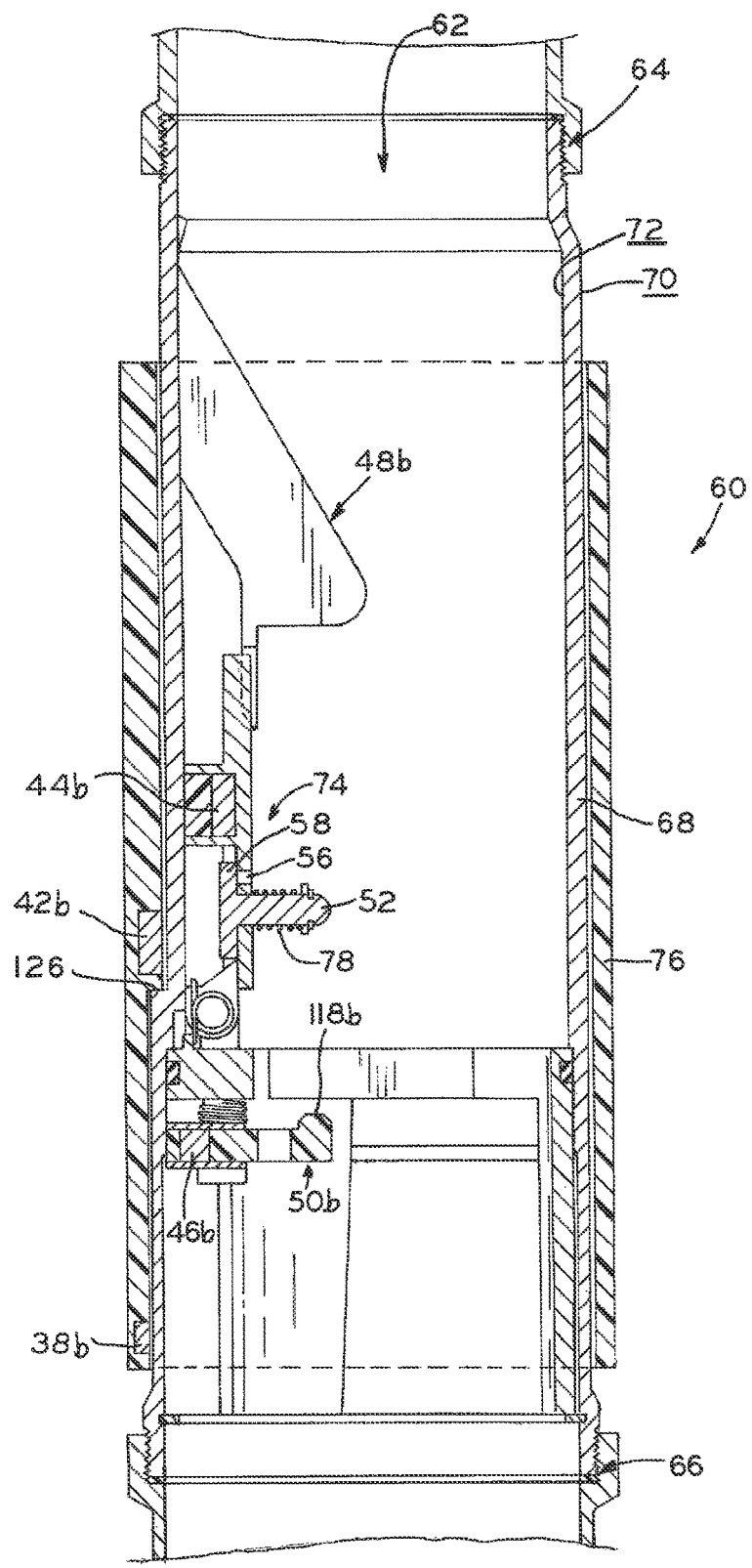
FIG. 9 is a cross-sectional view of an alternative embodiment drop tube segment utilizing a flapper valve.
Figure 10:
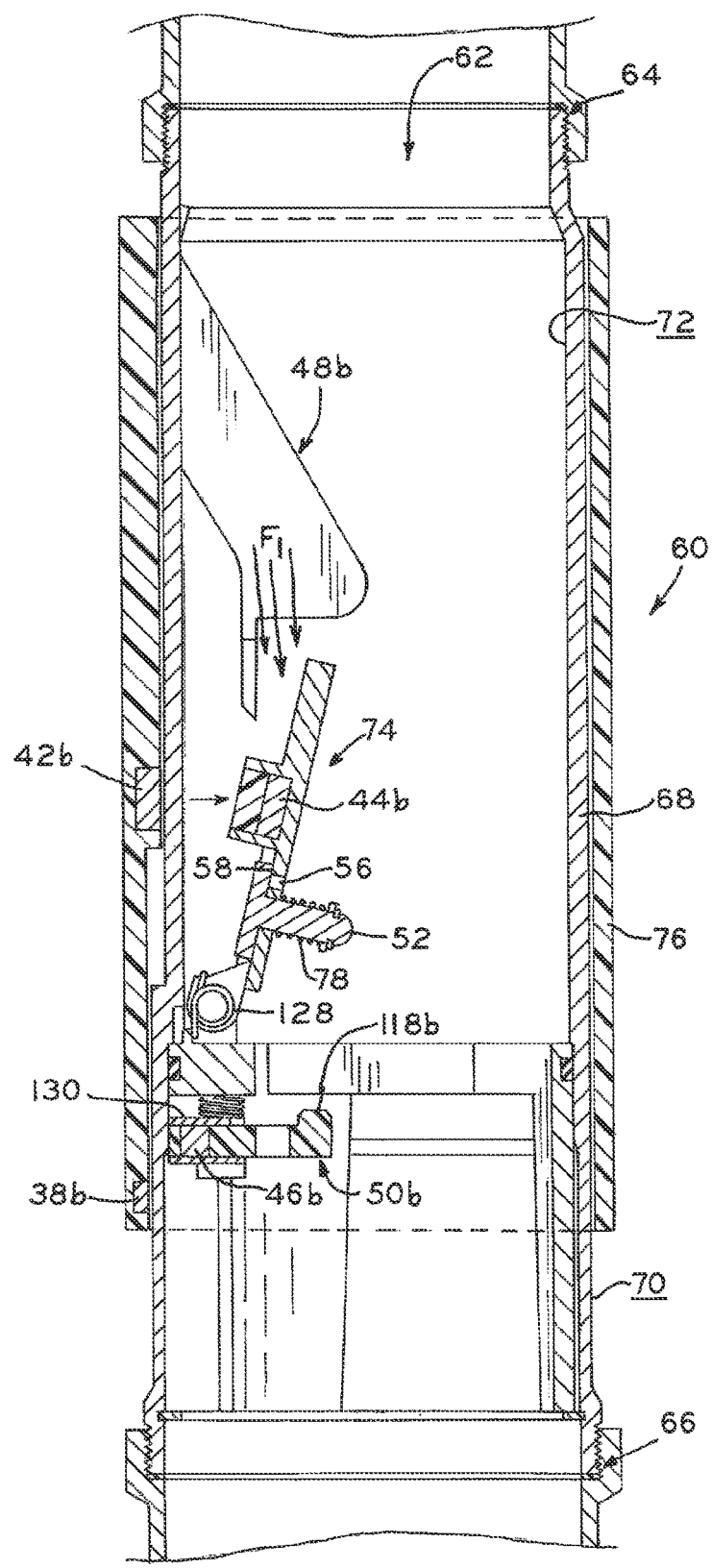
FIG. 10 is a cross-sectional view of the drop tube segment of FIG. 9 illustrating actuation of the flapper valve from an open position toward a closed position.
Figure 11:
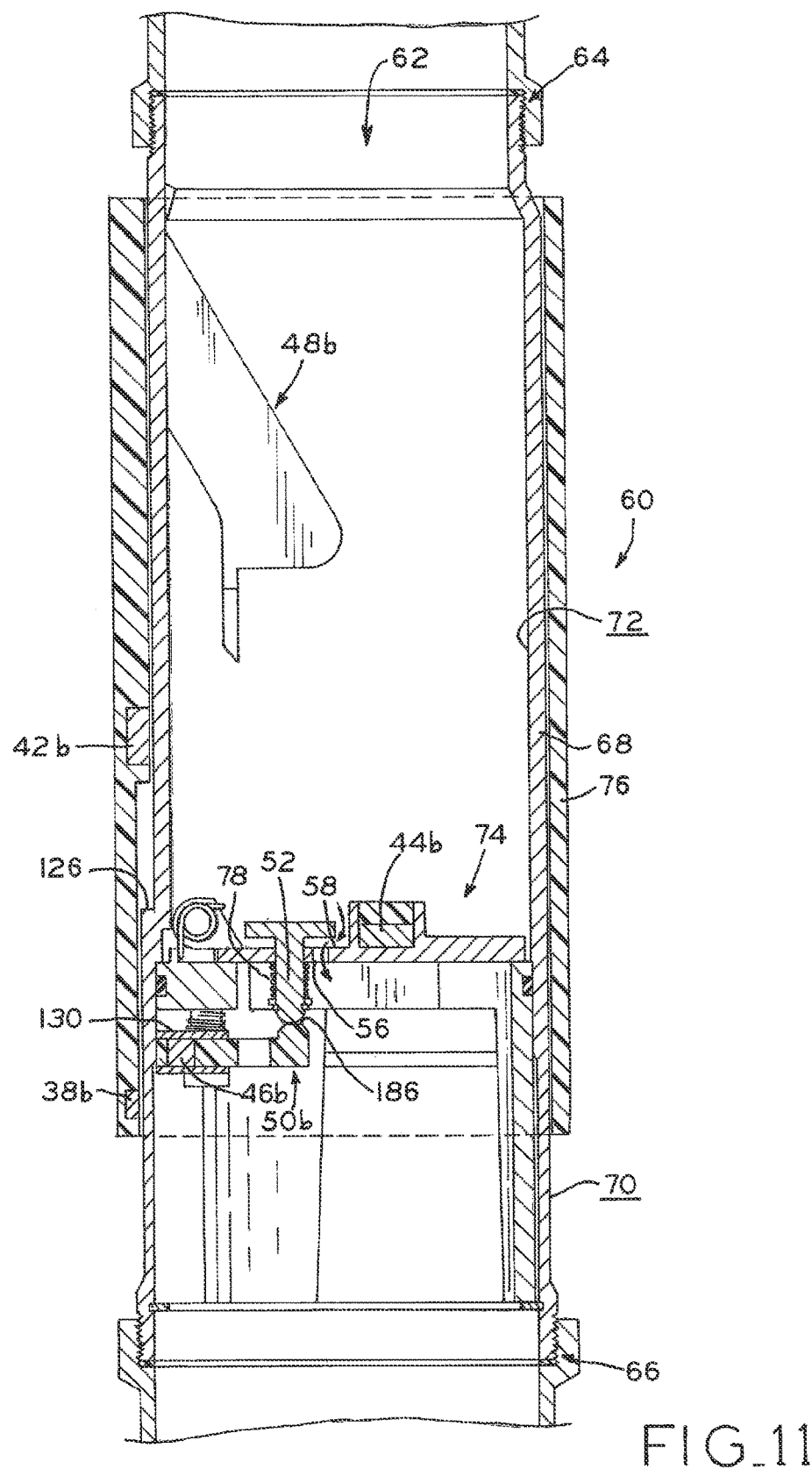
FIG. 11 is a cross-sectional view of the drop tube segment of FIG. 9 illustrating the valve body in the closed position and the closure stop in the leak position.

FIGS. 9-13 illustrate an alternative embodiment overfill prevention valve in accordance with the present disclosure. Referring to FIG. 11, valve body 74 is illustrated in a closed position, with poppet valve 52 (which will be described in further detail below) in an open position. In this configuration, a small amount of flow can pass valve body 74. When valve body 74 maintains the open position illustrated in FIG. 9, conduit 62 is sufficiently open to allow passage of fuel at a normal fill rate. As described above, for applications in standard configurations, this fill rate is generally in the range of 300 to 500 gpm. In applications with remote filling capability, the standard flow rate may be as low as 25 gpm. With valve body 74 in the open position illustrated in FIG. 9, the maximum fill rate is accommodated by conduit 62. In the closed position illustrated in FIG. 11, and with poppet valve 52 open, the maximum fill rate is not allowed and, if filling at such a rate were to continue, the portion of drop tube 98 upstream of valve body 74 would fill with a column of fluid. The actuation mechanism which causes valve body 74 to move from the open position illustrated in FIG. 9 to the closed position illustrated in FIG. 11 (which will be described in more detail below) causes rapid closing of valve body 74, causing the fluid column upstream of valve body 34 to produce a line shock causing hose kick as described above.

With valve body 74 closed as illustrated in FIG. 11, but with poppet valve 52 open, the column of fuel upstream of valve body 74 in drop tube 98 will slowly leak past valve body 74, allowing fill hose 104 to drain so that it can be properly disconnected from the fill port connected to underground storage tank 94. Valve body 74 is said to be in a "closed" position when it disallows passage of fluid at the maximum fill rate associated with underground storage tank 94. In this exemplary embodiment, the closed position is achieved when valve body 74 is fully seated against its associated valve seat. The closed condition of valve body 74 may be associated with an open condition of poppet valve 52 or a closed condition of poppet valve 52, the operation of which will be further described below.

Referring to FIG. 9, valve body 74 is pivotally connected relative to drop tube segment 60. In an exemplary embodiment, valve body 74 may be pivotally connected by a rod connected to conduit wall interior surface 72. In the embodiment illustrated in FIGS. 9-14, valve body 74 comprises a flapper valve. Flapper valve 74 can be biased into the open position illustrated in FIG. 9, e.g., by a torsion spring. Secured to the body of flapper valve 74 is valve body magnet 44*b*. With underground storage tank 94 filled to less than its capacity, tanker truck 102 can be utilized to provide additional motor fuel to underground storage tank 94 (FIG. 1). As underground storage tank 94 nears capacity, non-contact valve actuator 76 will actuate valve body 74 from the open position illustrated in FIG. 9 toward the closed position illustrated in FIG. 11.

Similar to the embodiment illustrated in FIGS. 2-9, drop tube segment 60 includes non-contact valve actuator 76 positioned about conduit wall exterior surface 70, with conduit wall 68 interposed between and physically separating non-contact valve actuator 76 from valve body 74. As described in detail below, non-contact valve actuator 76 is capable of actuating valve body 74 from the open position illustrated in FIG. 9 to a closed position such as the one illustrated in FIG. 11, without physically penetrating conduit wall 68. Similar to non-contact valve actuator 36 described above, non-contact valve actuator 76 comprises a hollow cylinder sized to fit about and surround conduit wall exterior surface 70. Non-contact valve actuator 76 rests atop stop 126 when the upper level of the fuel filling underground storage tank 94 is positioned below non-contact valve actuator 76. Upward travel of non-contact valve actuator 76 may similarly be limited by, e.g., stop 124.

Similar to non-contact valve actuator 36, non-contact valve actuator 76 comprises a float having buoyancy characteristics such that it is buoyant on a surface of motor fuel. In one exemplary embodiment, float 36 has a specific gravity less than 0.7 so that it is buoyant on a surface of a quantity of motor fuel. As the liquid level in underground storage tank 94 rises, the top surface of fuel contained in underground storage tank 94 will encounter float 76. In one exemplary embodiment, when underground storage tank 94 achieves a liquid level corresponding to underground storage tank 94 being about 90% full, float 76 will travel upwardly until valve actuator magnet 42b is aligned with valve body magnet 44b. This position of float 36 is illustrated in FIG. 10, which also illustrates valve body magnet 44b moving from the at rest position illustrated in FIG. 9 to an actuated position as illustrated in FIG. 10. In this exemplary embodiment, valve actuator magnet 42b repels valve body magnet 44b to actuate valve body 74 from the open position illustrated in FIG. 9 toward the closed position illustrated in FIG. 10.

In the open position illustrated in FIG. 9, valve body 74 is not susceptible to actuation from the open position illustrated in FIG. 9 toward the closed position illustrated in FIG. 10 by a flow of liquid traversing conduit 62. Valve body 74 is at least partially shielded from contact by fluid passing through conduit 62 by deflector 48b. Deflector 48b comprises a number of vanes oriented along the longitudinal axis of conduit 64 and further comprises a plate extending transverse the longitudinal axis of conduit 62 and positioned upstream of valve body 74 when valve body 74 maintains the open position illustrated in FIG. 9. With valve body 74 is the open position illustrated in FIG. 9, deflector 48b shields valve body 74 from a flow of fluid through conduit 62. Deflector 48b as well as deflector 48 described above, not only provide a shield to prevent a quantity of fluid flowing through the conduit from contacting the valve body, but also create an impediment to accidentally contacting the valve body with an implement such as a dipstick which may be inserted through drop tube 98 to determine the level of fluid in underground storage tank 94.

As float 76 rises and brings valve actuator magnet 42b into alignment with valve body magnet 44b, valve body magnet 44b causes valve body 74 to rotate from the open position illustrated in FIG. 9 to an intermediate position as illustrated in FIG. 10. In this position, flow $F_1$ of fluid passing through conduit 62 can contact the upper surface of valve body 74. Flow $F_1$ in the valve position illustrated in FIG. 10 causes valve body 74 to move against biasing force of torsion spring 128, which acts to bias valve body 74 into the open position illustrated in FIG. 9, until valve body 74 achieves the closed position illustrated in FIG. 11.

Figure 12:
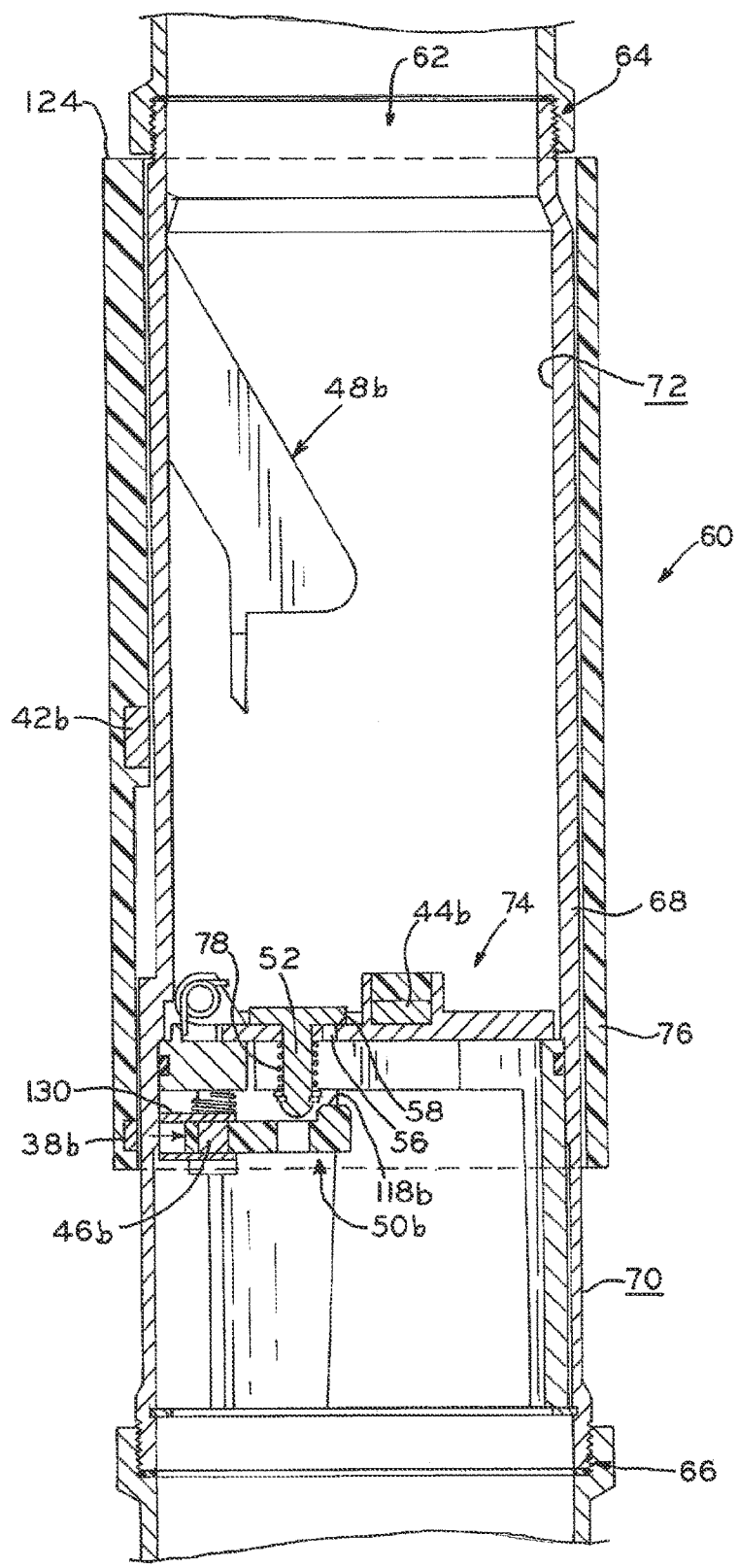
FIG. 12 is a cross-sectional view of the drop tube segment of FIG. 9 illustrating the valve body in the closed position and the closure stop in the non-leak position.
Figure 13:
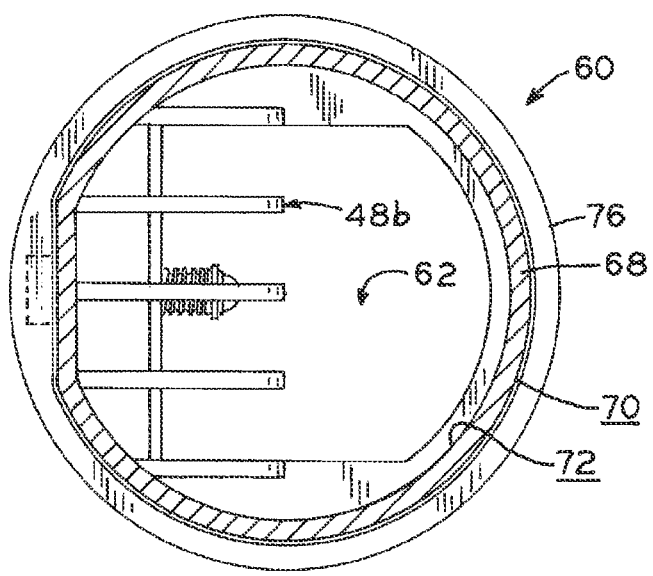
FIG. 13 is a top plan view of the drop tube segment of FIG. 9.

As described above, when valve body 74 maintains the closed position illustrated in FIG. 10, the maximum fill rate associated with underground storage tank 94 can no longer pass valve body 74. Further, the column of fluid maintained in the portion of drop tube 98 upstream from valve body 74 maintains valve body 74 in the closed position illustrated in FIG. 6. If filling is halted, the column of fluid upstream of valve body 74 will eventually drain past valve body 74 in the leak position and valve body 74 will be returned by the biasing force of torsion spring 128 to its at rest position, as illustrated, e.g., in FIG. 9. As the volume of fuel contained in underground storage tank 94 continues to rise, as fluid passes valve body 74 in the leak position illustrated in FIG. 10, float 36 will continue to rise until closure stop actuator magnet 38b aligns with closure stop magnet 46b as illustrated in FIG. 12.

Closure stop 50b, in the exemplary embodiment illustrated in FIGS. 9-13, comprises a piston axially translatable relative to cylinder 130. Each of the piston and cylinder forming a part of closure stop 50b may have opposing surfaces transverse to the axis along which the piston reciprocates relative to cylinder 130 and against which bears a compression spring to bias closure stop 50b into the leak position illustrated in FIG. 11. Closure stop 50b includes cam extension 118b extending therefrom. With cam extension 118b positioned as illustrated in FIG. 11, cam extension 118 pushes poppet valve 52 against the biasing force of spring 78 until poppet valve 52 is no longer seated against poppet valve seat 58 and poppet valve port 56 is placed in fluid communication with conduit 62. As closure stop 50b is actuated from its at rest position illustrated in FIG. 9-11, it is moved out of contact with poppet valve 52 and the weight of the column of fuel positioned upstream of valve body 74 together with the biasing force of spring 78 causes poppet valve 52 to fully seat against poppet valve seat 58 so that poppet valve port 56 is no longer in fluid communication with conduit 62. In this position, valve body 74 and poppet valve 52 are designed to prevent flow through conduit 22. In one exemplary embodiment, float 76 will rise into the position causing actuation of closure stop 50b when underground storage tank is 95% full. As fuel is drawn out of underground storage tank 94 by fuel dispenser 106, float 76 will return to a position in which it is no longer operable to actuate closure stop 50b and fluid will leak past valve body 74 until the column of fluid upstream of valve body 34 is depleted and valve body 34 returns to the normally biased position illustrated in FIG. 4.

In the exemplary embodiment illustrated in FIGS. 9-13, closure stop actuator magnet 38b repels closure stop magnet 46b to cause actuation of closure stop 50b. Closure stop 50b may, in alternative embodiments be actuated by an attractive force between closure stop actuator magnet 38b and closure stop magnet 46b. For example, an end of closure stop 50b may be spaced from conduit wall interior surface 72, e.g., by a compression spring. In such an embodiment, a stop positioned outwardly from closure stop 50b would prevent the aforementioned compression spring from extending the piston of closure stop 50b more than a predetermined distance through cylinder 130. Specifically, the stop of this form of the present disclosure would prevent the piston of closure stop 50b from extending further than a position in which cam extension 118b is positioned to contact poppet valve 52. In such an embodiment, closure stop actuator magnet 38b and closure stop magnet 46b will be configured such that they will be attracted to each other so that positioning of closure stop actuator magnet 38b in the position illustrated in FIG. 12 will cause closure stop magnet 46b to be attracted toward closure stop actuator magnet 38b against the biasing force of the aforementioned compression spring.

Figure 14:
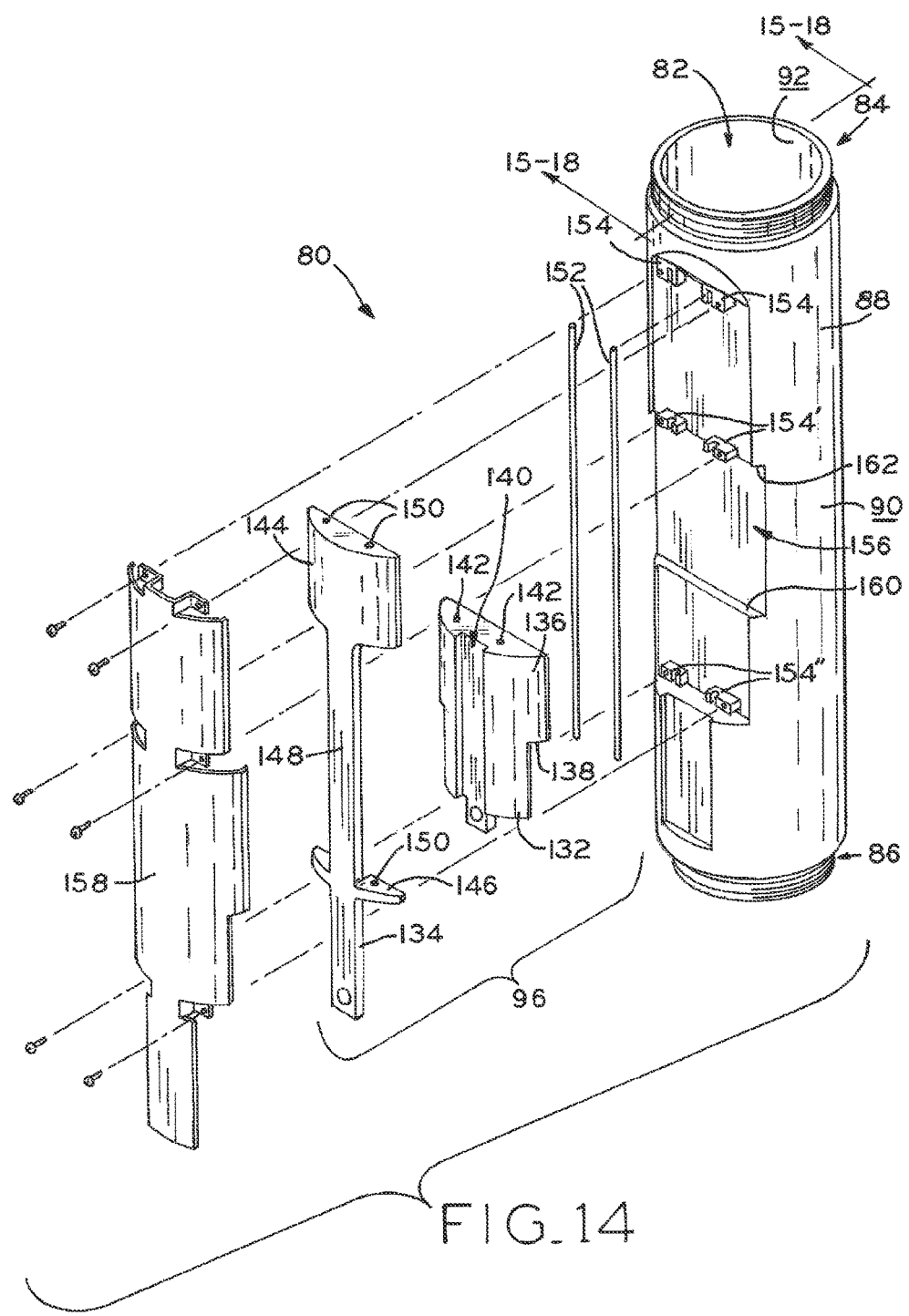
FIG. 14 is a perspective, exploded view of a further alternative embodiment drop tube segment.

FIGS. 14-18 illustrate a further alternative embodiment overfill prevention valve in accordance with the present disclosure. Referring to FIG. 14, drop tube segment 80 includes conduit 82 spanning first end 84 and second end 86 of conduit 82. Conduit wall 88 defines conduit wall interior surface 92 which defines a fluid path through conduit 82 from first end 84 to second end 86. Referring, e.g., to FIG. 15, valve body 74 operates in identical fashion to valve body 74 illustrated above with respect to the embodiments shown in FIGS. 9-13. Therefore, details concerning the operation of valve body 74c will not be provided, for the sake of brevity.

As with the embodiment illustrated in FIGS. 9-13, valve body 74 is movably positioned in the fluid path of conduit 82 and moveable from an open position to a closed position. Valve body 74c is functionally identical to valve body 74, including the inclusion of a poppet valve and associated poppet valve port; however, non-contact valve actuator 96 (FIG. 14) is structurally and functionally different than the previously described non-contact valve actuators.

Referring to FIG. 14, non-contact valve actuator 96 includes first float 132 and second float 134. First float 132 includes main body 136 defining shoulder 138. First float 132 includes guide channel 140 and guide rod apertures 142. Second float 134 includes main body 144, stop 146, guide extension 148, and guide rod apertures 150. Guide extension 148 is sized and shaped to fit within guide channel 140 of first float 132 such that guide channel 140 cooperates with guide extension 148 to guide relative movement of first float 132 and second float 134. In construction, second float 134 is positioned with guide extension 148 occupying guide channel 140. In this position, guide rod apertures 142 of first float 132 align with guide rod apertures 150 of second float 134. Guide rods 152 are then passed through guide rod apertures 150 of second float 134 and guide rod apertures 142 of first float 132 and are thereafter secured to guide rod retainers 154 of drop tube segment 80, with main body 136 of first float 132 occupying first float channel 156 and main body 144 of second float 134 positioned between guide rod retainers 154 and 154'. To complete securement of non-contact valve actuator 96 to drop tube segment 80, splash shield 158 is secured to drop tube segment 80 by, e.g. threaded fasteners. In its secured position, splash shield 158 retains guide rods 152 within guide rod retainers 154.

Figure 15:
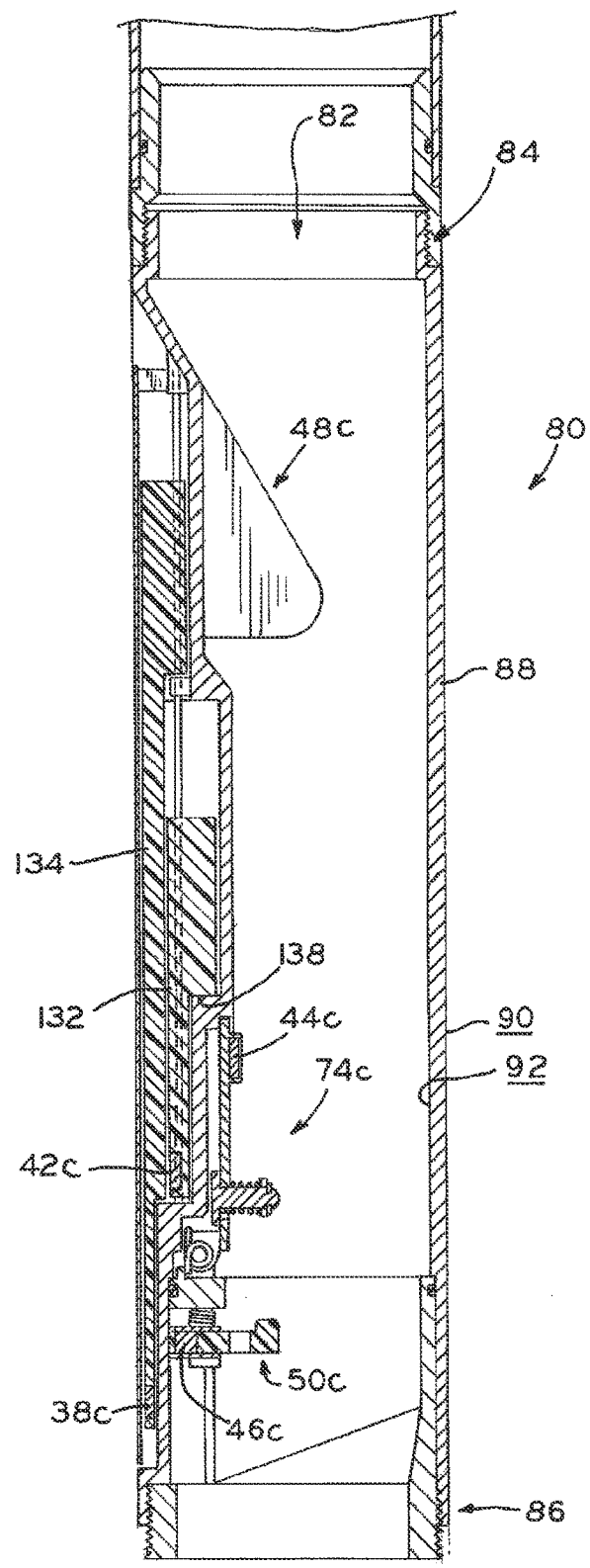
FIG. 15 is a cross-sectional view of the drop tube segment of FIG. 14.
Figure 16:
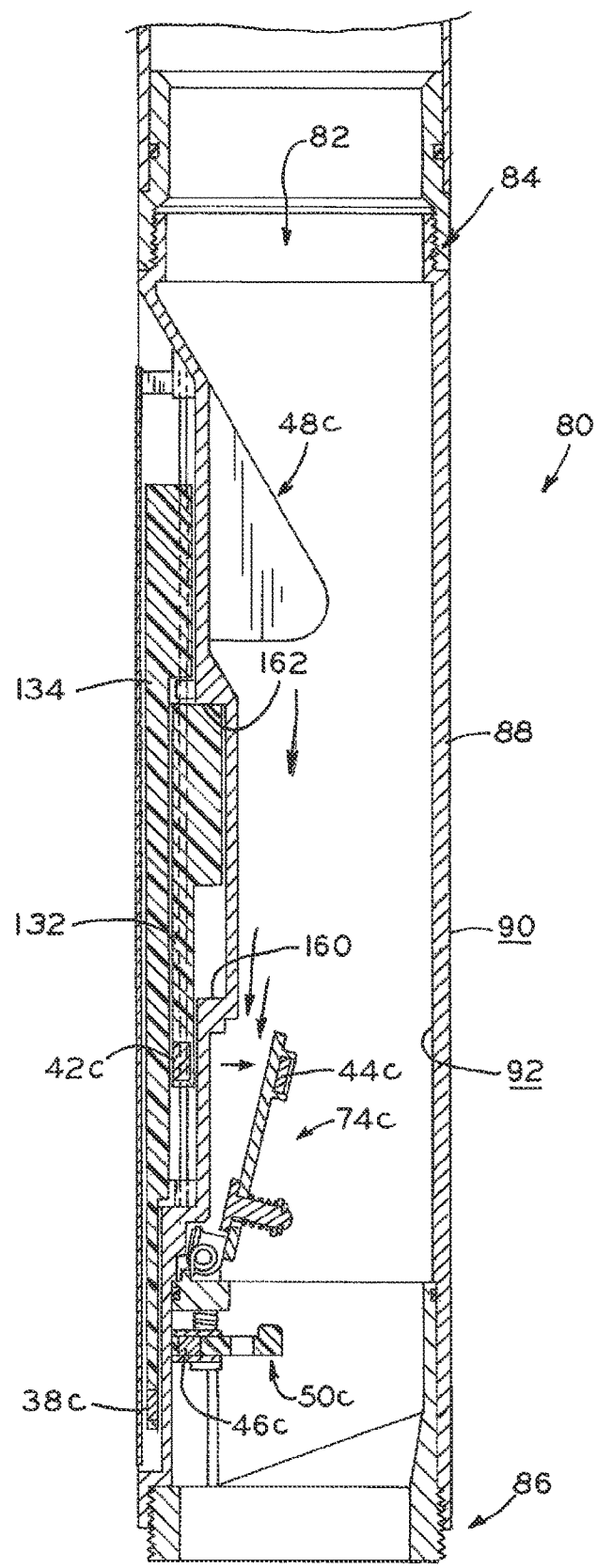
FIG. 16 is a cross-sectional view of the drop tube segment of FIG. 14 illustrating actuation of the valve body from the open position toward the closed position.
Figure 17:
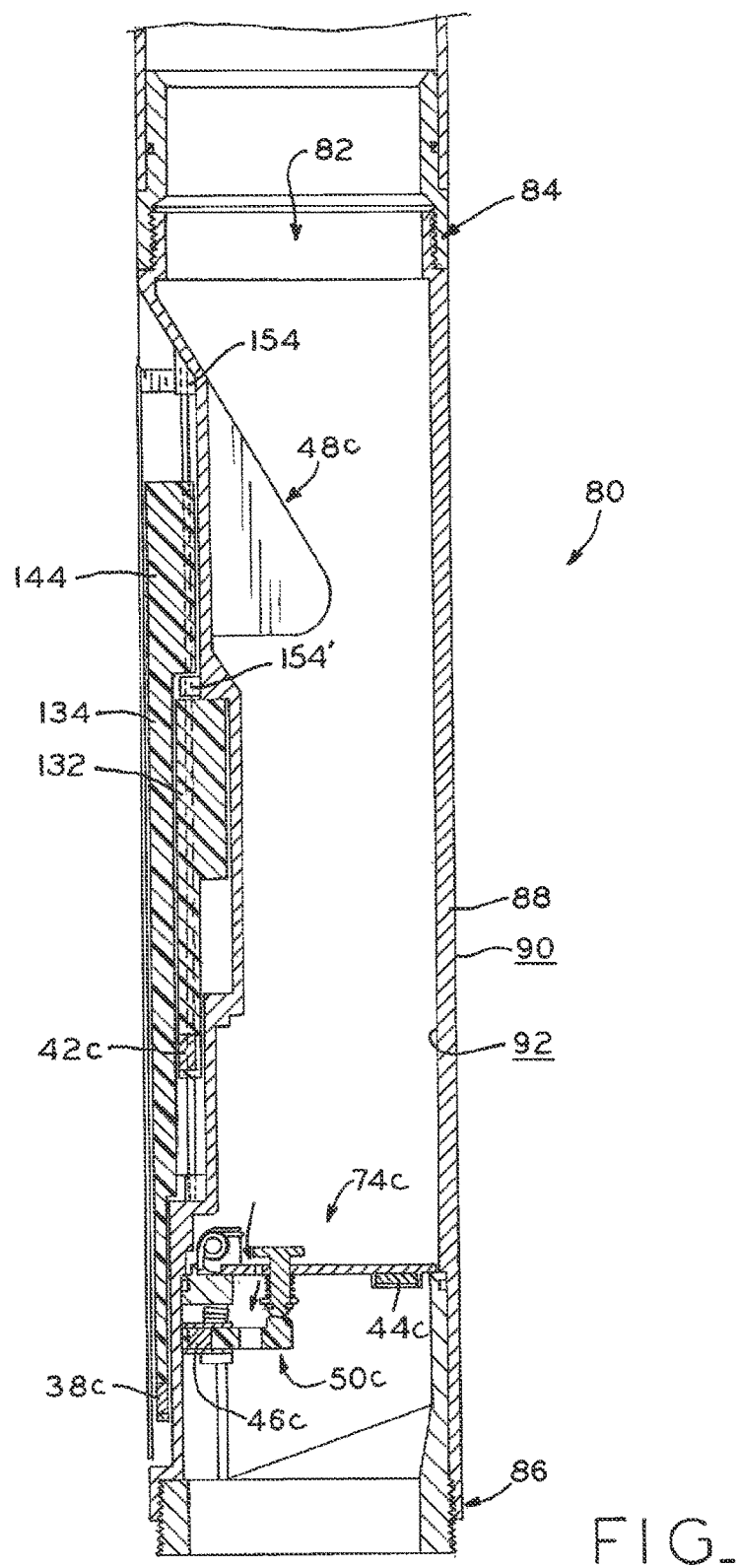
FIG. 17 is a cross-sectional view of the drop tube segment of FIG. 14 illustrating the valve body in the closed position and the closure stop in a leak position.
Figure 18:
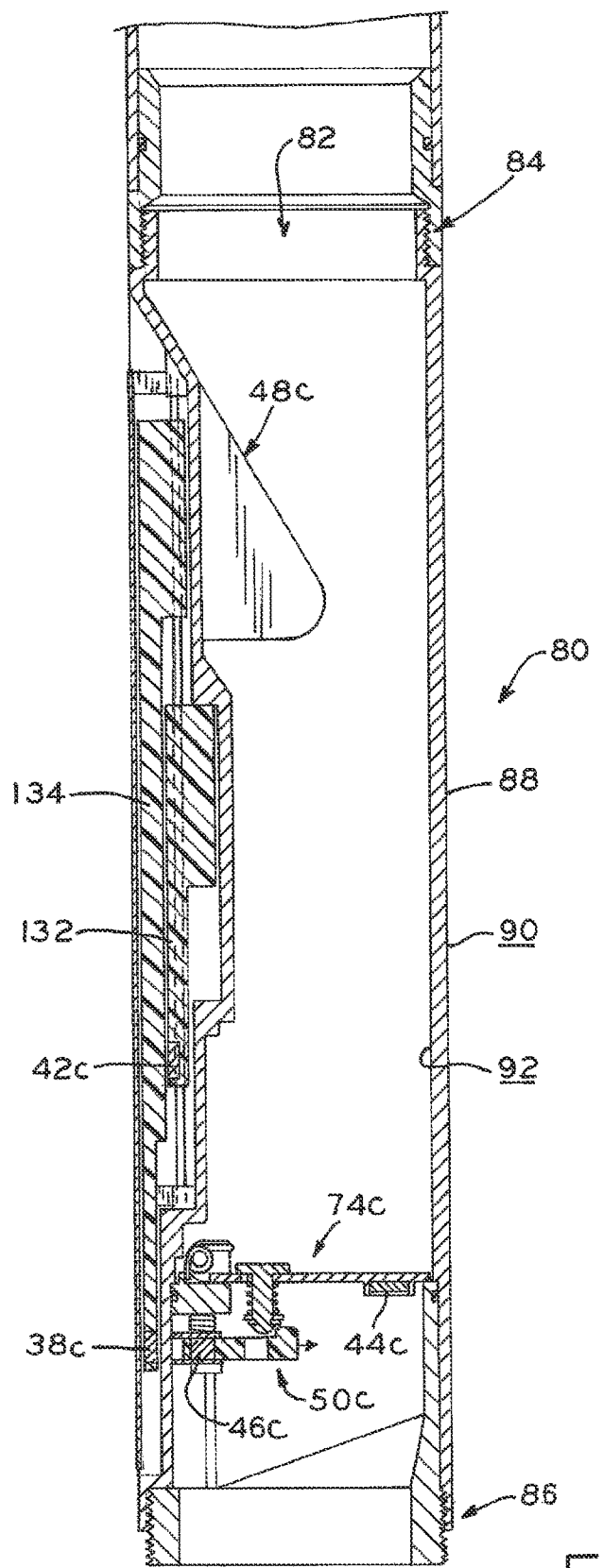
FIG. 18 is a cross-sectional view illustrating the drop tube segment of FIG. 14 with the valve body in the closed position and the closure stop in the non-leak position.

Referring to FIG. 15, first float 132 maintains an at rest position with shoulder 138 of main body 136 abutting shoulder 160 formed in conduit wall exterior surface 90. As illustrated in FIG. 16, upward travel of first float 132 is limited by shoulder 162 formed in conduit wall exterior surface 90. As illustrated in FIG. 17, second float 134 maintains an at rest position in which main body 144 abuts guide rod retainers 154'. Upward travel of second float 134 can be limited by guide rod retainers 154. Referring to FIGS. 15 and 16, first float 132 carries valve actuator magnet 42c. Valve actuator magnet 42c functions to actuate valve body 74c in an identical fashion to the actuation of valve body 74 described above with reference to FIGS. 9 and 10.

Unlike the previously described embodiments, first float 132 does not incorporate a closure stop actuator. In the embodiment illustrated in FIGS. 14-18, the closure stop actuator takes the form of closure stop actuator magnet 38c which is carried by second float 134. Second float 134 is actuatable independent of first float 132 and functions to actuate closure stop 50c in the same fashion as described above with respect to closure stop 50b (see FIGS. 11 and 12).

Figure 19:
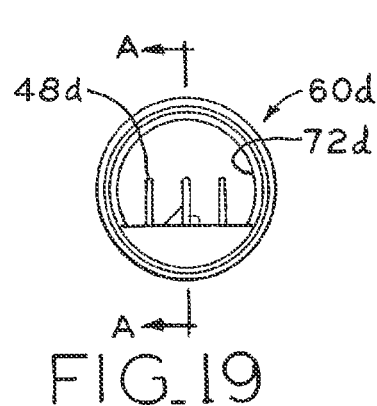
FIG. 19 is a top plan view of an alternative embodiment drop tube segment of the present disclosure.
Figure 20:
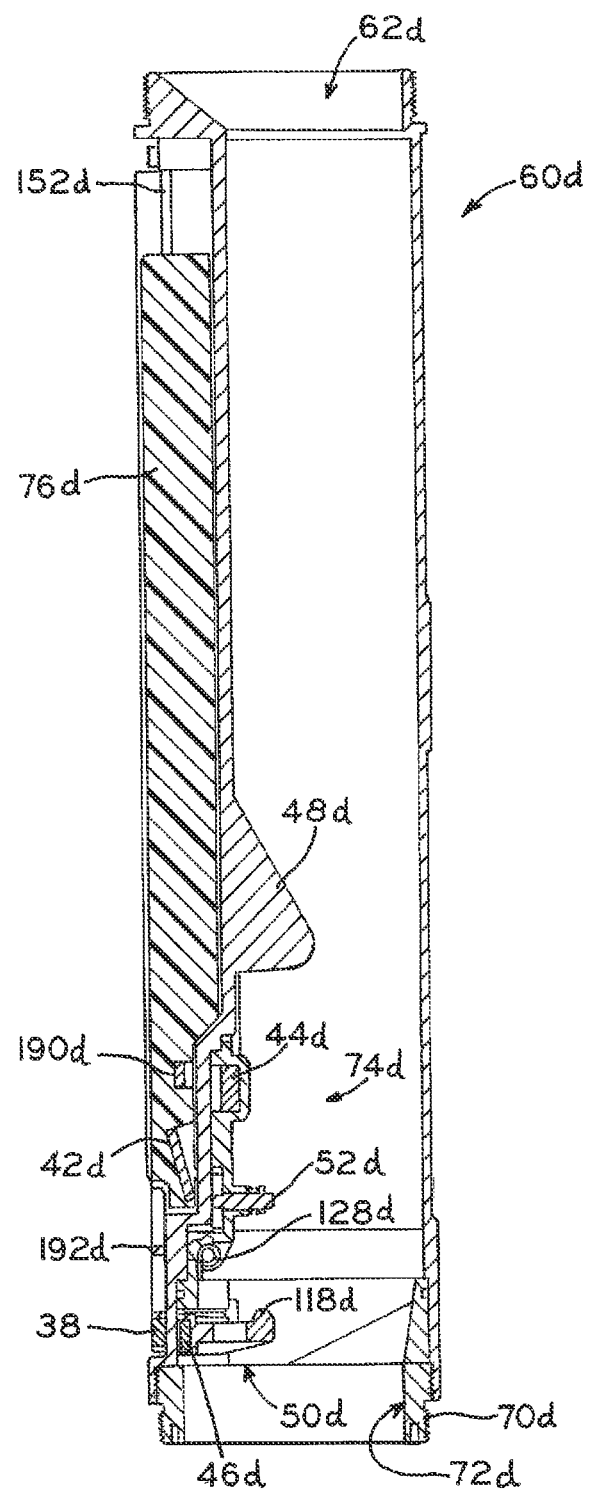
FIG. 20 is a sectional view thereof taken along line A-A of FIG. 19.
Figure 21:
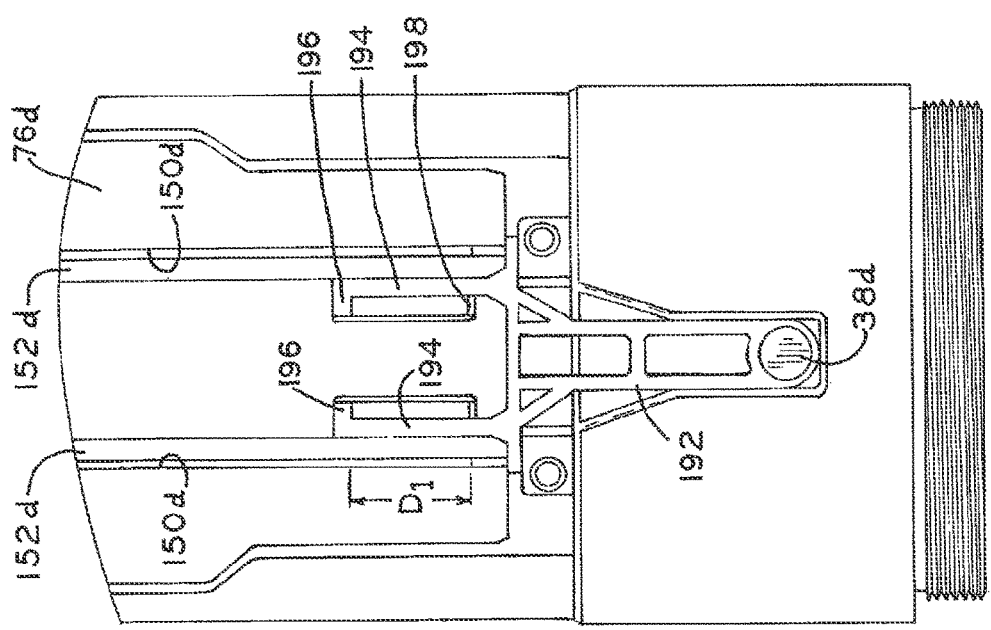
Figure 24:
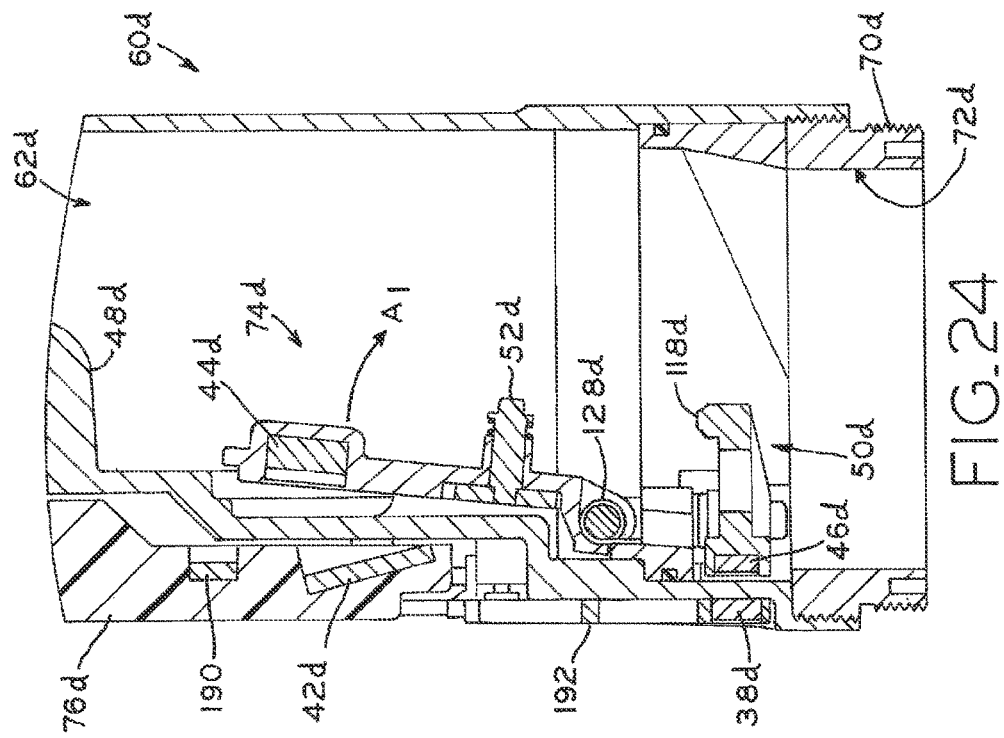
Figure 23:
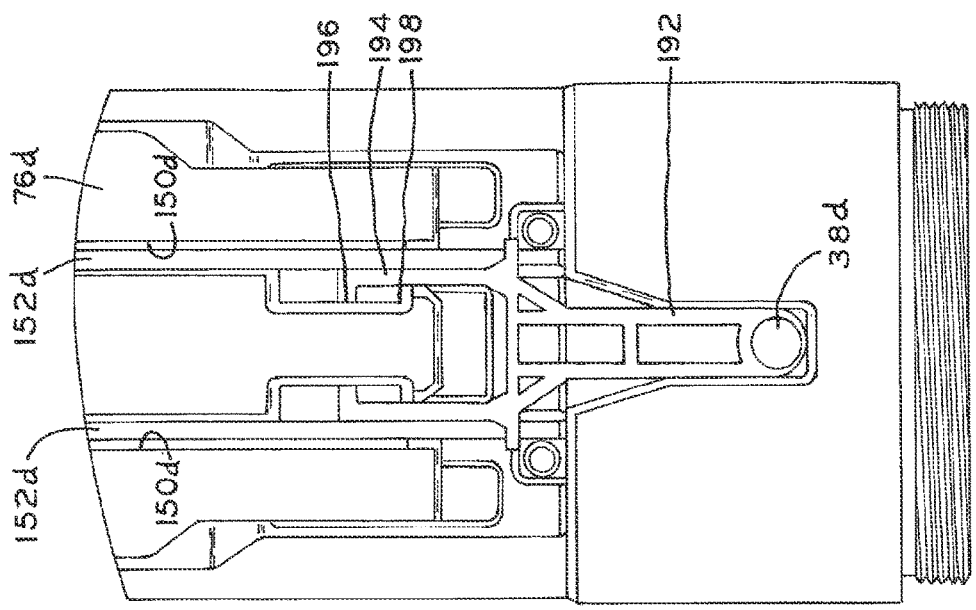

FIGS. 19-32 illustrate another embodiment of the present disclosure. Referring to FIGS. 19 and 20, splash guard 158d covers float 76d and closure stop actuator magnet 38d is secured in magnet holder 192d. Guide rods 152d are inserted through longitudinal apertures in float 76d (covered from view in FIG. 19) so that float 76 can move along guide rods 152d like the embodiment previously described and illustrated in FIGS. 14-18. Referring to FIG. 21, guide rods 152d are inserted through apertures in magnet holder 192 to connect magnet holder 192 to drop pipe segment 60d so that holder 192 can move along guide rods 152d when ridge 198 of float 76d rises to engage extension 196 to lift magnet holder 192.

Figure 22:
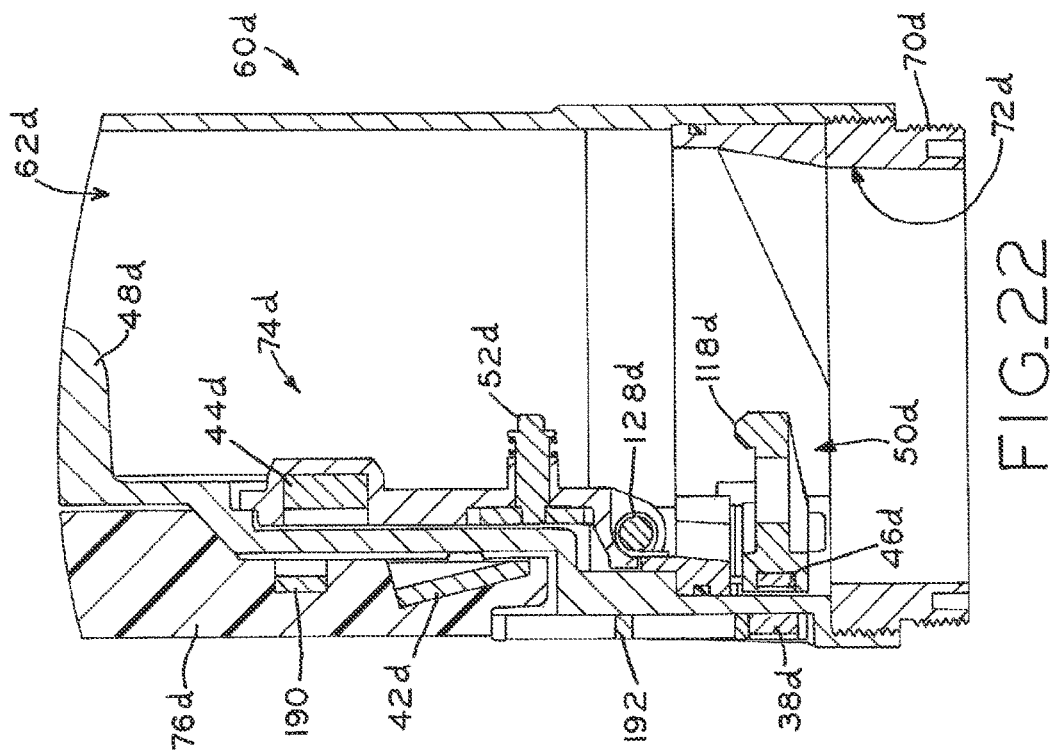
Figure 28:
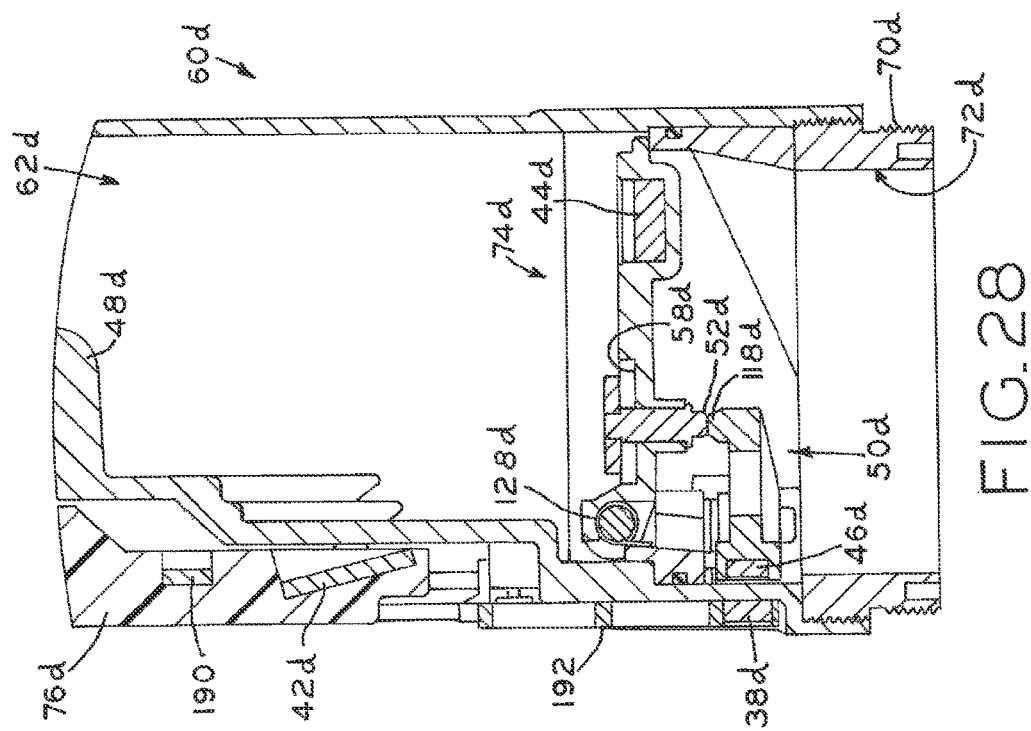

Referring to FIG. 22, flapper valve body 74d (like flapper valve body 74 in FIG. 9) is illustrated in an open position to allow passage of fuel through valve body 74 at a normal flow rate, in the ranges previously described above. Referring to FIG. 28, valve body 74d (like flapper valve body 74 in FIG. 11) is illustrated in a closed position, and because poppet valve 52d is in an open position, a small amount of fluid can still pass through valve body 74d. Like previous embodiments, the initial transition of valve body 74d from the open position illustrated in FIG. 22 to the closed position illustrated in FIG. 28 causes rapid closing of valve body 74d because valve body 74d is moved into the path of and is collided with the liquid stream flow.

Referring to FIG. 22, valve body 74d is pivotally connected to drop tube segment 60d and, in an exemplary embodiment, may be pivotally connected by a rod connected to conduit wall interior surface 72d. Valve body 74d is biased in the open position by torsion spring 128d, which has a lower spring constant than that disclosed in FIGS. 9-14, and hold-open magnet 190 on float 76d has an attractive force that also urges valve body 74d into the open position when float 76d maintains its lowered position, i.e., it has not yet begun to float on a quantity of product in underground storage tank 94. Specifically, hold-open magnet 190 and valve magnet 44d are structured and arranged such that they have a magnetic attraction to each other. As storage tank 94 (shown in FIG. 1) nears capacity, float 76d will rise to actuate valve body 74d from the open position in FIG. 22 to the closed position illustrated in FIG. 28.

Referring to FIGS. 19-32, similar to first and second floats 132 and 132 in FIGS. 14-18, guide rods 152d are passed through guide rod slots 150d to slidingly secure float 76d to drop tube segment 60d along conduit wall exterior surface 70d and physically separated from valve body 74d. Sharing the same buoyancy characteristics as non-contact valve actuator 36 in FIGS. 4-8, in one exemplary embodiment, when the liquid level in underground storage tank 94 reaches about 90%, float 76d will begin to rise to transition valve body 74d from the open position in FIG. 22 to the closed position in FIG. 28.

Figure 26:
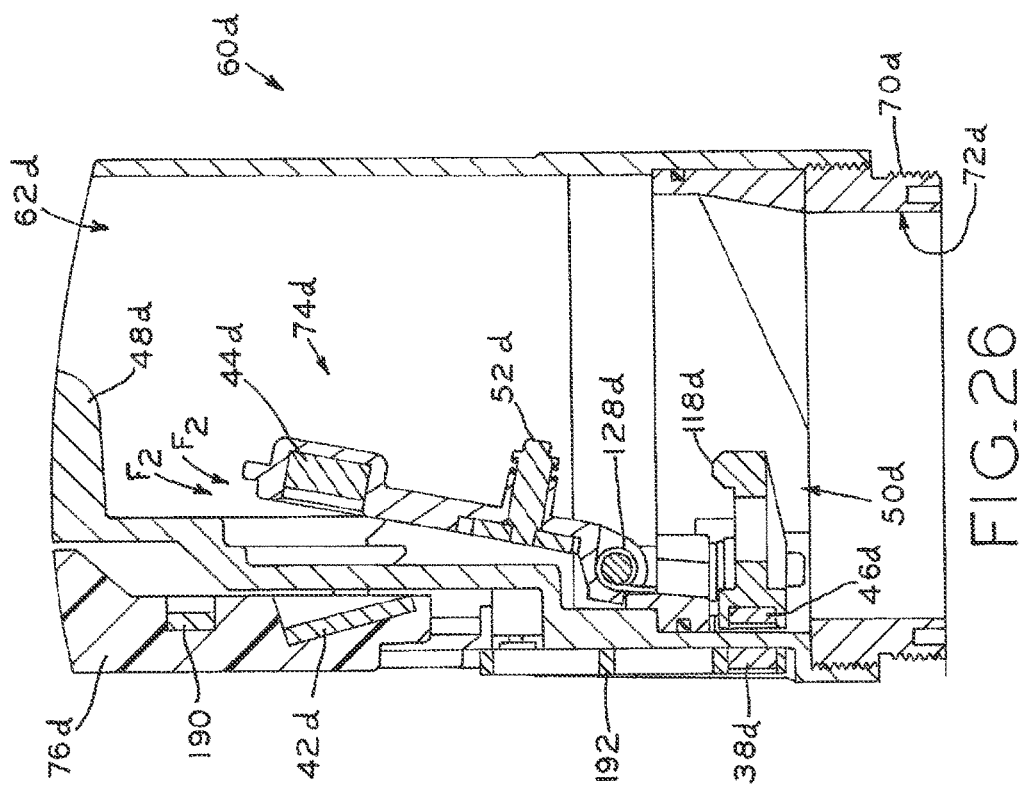
Figure 25:
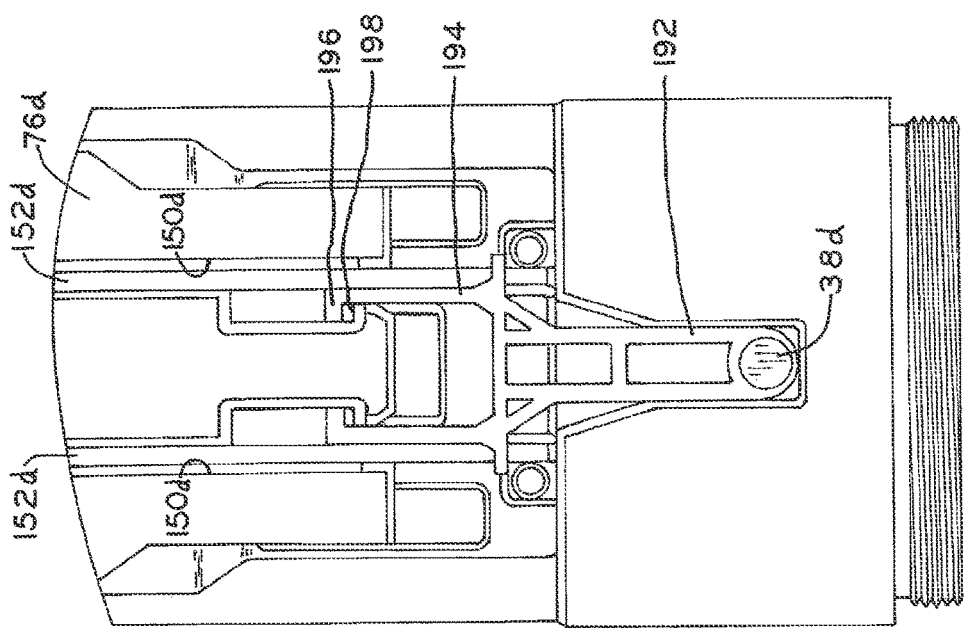

Before this transition, when valve body 74d is in the open position, deflector 48d shields valve body 74d from being actuated by the flow of liquid through conduit 62d. When the liquid level in storage tank 94 has buoyed float 76d upward to actuate valve body 74d to an intermediate position, out of the upright but not yet in the closed position, as illustrated in FIG. 26, the flow of fluid through conduit 62d begins to actuate valve body 74d toward the closed position illustrated in FIG. 28. Specifically, in FIG. 26, the rising liquid level will urge float 76d upward so that hold-open magnet 190 is no longer aligned with, and thus no longer attracts leftward (in the view of FIG. 26), valve magnet 44d. Instead, repelling valve actuator magnet 42d is moved into alignment with valve magnet 44d to repel valve magnet 44d and urge valve body 74d to rotate downward, as shown by arrows $A_1$. Repelling valve actuator magnet 42d and valve magnet 44d are structured and arranged such that they magnetically repel one another. The repulsion of valve actuator magnet 42d overcomes the bias of torsion spring 128d to actuate valve body 74d downward, on its way to achieving the closed position. Flow $F_2$, illustrated in FIG. 26, urges valve body 74d against the biasing force of the torsion spring 128d as hold-open magnet 190 is no longer aligned with valve magnet 44d to urge valve body 74d to the open position. Once the valve body 74d is in the closed position illustrated in FIG. 28, fluid through conduit 62d can no longer pass valve body 74d at the maximum rate because valve body 74d is in the leak position, as previously described.

Poppet valve 52d, in the exemplary embodiment in FIGS. 19-32, is substantially the same structure as poppet valve 52b illustrated in FIGS. 9-13. For example, referring specifically to FIG. 28, like in previous embodiments, valve body 74d is in the closed position, but poppet valve 52d is open to allow a small amount of liquid to flow through valve body 74d. However, fully seating poppet valve 52d against poppet valve seat 58d differs from the process previously described and illustrated in FIGS. 12 and 13.

Figure 19A:
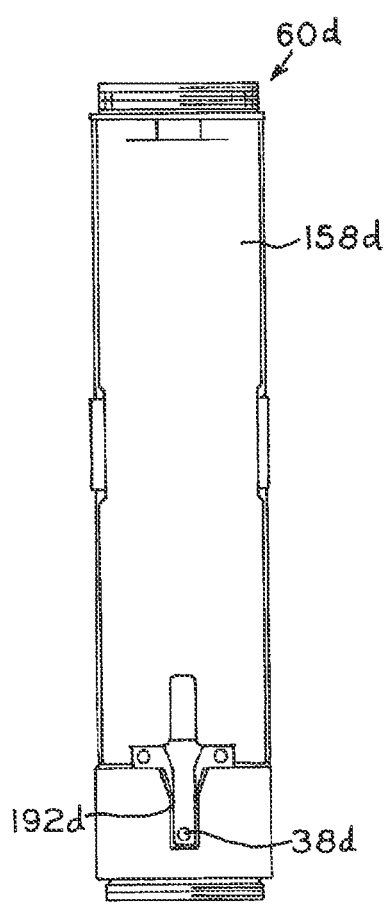
FIG. 19a is a radial elevational view of the drop tube segment illustrated in FIG. 19.
Figure 27:
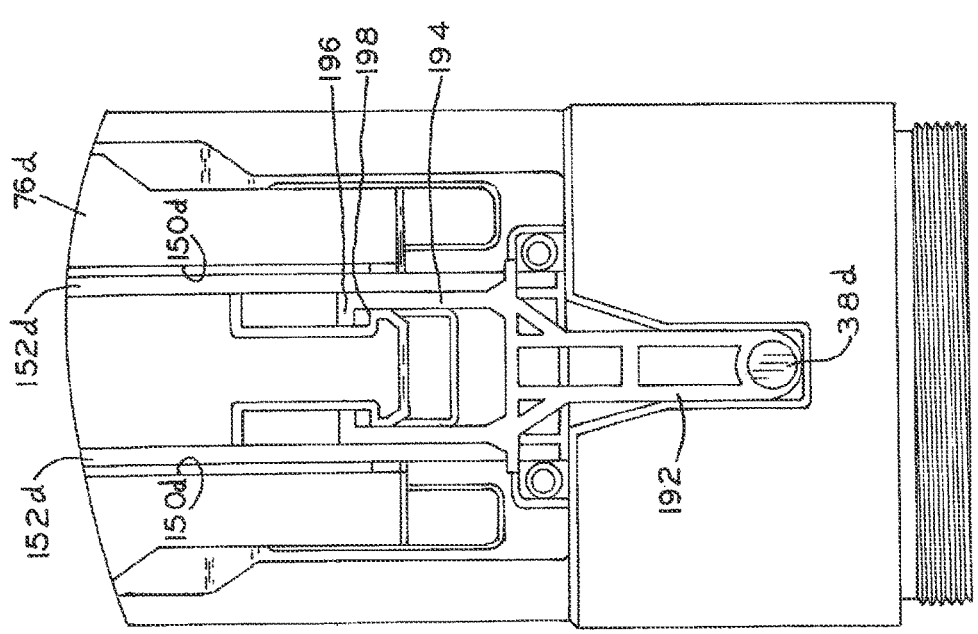

Referring back to FIG. 19a, magnet holder 192 is illustrated holding closure stop actuator magnet 38d and having a pair of arms 194 with extensions 196 extending from each arm 194. Each extension 196 is situated distance $D_1$ (FIG. 21) from ridge 198 formed along float 76d. Referring now to FIG. 27, magnet holder 192 has remained stationary while float 76d has risen $D_1$ so that ridges 198 are adjacent extensions 196. At the same time, referring to FIG. 28, closure stop 50d includes cam extension 118d that selectively pushes poppet valve 52d upward and out of engagement with poppet valve seat 58d. Closure stop actuator magnet 38d and closure stop magnet 46d share a magnetic attraction that urges closure stop magnet 46d to the left (in the view illustrated in FIG. 28) against a closure stop spring (not shown) bias to engage cam extension 118d with poppet valve 52d, thereby creating the leak condition. Specifically, the closure stop spring (not shown) will bias closure stop 50d into a position in which cam extension 118d does not engage poppet valve 52d; however, magnetic attraction shared by closure stop actuator magnet 38d and closure stop magnet 46d will overcome this spring bias to engage cam extension 118d with poppet valve 52d as illustrated in FIG. 28.

Figure 30:
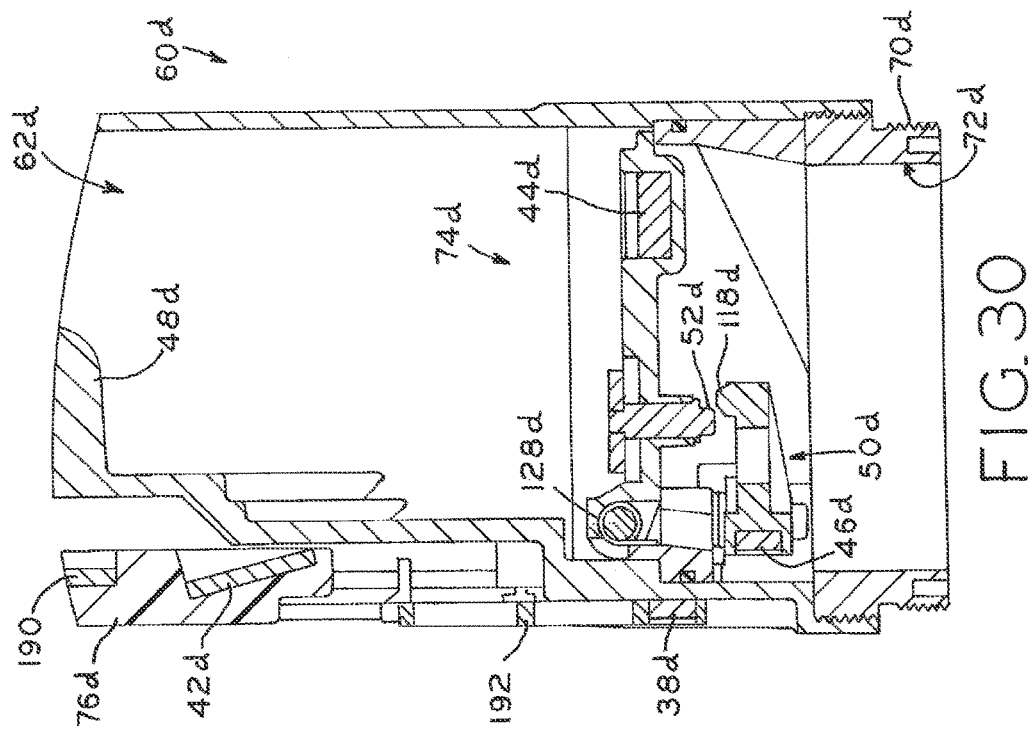
Figure 29:
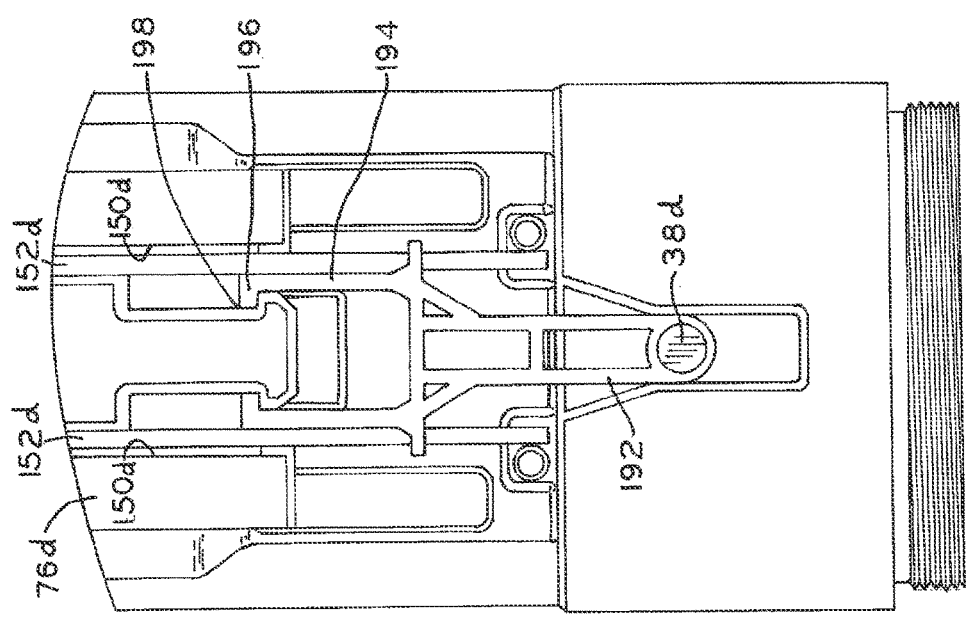

Referring now to FIGS. 29 and 30, float 76d has risen so that ridges 198 have engaged extensions 196 to lift magnet holder 192. This lifting slides closure stop actuator magnet 38d upward and out of alignment with closure stop magnet 46d and consequently, closure stop 50d shifts rightward due to the closure stop spring bias. Cam extension 118d disengages poppet valve 52d allowing poppet valve 52d to fully seat against poppet valve seat 58d. While the valve body of poppet valve 52d is not illustrated in its seated position in FIG. 30 (FIG. 30 is meant to illustrate the initial movement of closure stop 50d from the position illustrated in FIG. 28), poppet valve 52d will return to a seated position such as the one illustrated in FIG. 32 just subsequent to movement of closure stop 50d into the position illustrated in FIG. 30.

As the fluid level in underground storage tank 94 lowers, closure stop actuator magnet 38d is returned to the position illustrated in FIG. 28 to unseat poppet valve 52d and allow flow at the previously mentioned leak flow rate. Prior to the unseating of poppet valve 52d, fluid may pass valve body 74 at the "drain" rate described hereinabove. In any event, as conduit 62d is cleared of the column of fluid that will accumulate when valve body 74d maintains the closed position, torsion spring 128d will return valve body 74d to the fully opened position illustrated in FIG. 22.

Figure 34:
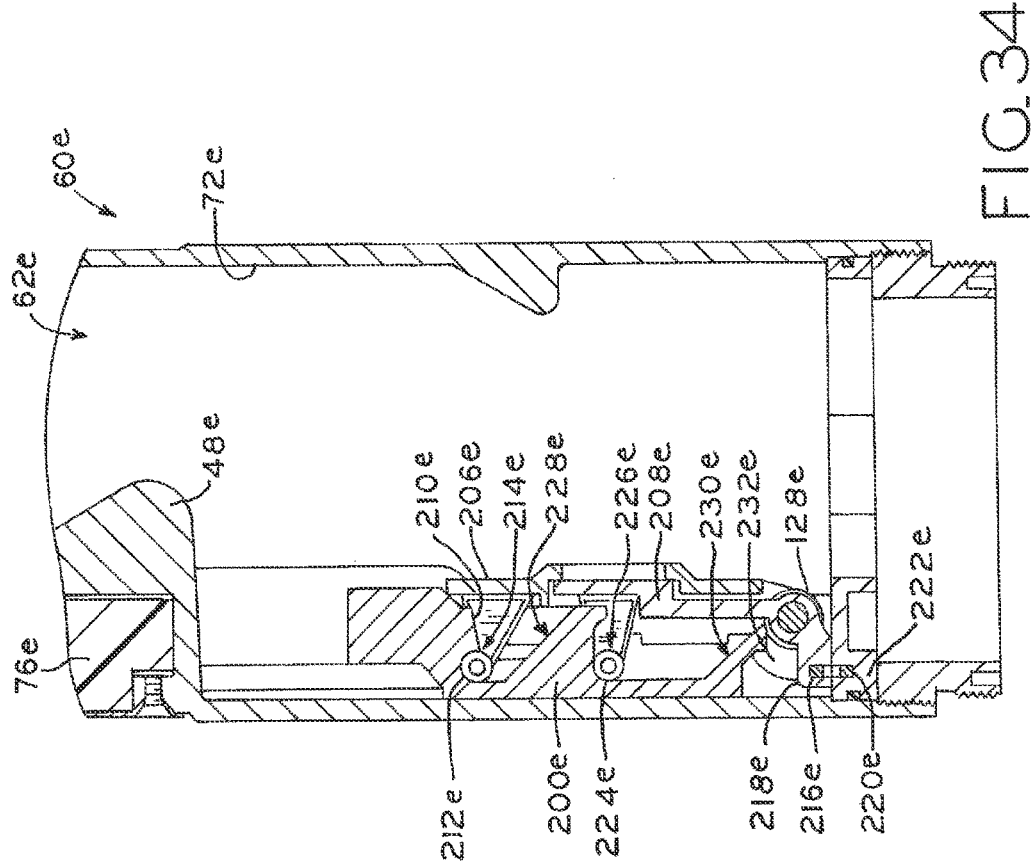
Figure 33:
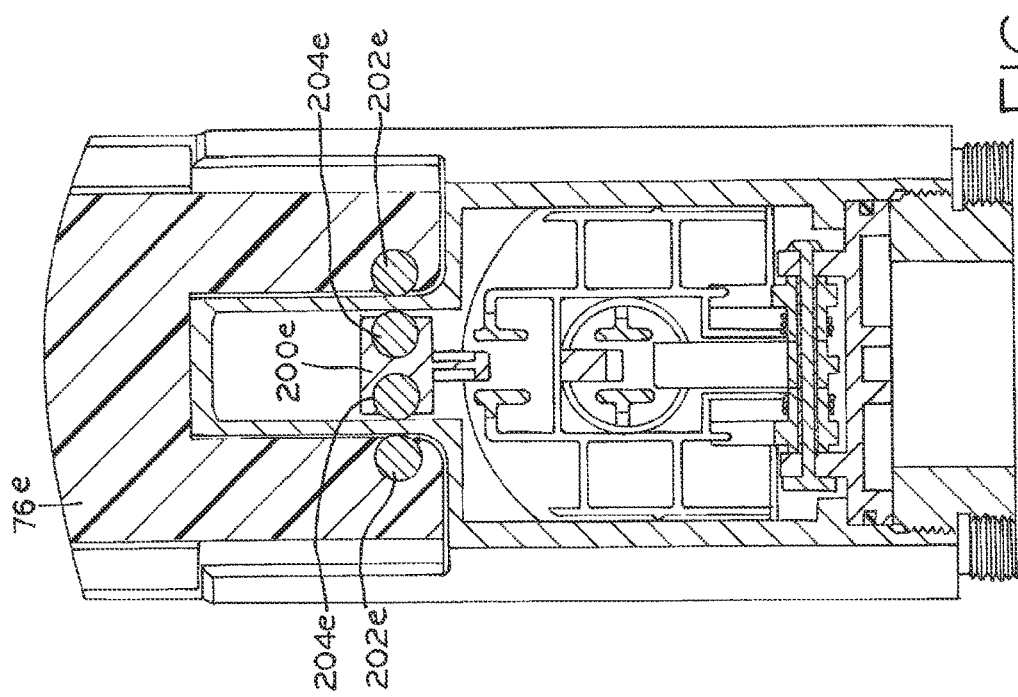

FIGS. 33-42 illustrate another embodiment of the present disclosure. Referring to FIG. 33, float 76e is illustrated in magnetic communication with shuttle 200e. Float 76e has a substantially equal buoyancy as floats in previous embodiments and is not in contact with shuttle 200e, which is located interior of conduit wall interior surface 72e (FIG. 34). Instead, in the present embodiment, float 76e and shuttle 200e each carry a pair of roller magnets 202e and 204e, respectively, which attract one another, so that as the liquid level in conduit 62e reaches a level at which float 76e begins to rise, float 76e will actuate the corresponding rise of shuttle 200e. Roller magnets 202e are cylindrical magnets having an opposite polarity to cylindrical roller magnets 204e. Specifically, adjacent roller magnet pairs 202e/204e have opposite polarity. Further, roller magnets 202e and 204e are aligned with one another, i.e., they extend a similar distance both into and out of the section plane shown in FIG. 33. As illustrated in FIG. 34, roller magnets 202e are positioned exterior of the conduit wall, i.e., exterior of conduit wall exterior surface 70e. Similarly, roller magnets 204e are positioned interior of the conduit wall, i.e., interior of conduit wall interior surface 72e.

Referring to FIG. 34, shuttle 200e is illustrated with first flapper valve 206e and second flapper valve 208e biased upright in a fully open position. Torsion spring 128e biases first flapper valve 206e into the open position and upper latch 210e of shuttle 200e holds first flapper valve 206e in the open position, as illustrated. First flapper valve 206e has first roller 212e extending through a yoke extending upwardly from flapper valve 206e. First roller 212e is engaged at a recess juxtaposed with upper latch 210e, as illustrated in FIG. 4, when first flapper valve 206e maintains the closed position. In this position, second flapper valve 208e is biased upright due to its planar engagement with first flapper valve 206e. Further, second flapper valve 208e includes upper magnet 216e positioned through stem 218e of second flapper valve 208e. Magnet 220e secured in valve base 222e shares a magnetic attraction with upper magnet 216e to urge second flapper valve 208e into the fully opened position illustrated in FIG. 34. Like first flapper valve 206e, second flapper valve 208e has a second roller 224e extending between a yoke that projects from second flapper valve 208e. Second roller 224e occupies notch 226e of shuttle 200e in the fully opened position illustrated in FIG. 34.

In the embodiment in FIGS. 33-43, float 76e begins to rise when the liquid level in tank 94 (shown in FIG. 1) reaches a sufficient height, as previously described for other embodiments. Roller magnets 202e attract roller magnets 204e so that float 76e lifts shuttle 200e, as float 76e rises. Referring to FIGS. 34 and 35, first and second flapper valves 206e and 208e are illustrated in the open position. Comparatively, referring to FIGS. 38 and 39, when first flapper valve 206e is in an intermediate position, between open and closed, the two pairs of roller magnets, 202e and 204e, have risen relative to first and second flapper valves 206e and 208e.

This rising of both float 76e and shuttle 200e actuates the closing of both first and second flapper valves 206e and 208e, as described below.

Figure 38:
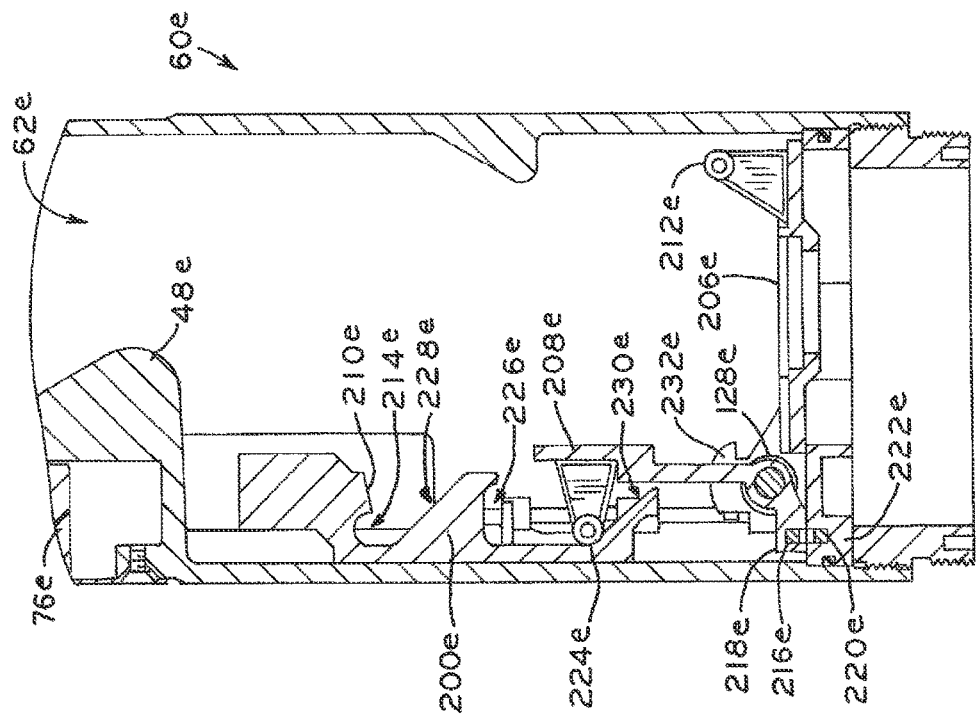
Figure 37A:
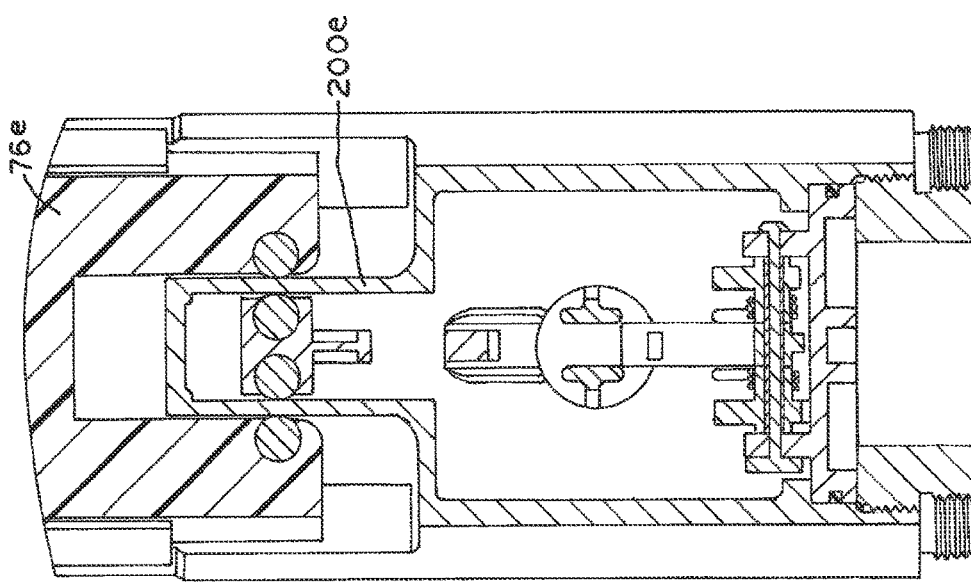
Figure 38A:
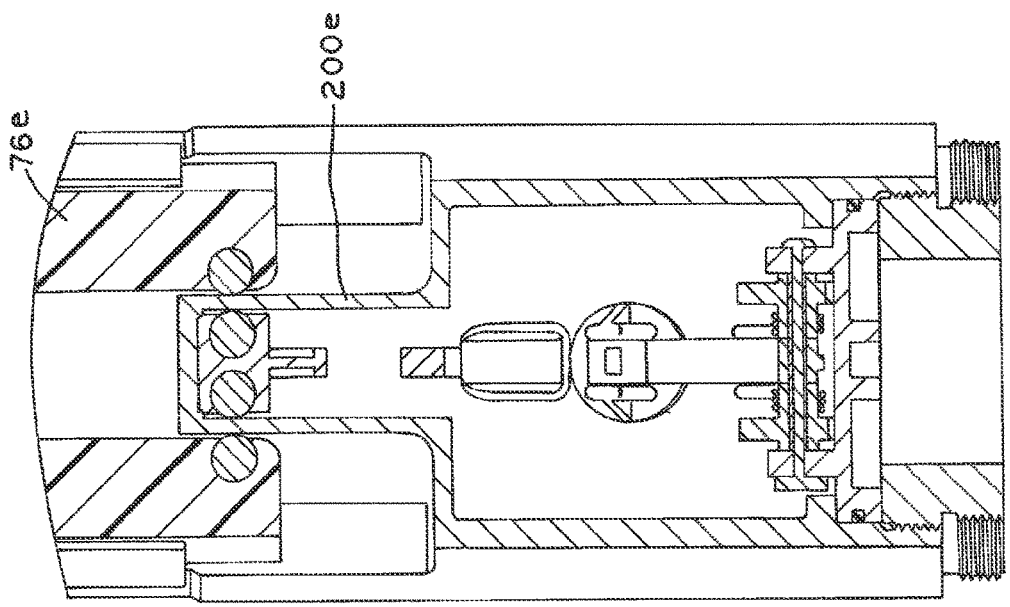

Referring back to FIG. 34, first and second flapper valves 206e and 208e are illustrated in the fully open position. As the liquid level in tank 94 (shown in FIG. 1) causes float 76e to rise, shuttle 200e will rise to actuate the closure of first and second flapper valves 206e and 208e. When this happens, both first and second rollers 212e and 224e ride along the vertical wall surfaces of shuttle 200e. As float 76e rises and, owing to the magnetic attraction between roller magnets 202e and 204e, shuttle 200e rises, first roller 212e and second roller 224e will ride along upper ramp 228e and the vertical wall forming lower notch 226e, respectively, to attain the position illustrated in FIG. 37. In this position, the magnetic attraction between upper magnet 216e and magnet 220e continues to hold second flapper valve 208e in the fully opened position illustrated in FIG. 38. In the position illustrated in FIG. 37, the fluid flowing through the conduit will actuate first flapper valve 206e into the closed position as described above with respect to various alternative flapper valve embodiments. With first flapper valve 206e closed and second flapper valve 208e still open, as illustrated in FIG. 38, the leak position is achieved. As float 76e continues to rise, second roller 224e will ride along lower ramp 230e until achieving the position illustrated in FIG. 39. FIGS. 37a and 38a sequentially illustrate the change in position of float 76e and shuttle 200e to effect this movement.

Figure 39:
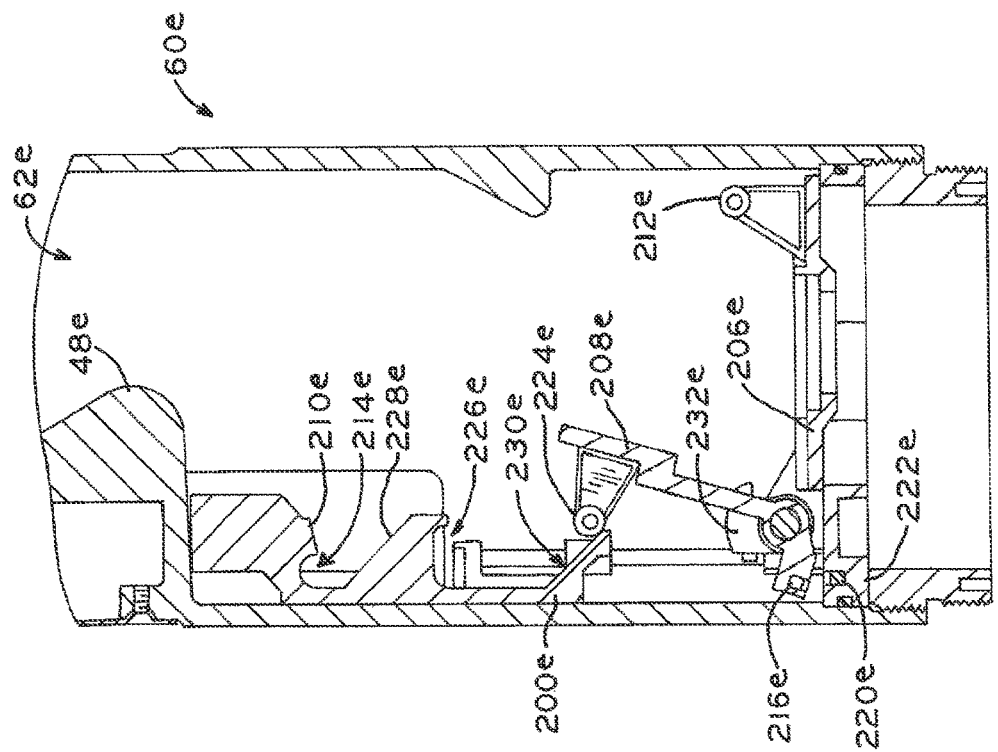

As second flapper valve 208e is forced by the interaction of second roller 224e and lower ramp 230e from the position illustrated in FIG. 38 to the position illustrated in FIG. 39, the magnetic attraction between upper magnet 216e and magnet 220e is broken. With second flapper valve 208e maintaining the position illustrated in FIG. 39, the flow of fluid through the conduit will actuate second flapper valve 208e into a closed position, as described above with respect to the various flapper valve embodiments of the present disclosure. With both first and second flapper valves 206e and 208e closed as illustrated in FIG. 40, fluid may continue to flow through conduit 62e at the drain flow rate described above, e.g., at 2% of maximum flow rate. As the column of fluid drains past first flapper valve 206e and second flapper valve 208e, torsion spring 128e will return both first flapper valve 206e and second flapper valve 208e (owing to its seated position with respect to its valve seat, which is formed in first flapper valve 206e) to the open position.

As the liquid level and flow decrease, float 76e will descend and upward bias of torsion spring 128e will begin to return both first and second flapper valves 206e and 208e to the open position. When this happens, referring from FIG. 41 to FIG. 42, first and second rollers 212e and 224e will reengage upper and lower ramps 228e and 230e, respectively, and the lowering of shuttle 200e and upward rolling of the rollers will reset the valves and shuttle 200e to the open position illustrated in FIG. 35. It is important to note that cam 232e (which is rigidly secured to first flapper valve 206e for rotation therewith) precludes shuttle 200e from achieving its fully lowered position, as illustrated in FIG. 34, unless first flapper valve 206e is rotated to a position that is either fully open or nearly fully open. This is done so that shuttle 200e cannot interfere with the opening of first flapper valve 206e.

FIGS. 43-50 illustrate another embodiment of the present disclosure wherein the mechanism for actuating the closure of the two interior valves is float 76f connected to a magnetic shaft coupling via link 303f and lever arm 302f. Once again, the two interior valves, first flapper valve 304f and second flapper valve 306f, each transition from an open to a closed position as the liquid level in tank 94 (shown in FIG. 1) rises past a certain threshold, as described for previous embodiments. However, this embodiment uses a rotational magnetic shaft coupling to transition first flapper valve 304f and second flapper valve 306f from open to closed positions. Specifically, referring to FIG. 44, outer magnetic coupler 314f is rotationally supported by a bearing on the exterior of conduit wall exterior surface 70f, while inner magnetic coupler 316f is rotationally supported by a bearing and supported on conduit wall interior surface 72f. Each of outer magnetic coupler 314 and inner magnetic coupler 316 include a plurality of bearings spaced about their perimeter, in the usual arrangement of a magnetic shaft coupler. The polarity of such magnets is configured such that movement of outer magnetic coupler 314 outside of fluid conduit 62f yields corresponding rotational movement of inner magnetic coupler 316f on the interior of conduit 62f.

Referring to FIG. 44, both first flapper valve 304f and second flapper valve 306f are illustrated in the open position. First flapper valve 304f is biased in the upright position by torsion spring 128f and held in this upright position by overhead latch 308f. Second flapper valve 306f is held in the upright position because it is in planar engagement with first flapper valve 304f, making second flapper valve 306f upright whenever first flapper valve 304f is as well. Further, even without engagement by first flapper valve 304f, second flapper valve 306f would be held in place by the magnetic attraction between flapper valve magnet 312f that is secured to pivot arm 322f (as further described below) and magnet 313f, which is secured to second flapper valve 306.

Figure 45:
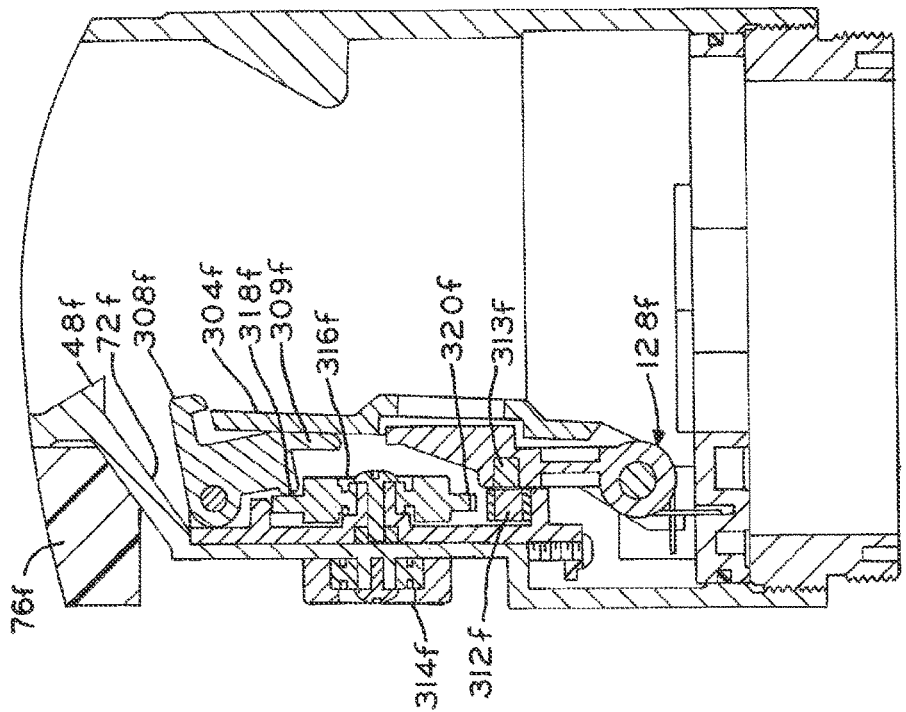

Referring to FIG. 45, as the liquid level in tank 94 (shown in FIG. 1) reaches a certain level, float 76f begins to rise, in the same way as described for previous embodiments. Also as previously described, deflector 48f prevents liquid flow from urging either flapper valve downward until the given valve has been disengaged from the upright position. As float 76f rises, link 303f (FIG. 43a), which is pivotably connected both to float 76f and to lever arm 302f is pulled upward with float 76f, thereby turning actuating outer magnetic coupler 314f counterclockwise from the perspective illustrated in FIG. 43a. This counterclockwise rotation acts on both first and second flapper valves 304f and 306f to transition each from an open to a closed position as described below.

Figure 46:
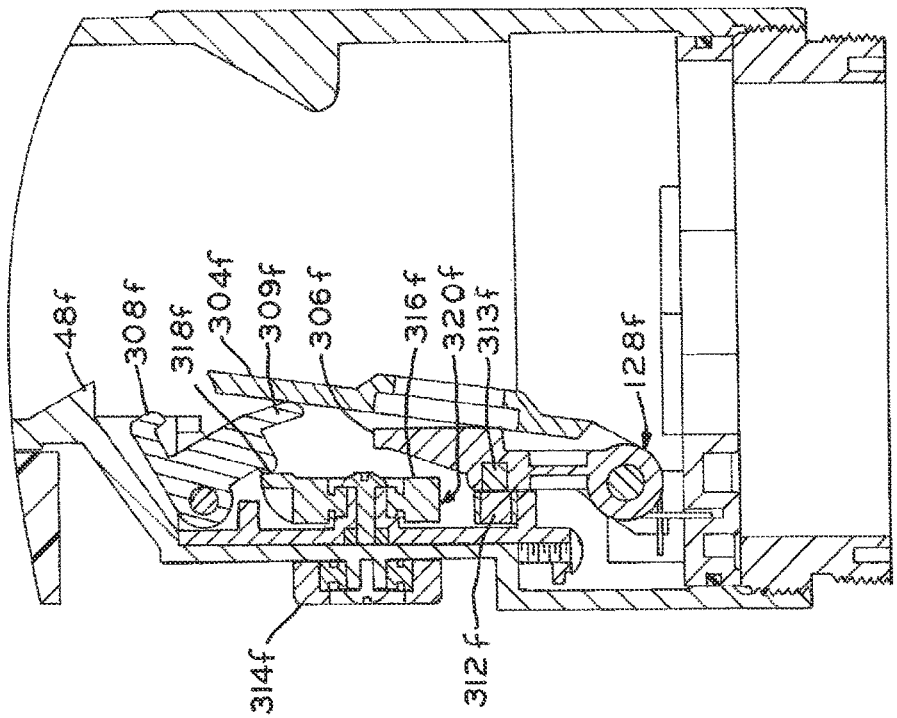

Referring to FIGS. 45-47, as float 76f rotates outer magnetic coupler 314f, inner magnetic coupler 316f rotates as well. Inner magnetic coupler 316f includes cammed surface 318f that rotates to actuate overhead latch 308f out of locking engagement with first flapper valve, as illustrated in FIG. 45. As illustrated in FIG. 45, latch 308f is pivotally connected to conduit wall interior surface 72f so that it will ride along cam surface 318f and, from the perspective illustrated in FIG. 45, rotate counterclockwise as it rides ever higher along the cammed surface 318f of inner magnet coupler 316f. In a position illustrated in FIG. 45, overhead latch 308 no longer engages first flapper valve 304f to hold it in the open position. Further, foot 309f of overhead latch 308 forces first flapper valve 304 to rotate from its fully opened position. As rotation of inner magnet coupler 316f continues, latch 308f continues to be rotated counterclockwise to the further rotated position illustrated in FIG. 46. In this position, foot 309f sufficiently places first flapper valve 304f in the fluid stream such that the fluid stream causes closing of first flapper valve 304f as described above with respect to a variety of alternative embodiments. This position is illustrated in FIG. 47. FIG. 47a illustrates overhead latch 308f in an open position, allowing first flapper valve 304f to achieve the closed position, as previously described. In a position illustrated in FIG. 47a, overhead latch 308f has rotated the maximum amount provided by its interaction with cam surface 318f. The position illustrated in FIG. 47 corresponds to the leak position. In this position, the closure stop (in the form of second flapper valve 306f) maintains an open position such that first flapper valve 304f maintains the "leak" condition.

Figure 48A:
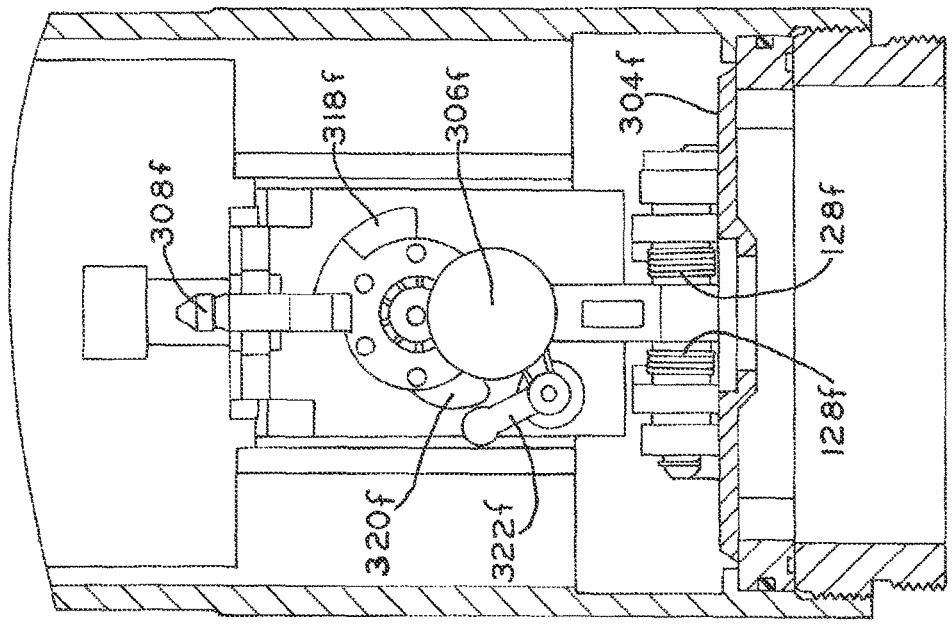
FIG. 48a is an orthogonal cross-sectional view of FIG. 48.
Figure 48:
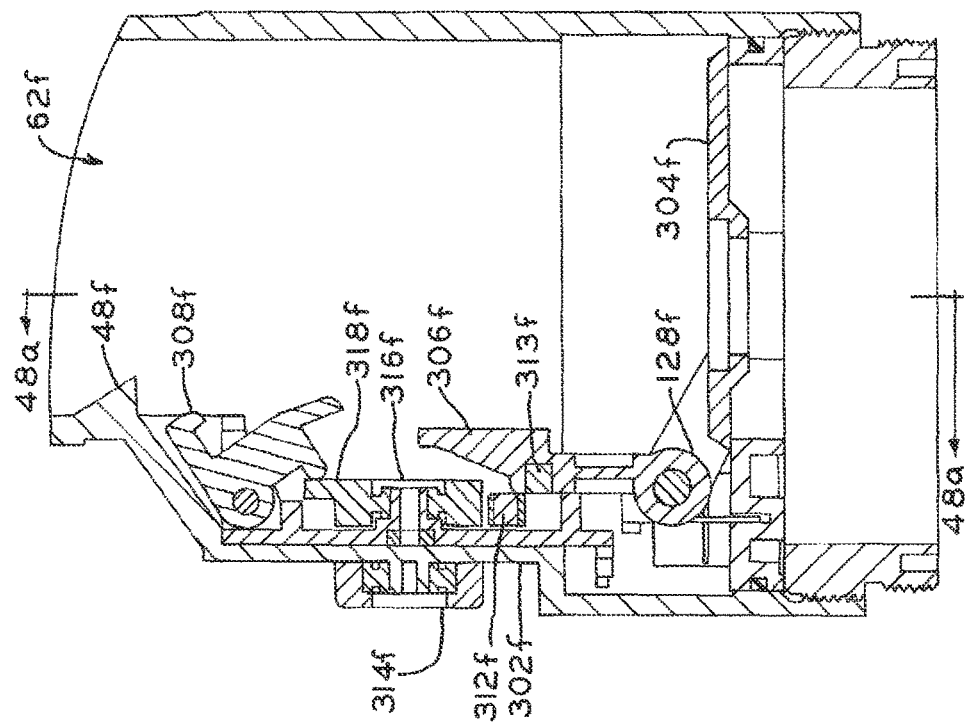
Figure 49A:
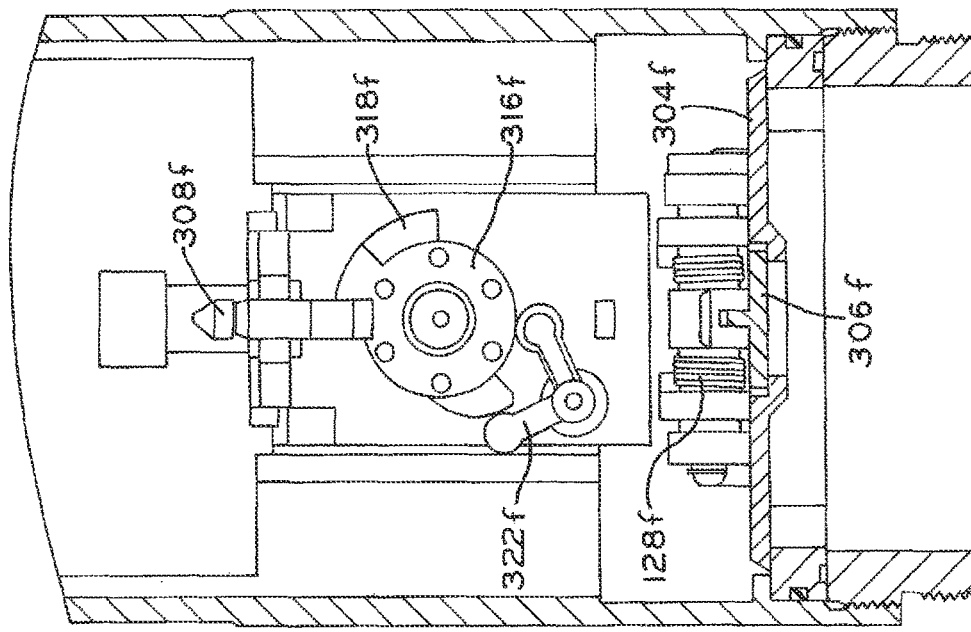
FIG. 49a is an orthogonal cross-sectional view of FIG. 49.
Figure 49:
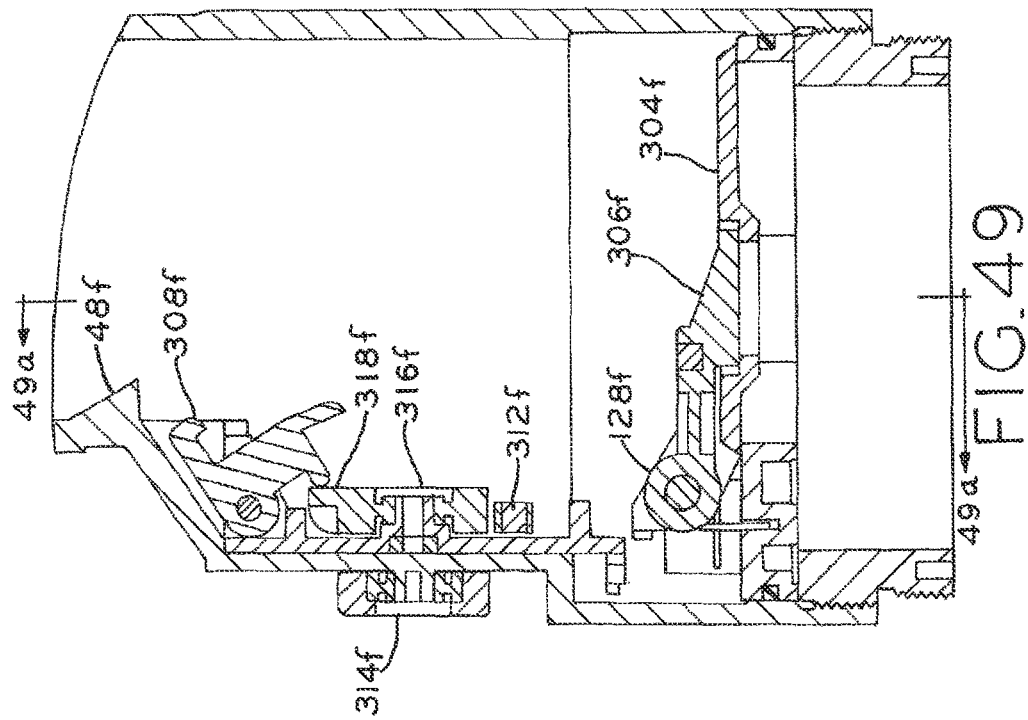

From the position illustrated in FIGS. 47 and 47a, when float 76f continues to ascend, outer magnetic coupler 314f is further rotated as link 303f is pulled upwardly by float 76f to rotate lever arm 302f, causing corresponding rotation of inner magnetic coupler 316f to the position illustrated in FIGS. 48 and 48a. In this position, cam 320f, which forms an integral part of inner magnetic coupler 316f, actuates pivot arm 322f, which carries second flapper valve magnet 312f. Actuation of lever arm 322f, as illustrated in FIG. 48a breaks the magnetic attraction between second flapper valve magnet 312f and magnet 313f, which is secured to second flapper valve 306f. In this position, there is no longer a magnetic attraction holding open second flapper valve 306f. Therefore, second flapper valve 306f begins to rotate into a closed position under its own weight, and the force of the fluid flowing through conduit 62f. FIGS. 49 and 49a further illustrate this configuration. With both first and second flapper valves 304f and 306f closed, as illustrated in FIGS. 49 and 49a, fluid may continue to flow through conduit 62f at the drain rate described above, e.g., at 2% of maximum flow rate. As the column of fluid drains past first flapper valve 304f and second flapper valve 306f, torsion spring 128f will return both first flapper valve 304f and second flapper valve 306f (owing to a seated position with respect to its valve seat, which is formed in first flapper valve 304f) to the open position.

Figure 53:
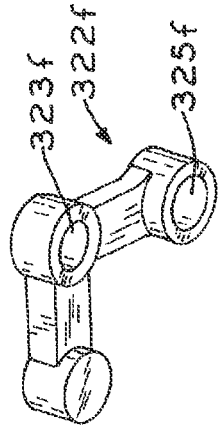
FIG. 53 is an alternative elevational view of the actuator of FIG. 51.
Figure 56:
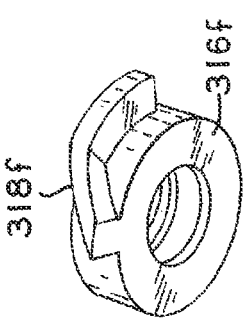
FIGS. 54-56 are perspective views of elements of the actuator of FIGS. 51-53.
Figure 52:
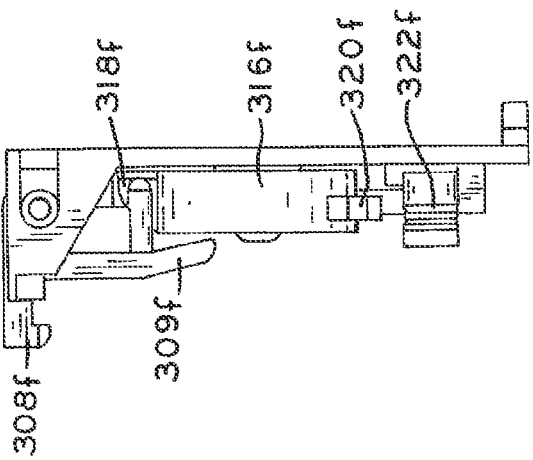
FIG. 52 is a plan view of the actuator of FIG. 51.
Figure 55:
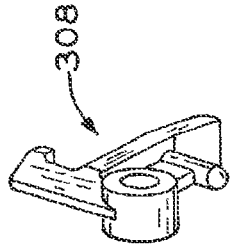
Figure 51:
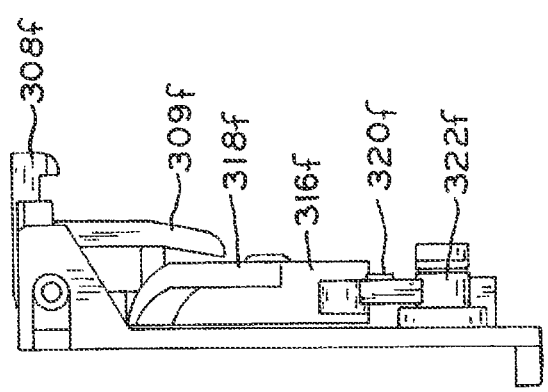
FIG. 51 is an elevational view of a valve actuator of the present disclosure.
Figure 54:
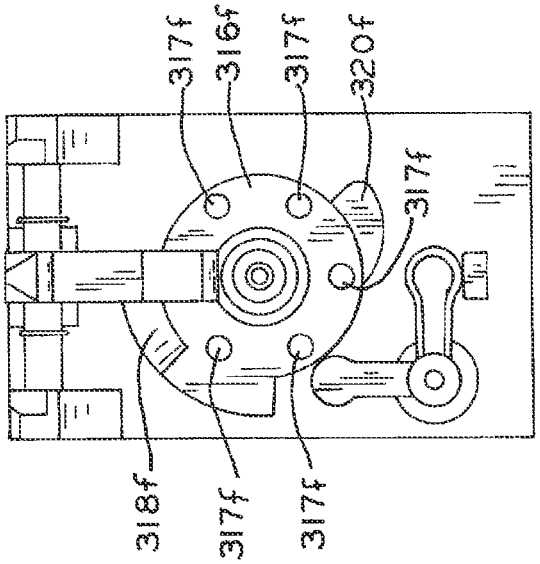

As illustrated in FIG. 50, as first flapper valve 304f and second flapper valve 306f are returned from a fully closed position illustrated in FIGS. 49 and 49a to the fully opened position illustrated in FIG. 44, first flapper valve 304f contacts foot 309f. If float 76f has returned to its fully lowered position, as illustrated in FIG. 44, then overhead latch 308f will no longer be rotated outwardly as illustrated in FIG. 50, but rather will maintain the position illustrated in FIG. 44. In this position, ramped end 324f of first flapper valve 304 can ride along the radiused outer profile of overhead latch 308f to effect a minor counterclockwise rotation of latch 308f (with respect to the perspective of FIG. 50), such that ramped end 324f of first flapper valve 304f can be secured by latch 308f as illustrated in FIG. 44. Details of the actuation mechanism described above can be found in FIGS. 51-56. FIG. 52 illustrates inner magnet coupler 306f in the same position illustrated in FIG. 44. Alternative side elevational views of the construct in this position are also provided in FIGS. 51 and 53. FIG. 54 provides a perspective view of inner magnetic coupler 316f. Further, FIG. 55 provides a perspective view of overhead latch 308f. Similarly, FIG. 56 provides a perspective view of pivot arm 322f including pivot aperture 323f and magnet holding aperture 325f.

FIGS. 57-59 illustrate drop tube adaptor 400 secured to drop tube 402. Drop tube adaptor 400 may be threadedly engaged via female threads 406 to either end of any of the overfill prevention valves described in this document. Drop tube adapter 400 may further be secured to drop tube 402 via annular groove 414. Specifically, as illustrated in FIG. 58, O-ring 416 is positioned within annular groove 414 (FIG. 57), and drop tube adaptor 400 is thereafter inserted into drop tube 402. In this position, drop tube 402 can be roll crimped to create exterior annular groove 410, as illustrated in FIG. 58. Drop tube adaptor 400 further includes through bores 408, into which drop tube 402 can be deformed to form deformations 412 as illustrated in FIG. 58. A fastener such as a rivet or bolt may then be used to further secure drop tube adaptor 400 to drive tube 402.

As described above, the overfill prevention valve in accordance with the present disclosure can include a valve actuator means for actuating a valve body from an open position to a closed position while the valve actuator means is positioned outside of the fluid path and without requiring a physical penetration of the wall defining the fluid path. Exemplary embodiments of the valve actuator means include the various float/magnet/actuator combinations described above.

Further, an overfill prevention valve in accordance with the present disclosure can include a leak means for selectively allowing a quantity of fluid to leak past a valve body when the valve body is in the closed position. Leak actuator means for actuating the leak means from a non-leak position in which the leak means does not allow the quantity of fluid to leak past the valve body to a leaked position in which the leak means allows the quantity of fluid to leak past the valve body include the various float/magnet/actuator combinations described above. The leak means may take the form of a closure stop which prevents full seating of the valve body in a closed position, as described above. The leak means may further take the form of a closure stop in the form of a secondary valve such as a poppet valve or a flapper valve which can be unseated when the primary valve maintains a closed position.

Any of the drop tube segments including an overfill prevention valve described above can be connected at their first and second ends to the remainder of drop tube 98 by a variety of connections including, e.g., threaded connections. Threaded adaptors may be utilized to effect such connections and o-rings may be provided to seal the drop tube segments of the present disclosure to the remainder of the drop tube.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An overfill prevention valve, comprising:
a conduit having a first end and a second end, a conduit wall spanning said first end of said conduit and said second end of said conduit, said conduit wall defining a conduit wall interior surface and a conduit wall exterior surface, said conduit wall interior surface defining a fluid path through said conduit from said first end of said conduit to said second end of said conduit;
a valve body moveably positioned in said fluid path of said conduit, said valve body moveable from an open position to a closed position;
a non-contact valve actuator moveable relative to said valve body and positioned outside of said conduit, said conduit wall interposed between said non-contact valve actuator and said valve body, said non-contact valve actuator operable to actuate said valve body from said open position toward said closed position without a physical link penetrating the conduit wall and mechanically connecting said non-contact valve actuator and said valve body, said non-contact valve actuator having a first position in which said non-contact valve actuator does not actuate said valve body from said open position toward said closed position and a second position in which said non-contact valve actuator actuates said valve body from said open position toward said closed position; and an actuator positioned in said fluid path of said conduit, said conduit wall interposed between said non-contact valve actuator and said actuator, said actuator moveable in response to a movement of said non-contact valve actuator from the first position to the second position, whereby movement of said non-contact valve actuator causes movement of said actuator, said actuator moveable relative to said valve body, said actuator positioned to actuate said valve body from said open position toward said closed position when said actuator moves in response to said movement of said non-contact valve actuator from the first position to the second position, said non-contact valve actuator and said actuator together operable to actuate said valve body from said open position toward said closed position, wherein said valve body is capable of a downward movement over a portion of its travel from the open position to the closed position independent of the actuator.

2. The overfill prevention valve of claim 1, wherein said non-contact valve actuator comprises a float having a specific gravity, whereby said float is buoyant on a surface of a quantity of motor fuel.

3. The overfill prevention valve of claim 1, wherein said actuator is magnetically linked to said non-contact valve actuator.

4. The overfill prevention valve of claim 1, wherein said actuator comprises a lever arm and wherein said overfill prevention valve further comprises:
a link linking said non-contact valve actuator to said lever arm, whereby said lever arm provides a mechanical advantage for movement of said actuator by said non-contact valve actuator.

5. The overfill prevention valve of claim 1, wherein said valve body is rotatably connected to said conduit and is rotatable between said open position and said closed position.

6. The overfill prevention valve of claim 1, further comprising:
a deflector secured to said conduit and positioned upstream of said valve body, said deflector sized and positioned to shield said valve body from a flow of fluid through said conduit when said valve body maintains said open position.

7. The overfill prevention valve of claim 1, wherein said valve body comprises a butterfly valve and an arm extending from said butterfly valve.

8. The overfill prevention valve of claim 1, wherein said conduit is sized so that said fluid path through said conduit allows a flow rate of 500 gallons per minute when said valve body maintains said open position.

9. The overfill prevention valve of claim 1 in combination with:
an underground storage tank; and
a drop tube extending into said underground storage tank, the overfill prevention valve forming a part of the drop tube, said drop tube in fluid communication with said underground storage tank so that fluid passing through said drop tube fills said underground storage tank.

10. The overfill prevention valve of claim 1, further comprising a splash shield connected to said conduit and shielding said non-contact valve actuator from splashes of liquid experienced external to said conduit.

11. The overfill prevention valve of claim 1, wherein said non-contact valve actuator comprises an actuator magnet, said actuator magnet producing a magnetic field acting to urge said valve body from said open position toward said closed position when said non-contact valve actuator is positioned in said second position.

12. The overfill prevention valve of claim 11, wherein said non-contact valve actuator comprises a hold-open magnet, said hold-open magnet producing a magnetic field acting to maintain said valve body in said open position when said non-contact valve actuator is positioned in said first position.

13. The overfill prevention valve of claim 11, further comprising:
a valve body magnet associated with said valve body so that said magnetic field produced by said actuator magnet repels said valve body magnet away from said actuator magnet when said non-contact valve actuator is positioned in said second position and thereby urges said valve body from said open position toward said closed position.

14. The overfill prevention valve of claim 11, further comprising:
a valve body magnet associated with said valve body so that said magnetic field produced by said actuator magnet attracts said valve body magnet toward said actuator magnet when said non-contact valve actuator is positioned in said second position and thereby urges said valve body from said open position toward said closed position.

15. The overfill prevention valve of claim 1, wherein said actuator comprises a ramp, said ramp contacting said valve body during the movement of said non-contact valve actuator, whereby said ramp actuates said valve body in a direction from the closed position to the open position during the movement of said non-contact valve actuator.

16. The overfill prevention valve of claim 15, wherein said actuator comprises a moveable latch, said moveable latch having a latching position in which said moveable latch latches said valve body in the open positioned when said non-contact valve actuator maintains said first position, said moveable latch moved from said latching position when said non-contact valve actuator moves from the first position to the second position.

17. The overfill prevention valve of claim 16, wherein said moveable latch is interposed between said ramp and said valve body, said moveable latch moved by said ramp during the movement of said non-contact valve actuator away from the latching position so that said moveable latch no longer latches said valve body in the open position, said moveable latch comprising a foot, said foot moved by said ramp during the movement of said non-contact valve actuator to move said valve body.

18. The overfill prevention valve of claim 1, further comprising:
a closure stop moveably positioned in said fluid path of said conduit, said closure stop having a leak position and a non-leak position, with said valve body in said closed position and said closure stop in said leak position, a quantity of fluid is able to leak past said valve body.

19. The overfill prevention valve of claim 18, wherein said overfill prevention valve further comprises a valve seat engageable by said valve body, said closure stop comprising a stop cam rotatably connected to said conduit wall, said stop cam supporting said valve body above said valve seat in said leak position, said stop cam allowing said valve body to engage said valve seat in said non-leak position.

20. The overfill prevention valve of claim 18, wherein said valve body comprises:
   a poppet valve;
   a poppet valve port;
   a poppet valve seat; and
   a spring biasing said poppet valve into engagement with said poppet valve seat to close said poppet valve port, wherein, with said valve body in said closed position and said closure stop in said leak position, said closure stop actuates said poppet valve against a biasing force of said spring to space said poppet valve from said poppet valve seat and place said poppet valve port in fluid communication with said fluid path.

21. The overfill prevention valve of claim 18, wherein said non-contact valve actuator is operable to actuate said closure stop from said leak position to said non-leak position without physically penetrating said conduit wall, said non-contact valve actuator having a third position in which said non-contact valve actuator actuates said closure stop from said leak position to said non-leak position, said non-contact valve actuator not actuating said closure stop from said leak position to said non-leak position in said first position and said second position.

22. The overfill prevention valve of claim 21, wherein said non-contact valve actuator comprises:
   a first float moveable from said first position to said second position, said first float operable to actuate said valve body from said open position toward said closed position when said first float achieves said second position; and
   a second float moveable relative to said first float from a rest position to said third position, said second float operable to actuate said closure stop from said leak position to said non-leak position when said second float achieves said third position.

23. The overfill prevention valve of claim 21, wherein said non-contact valve actuator comprises a closure stop actuator magnet, said closure stop actuator magnet producing a magnetic field acting to urge said closure stop from said leak position to said non-leak position when said non-contact valve actuator is positioned in said third position.

24. The overfill prevention valve of claim 23, further comprising:
   a closure stop magnet associated with said closure stop so that said magnetic field produced by said closure stop actuator magnet repels said closure stop magnet away from said closure stop actuator magnet when said non-contact valve actuator is positioned in said third position and thereby urges said closure stop from said leak position to said non-leak position.

25. The overfill prevention valve of claim 23, further comprising:
   a closure stop magnet associated with said closure stop so that said magnetic field produced by said closure stop actuator magnet attracts said closure stop magnet toward said closure stop actuator magnet when said non-contact valve actuator is positioned in said third position and thereby urges said closure stop from said leak position to said non-leak position.

26. The overfill prevention valve of claim 18, wherein said closure stop comprises a second valve body, said overfill prevention valve further comprising:
   a force applicator applying a force to said second valve body to urge said second valve body into a second valve body open position corresponding to said leak position.

27. The overfill prevention valve of claim 26, wherein said force applicator comprises a pair of magnets, one of said pair of magnets fixed relative to said second valve body, said second valve body moveable relative to the other of said pair of magnets, said pair of magnets operable to urge said second valve body to maintain the second valve body open position.

28. The overfill prevention valve of claim 27, further comprising:
   a second actuator moveably connected to the overfill prevention valve, said actuator moveable in response to a movement of said non-contact valve actuator from the first position to the second position, said actuator moveable to move said pair of magnets relative to each other so that they are no longer operable to urge said second valve body to maintain the second valve body open position.

29. The overfill prevention valve of claim 26, wherein said second valve body comprises a flapper valve.

30. The overfill prevention valve of claim 29, wherein said valve body comprises a valve port and a valve seat, said second valve body operable to selectively seat on said valve seat.

31. An overfill prevention valve, comprising:
   a conduit having a first end and a second end, a conduit wall spanning said first end of said conduit and said second end of said conduit, said conduit wall defining a conduit wall interior surface and a conduit wall exterior surface, said conduit wall interior surface defining a fluid path through said conduit from said first end of said conduit to said second end of said conduit;
   a valve body moveably positioned in said fluid path of said conduit, said valve body moveable from an open position to a closed position;
   a non-contact valve actuator moveable relative to said valve body and positioned outside of said conduit, said conduit wall interposed between said non-contact valve actuator and said valve body, said non-contact valve actuator operable to actuate said valve body from said open position toward said closed position without a physical link connecting said non-contact valve actuator and said valve body, said non-contact valve actuator having a first position in which said non-contact valve actuator does not actuate said valve body from said open position toward said closed position and a second position in which said non-contact valve actuator actuates said valve body from said open position toward said closed position; and
   an actuator positioned in said fluid path of said conduit, said conduit wall interposed between said non-contact valve actuator and said actuator, said actuator moveable in response to a movement of said non-contact valve actuator from the first position to the second position, whereby movement of said non-contact valve actuator causes movement of said actuator, said actuator moveable relative to said valve body, said actuator positioned to actuate said valve body from said open position toward said closed position when said actuator moves in response to said movement of said non-contact valve actuator from the first position to the second position, said non-contact valve actuator and said actuator together operable to actuate said valve body from said open position toward said closed position, wherein said valve body comprises a flapper valve.

32. An overfill prevention valve, comprising:
a conduit having a first end and a second end, a conduit wall spanning said first end of said conduit and said second end of said conduit, said conduit wall defining a conduit wall interior surface and a conduit wall exterior surface, said conduit wall interior surface defining a fluid path through said conduit from said first end of said conduit to said second end of said conduit;
a valve body moveably positioned in said fluid path of said conduit, said valve body moveable from an open position to a closed position;
a valve actuator means for actuating said valve body from said open position toward said closed position while at least part of said valve actuator means is positioned outside of said fluid path of said conduit and without a physical link penetrating said wall, said valve actuator means comprising:
an external actuator, said conduit wall interposed between said external actuator and said valve body; and
an internal actuator positioned in said fluid path, said conduit wall interposed between said internal actuator and said external actuator, said internal actuator moveable in response to a movement of said external actuator, with no physical link penetrating the conduit wall and mechanically connecting said external actuator and said internal actuator, said internal actuator moveable relative to said valve body and positioned to actuate said valve body from said open position toward said closed position when said internal actuator moves in response to said movement of said external actuator;
a leak means for selectively allowing a quantity of fluid to leak past said valve body when said valve body is in said closed position; and
a leak actuator means for actuating said leak means from a leak position in which said leak means allows the quantity of fluid to leak past the valve body to a non-leak position in which said leak means does not allow the quantity of fluid to leak past the valve body.

33. The overfill prevention valve of claim 32, wherein said valve actuator means comprises a means for generating a magnetic field for actuating said valve body from said open position toward said closed position.

34. The overfill prevention valve of claim 32, wherein said valve actuator means comprises a float having a specific gravity, whereby said float is buoyant on a surface of a quantity of motor fuel.

35. The overfill prevention valve of claim 32, wherein said conduit is sized so that said fluid path through said conduit allows a flow rate of 500 gallons per minute when said valve body maintains said open position.

36. The overfill prevention valve of claim 32, in combination with:
an underground storage tank; and
a drop tube extending into said underground storage tank, the overfill prevention valve forming a part of the drop tube, said drop tube in fluid communication with said underground storage tank so that fluid passing through said drop tube fills said underground storage tank.

37. An overfill prevention valve, comprising:
a conduit having a first end and a second end, a conduit wall spanning said first end of said conduit and said second end of said conduit, said conduit wall defining a conduit wall interior surface and a conduit wall exterior surface, said conduit wall interior surface defining a fluid path through said conduit from said first end of said conduit to said second end of said conduit;
a valve body moveably positioned in said fluid path of said conduit, said valve body moveable from an open position to a closed position; and
a magnetic valve actuator moveable relative to said valve body and positioned outside of said conduit, said conduit wall interposed between said magnetic valve actuator and said valve body, said magnetic valve actuator operable to actuate said valve body from said open position toward said closed position without a physical link penetrating the conduit wall and mechanically connecting said magnetic valve actuator and said valve body, said magnetic valve actuator having a first position in which said magnetic valve actuator does not actuate said valve body from said open position toward said closed position and a second position in which said magnetic valve actuator actuates said valve body from said open position toward said closed position; and
an actuator positioned in said fluid path of said conduit, said conduit wall interposed between said magnetic valve actuator and said actuator, said actuator moveable in response to a movement of said magnetic valve actuator from the first position to the second position, whereby movement of said magnetic valve actuator causes movement of said actuator, said actuator moveable relative to said valve body, said actuator positioned to actuate said valve body from said open position toward said closed position when said actuator moves in response to said movement of said magnetic valve actuator from the first position to the second position, said magnetic valve actuator and said actuator together operable to actuate said valve body from said open position toward said closed position, wherein said valve body is capable of a downward movement over a portion of its travel from the open position to the closed position independent of the actuator.

38. The overfill prevention valve of claim 37, wherein said magnetic valve actuator comprises an actuator magnet, said actuator magnet producing a magnetic field acting to urge said valve body from said open position toward said closed position when said magnetic valve actuator is positioned in said second position.

39. The overfill prevention valve of claim 38, further comprising:
a valve body magnet associated with said valve so that said magnetic field produced by said actuator magnet repels said valve body magnet away from said actuator magnet when said magnetic valve actuator is positioned in said second position and thereby urges said valve body from said open position toward said closed position.

40. The overfill prevention valve of claim 38, further comprising:
a valve body magnet associated with said valve body so that said magnetic field produced by said actuator magnet attracts said valve body magnet toward said actuator magnet when said magnetic valve actuator is positioned in said second position and thereby urges said valve body from said open position toward said closed position.

41. An overfill prevention valve, comprising:
a conduit having a first end and a second end, a conduit wall spanning said first end of said conduit and said second end of said conduit, said conduit wall defining a conduit wall interior surface and a conduit wall exterior surface, said conduit wall interior surface defining a fluid path through said conduit from said first end of said conduit to said second end of said conduit;

a valve body moveably positioned in said fluid path of said conduit, said valve body moveable from an open position to a closed position;

a non-contact valve actuator moveable relative to said valve body and positioned outside of said conduit, said conduit wall interposed between said non-contact valve actuator and said valve body, said non-contact valve actuator operable to actuate said valve body from said open position toward said closed position without a physical link connecting said non-contact valve actuator and said valve body, said non-contact valve actuator having a first position in which said non-contact valve actuator does not actuate said valve body from said open position toward said closed position and a second position in which said non-contact valve actuator actuates said valve body from said open position toward said closed position; and an actuator positioned in said fluid path of said conduit, said conduit wall interposed between said non-contact valve actuator and said actuator, said actuator moveable in response to a movement of said non-contact valve actuator from the first position to the second position, whereby movement of said non-contact valve actuator causes movement of said actuator, said actuator moveable relative to said valve body, said actuator positioned to actuate said valve body from said open position toward said closed position when said actuator moves in response to said movement of said non-contact valve actuator from the first position to the second position, said non-contact valve actuator and said actuator together operable to actuate said valve body from said open position toward said closed position, wherein said valve body is capable of a movement over a portion of its travel from the open position to the closed position without said actuator affecting said movement.

* * * * *